United States Patent
Nagai et al.

(10) Patent No.: US 9,124,432 B2
(45) Date of Patent: Sep. 1, 2015

(54) HOST DEVICE AND AUTHENTICATION METHOD FOR HOST DEVICE

(75) Inventors: Yuji Nagai, Sagamihara (JP); Taku Kato, Kamakura (JP); Tatsuyuki Matsushita, Tokyo (JP); Shinichi Matsukawa, Tokyo (JP); Yasufumi Tsumagari, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/520,053

(22) PCT Filed: May 25, 2012

(86) PCT No.: PCT/JP2012/063564
§ 371 (c)(1), (2), (4) Date: Oct. 5, 2012

(87) PCT Pub. No.: WO2013/175640
PCT Pub. Date: Nov. 28, 2013

(65) Prior Publication Data
US 2015/0074394 A1  Mar. 12, 2015

(51) Int. Cl.
H04L 9/00 (2006.01)
H04L 9/32 (2006.01)
H04L 9/08 (2006.01)

(52) U.S. Cl.
CPC ............ *H04L 9/3226* (2013.01); *H04L 9/0869* (2013.01); *H04L 9/3242* (2013.01); *H04L 2209/605* (2013.01)

(58) Field of Classification Search
CPC ........... H04L 9/08; H04L 63/06; H04L 63/08; H04L 9/22; H04L 9/065; H04L 63/0838; H04L 9/0656; H04L 9/0662; H04L 9/0668; H04L 9/3228; H04L 9/3236; H04L 9/3239; H04L 9/3242; H04L 9/3223

USPC .............. 380/277, 44, 46; 713/168, 171, 181, 713/189

See application file for complete search history.

(56) References Cited

U.S. PATENT DOCUMENTS 7,373,506 B2 *  5/2008  Asano et al. .................. 713/168
8,005,460 B2 *  8/2011  Chen et al. .................... 455/411

(Continued)

FOREIGN PATENT DOCUMENTS

JP 2012-227901 A  11/2002
JP 2004-262295     10/2004

(Continued)

OTHER PUBLICATIONS

International Preliminary Report on Patentability and Written Opinion issued Dec. 4, 2014 in PCT/JP2012/063564 (with English Translation).

(Continued)

*Primary Examiner* — Hosuk Song
(74) *Attorney, Agent, or Firm* — Oblon, McClelland, Maier & Neustadt, L.L.P.

(57) ABSTRACT

A first data generation unit generates identification key information (FKey) that may be decrypted from the identification key information (IDKey) using key management information (FKB) read from an authenticatee. A decryption unit decrypts encrypted secret identification information (E-SecretID) using the identification key information (FKey) to generate secret identification information (SecretID). A second data generation unit generates a first session key (Skey) using the first key information (Hkey) and a random number. A one-way conversion unit performs a one-way conversion process on the secret identification information (SecretID) using the generated first session key (SKey) to generate first one-way conversion data (Oneway-ID).

2 Claims, 61 Drawing Sheets

(56) References Cited

U.S. PATENT DOCUMENTS

| | | | |
|---|---|---|---|
| 8,484,469 B2* | 7/2013 | Li | 713/168 |
| 8,595,501 B2* | 11/2013 | Rose et al. | 713/172 |
| 2006/0143453 A1 | 6/2006 | Imamoto et al. | |
| 2009/0232314 A1 | 9/2009 | Kato et al. | |
| 2010/0017626 A1 | 1/2010 | Sato et al. | |

FOREIGN PATENT DOCUMENTS

| | | |
|---|---|---|
| JP | 2009-225062 | 10/2009 |
| JP | 2010-28485 | 2/2010 |
| JP | 2012-227899 A | 11/2012 |
| JP | 2012-227900 A | 11/2012 |
| JP | 2015-252195 | 12/2012 |
| JP | 2013-5293 A | 1/2013 |

OTHER PUBLICATIONS

U.S. Appl. No. 13/486,684, filed Jun. 1, 2012, Kato, et al.
U.S. Appl. No. 13/513,469, filed Jun. 1, 2012, Kato, et al.
U.S. Appl. No. 13/513,406, filed Jun. 1, 2012, Kato, et al.
U.S. Appl. No. 13/524,532, filed Jun. 15, 2012, Kato, et al.
U.S. Appl. No. 13/524,417, filed Jun. 15, 2012, Kato, et al.
U.S. Appl. No. 13/524,271, filed Jun. 15, 2012, Nagai, et al.
U.S. Appl. No. 13/524,894, filed Jun. 15, 2012, Nagai, et al.
U.S. Appl. No. 13/524,873, filed Jun. 15, 2012, Nagai, et al.
U.S. Appl. No. 13/524,475, filed Jun. 15, 2012, Nagai, et al.
U.S. Appl. No. 13/524,843, filed Jun. 15, 2012, Nagai, et al.
International Search Report issued Jun. 26, 2012 in PCT/JP2012/065564.
Kenji Imamoto, et al., "Notes on Dynamic Information Management for Authenticated Key Exchange", The Institute of Electronics, Information and Communication Engineers, Technical Report of IEICE, vol. 102, No. 743, Mar. 19, 2003, pp. 91-96 (with English abstract).
Content Protection for Recordable Media Specification, SD Memory Card Book Common Part, Revision 0.97, 4C Entity, Dec. 15, 2010, 39 pages.
Media Identifier Management Technology Specification, Revision 0.85 preliminary Release, 4C Entity, Sep. 27, 2010, 26 pages.
Dalit Naor, et al., "Revocation and Tracing Schemes for Stateless Receivers", Feb. 24, 2001, pp. 1-33.
Content Protection for eXtended Media Specification, Introduction and Common Cryptographic Elements, Revision 0.85 preliminary Release, 4C Entity, Sep. 27, 2010, 32 pages.
Panasonic, Samsung, Sony, Toshiba—Introducing Next Generation Secure Memory Technology, Mar. 2012, 16 pages.

* cited by examiner

CONFIGURATION EXAMPLE 3 OF ECC

CONFIGURATION EXAMPLE 4 OF ECC

EXAMPLE OF ACCESS CONTROL PATTERN

APPLICATION 2 IN HDD

HOST DEVICE AND AUTHENTICATION
METHOD FOR HOST DEVICE

FIELD

Embodiments described herein relates to a host device and a authentication method for a host device.

BACKGROUND

Generally, in fields where information security is required, authentication technology is adopted, which uses secret information and secret code shared between two entities, as a measure to prove his or her validity.

For example, an IC chip is included in an IC card (Smart Card) used for electric settlement. The IC chip stores an ID for identifying the IC card and secret information. Furthermore, the IC card has a function of an encryption process for conducting an authentication based on the ID and the secret information.

As another example of a copyright protection technology for content data, content protection technology for proving the validity of the SD card (a registered trademark) is known (Content Protection for Recordable Media (CPRM)).

[Antecedent Technical Document]
Non-patent document 1: Content Protection for Recordable Media (CPRM), http://www.4centity.com/
Non-patent document 2: Media Identifier Management Technology (MIMT), http://www.4ecntity.com/
Non-patent document 3: D. Naor, M. Naor and J. Lotspiech, "Revocation and Tracing Schemes for Stateless Receivers," Proc. CRYPTO 2001, LNCS2139, Springer-Verlag, pp. 41-62, 2001

SUMMARY OF THE INVENTION

Problem to be Solved by the Invention

Embodiments disclosed hereinbelow provide a host device and a authentication method for a host device that can prevent the unauthorized use of secret information.

Means to Solve the Problem

The memory device according to an embodiment described below comprises first to third memory areas. The first memory area is an area in which reading and writing from outside of the memory device is inhibited at least after shipment of the memory device. The second memory area is an area in which reading from outside of the memory device is permitted, while writing is inhibited. The third memory area is an area in which reading and writing from outside of the memory device is permitted, The first memory area is an area for storing first key information (Nkey) and identification information (SecretID). the second memory area is an area for storing encrypted identification information (E-SecretID) generated by encrypting the identification information using second key information (Fkey). The third memory area is an area for storing encrypted second key information (FKB) generated by encrypting the second key information. For authentication of the host device, the memory device being configured to output the encrypted second key information (FKB) to the host device, output the encrypted identification information (E-SecretID) to the host device, generate third third key information (Hkey) using information (HC) received from the host device and the first key information, generate a session key (Skey) using a random number (RN) received from the host device, and the third key information, generate authentication information (Oneway-ID) by performing a one-way conversion process on the identification information, using the session key, and output the authentication information (Oneway-ID) to the host device.

Furthermore, a host device according to the embodiments described below is a host device assigned with identification key information (IDKey) and first key information (Hkey). This host device comprises a first data generation unit that generates identification key information (FKey) that may be decrypted from the identification key information (IDKey) using key management information (FKB) read from an authenticate, and a decryption unit that decrypts encrypted secret identification information (E-SecretID) read from the authenticate using the generated identification key information (FKey) to generate secret identification information (SecretID). This host device also comprises: a random number generator that generates a random number (RN);
a second data generation unit that generates a first session key (Skey) using the first key information (Hkey) and the random number; a one-way conversion unit that performs a one-way conversion process on the secret identification information (SecretID) using the generated first session key (SKey) to generate first one-way conversion data (Oneway-ID); and a verification unit that judges whether the first one-way conversion data (Oneway-ID) and the second one-way conversion data (Oneway-ID) received from the authenticate match. When the judgment result of the verification unit is affirmative, a one-way conversion process is conducted on the secret identification information (SecretID) and secret information (ASSV) to generate one-way conversion identification information (EMID).

A security system according to the embodiment described below is a security system includes a controller manufacturer, a key issuer, and a medium manufacturer. The controller manufacturer writes a controller key Kc and a controller unique ID (IDcu) in the controller at the time of manufacturing the controller, and transmits the controller key Kc to the key issuer. The key issuer generates a medium device key Kmd_i and a medium device key certificate $Cert_{media}$, and encrypts the medium device key Kmd_i using the controller key Kc to generate encrypted medium device key Enc (Kc, Kmd_i). The medium manufacturer decrypts the encrypted medium device key Enc (Kc, Kmd_i) received from the key issuer, using the controller key Kc in the controller, and encrypts the medium device key Kmd_i obtained by decryption using a controller unique key Kcu generated from the controller unique ID (IDcu) in the controller, and then store it in a memory.

In a first authentication method of a memory device by a host device according to the embodiments described below, a memory device is manufactured by a memory device manufacturer.

A controller that controls the memory device is manufactured by a controller manufacturer.

A memory card including the memory device and the controller is manufactured by a memory card manufacturer.

The host device is manufactured by a host device manufacturer.

The memory device comprises:
a first memory area in which first data is written, and reading and writing from outside of the memory device is inhibited at least after shipment of the memory device;
a second memory area in which second data and key index information is written by the memory device manufacturer before shipment of the memory device, and reading by the controller is possible while writing is inhibited after shipment of the memory device;

a third memory area in which third data is written by the memory device manufacturer before shipment of the memory device, the third data being a set of encrypted keys, each of the keys including an index that matches with the key index information, and reading and writing by the controller is possible after shipment of the memory device; and a circuit enabled to process the first data in the memory device.

An authentication process includes:
reading the third data from the third memory area;
transmitting the third data to the host device;
reading the second data from the second memory area;
transmitting the second data to the host device;
reading the key index information from the second memory area;
transmitting the key index information to the host device;
reading the first data from the first memory area;
processing the first data using the circuit in the memory device;
transmitting result information to the host device; and
then, authenticate the memory device using information received from the host device.

According to the authentication method, security of the system will be enhanced, because both information written by a card manufacturer (recorded in a third area) and information written by a memory device manufacturer (recorded in a second area) are used. Authentication will fail unless the both are correct. In addition, index information as information set recorded in the third area by the memory device manufacturer is information written in the second area by the memory device manufacturer. In this regard, authentication will rail unless the both are correct. Furthermore, the data written by the memory device manufacturer is read-only, the card manufacturer cannot falsify the data. Furthermore, a first area that may not be read or written from the controller is provided, and a processing circuit is provided in the memory device. Data recorded in the first area is configured to be output to outside of the memory device only after the process in the circuit is completed. Therefore, authentication may be performed using data that is not conceivable except the memory device manufacturer.

A second authentication method of a memory device by a host device according to the embodiments described below includes the following processes in a process of reading the second data from the second memory area in the first authentication method:

transmitting a special command from the host device;
receiving the special command via an interface positioned between the memory card and the host device;
reading the second data, by the controller, in response to reception of the special command via another interface positioned between the memory card and the host device.

With regard to a third authentication method of a memory device by a host device according to the embodiments described below, in a process of reading the second data from the memory area in the first and second authentication method, the memory card recited in at least one of the processes is replaced by a device/part/module/or unit including a memory function.

A fourth authentication method of a memory device by a host device according to the embodiments described below is as follow.

A system includes:
a memory unit including a first area in which first data is written and access process is restricted, a second area in which a part of access process is restricted after second data and index information is written, respectively, and a third area in which a plurality of encrypted keys are written, each key including information that matches with the index information;

a control unit that is manufactured by a manufacturer different from that of the memory unit, and controls the memory unit; and a device electrically connectable to a module.

The device and the memory unit are configured as follows:
(1) the second data, the third data and the index information are read to be transmitted to the device;
(2) The first data is read, and information obtained by using the first data is transmitted to the device. Then, using the information received from the device, a process of authenticating the memory device is performed.

A device described below is a device having identification information and first information.

The device includes:
a first generation unit that generates identification information that may be decrypted from the identification information, using management information read from a second device;
a decryption unit that decrypts encrypted secret identification information read from the second device, using the identification information that has been generated;
a second generation unit that generates first session information using the first information and a random number; and
a conversion unit that performs a conversion process on the secret identification information, using the first session information that has been generated to generate first conversion information, when the first conversion information and second conversion information received from the second device match, one-way identification information (EMID) is generated.

In a system described below, a first enterprise writes first part information and first part ID in a first part. The first part information is sent to a second enterprise. The first part is sent to a third enterprise.

The second enterprise generates second part information and second part certificate information, and encrypts the second part information using the first part information to generate encrypted second part information.

A third enterprise decrypts the encrypted second part information received from the second enterprise using the first part information in the first part, and encrypts the second part information obtained by decryption using information generated from the first part ID in the first part.

EMBODIMENT

[First Embodiment]

First, with reference to FIG. 1 to FIG. 3, a first embodiment will be explained.

<First Content Protection Technology>

Figure 1:
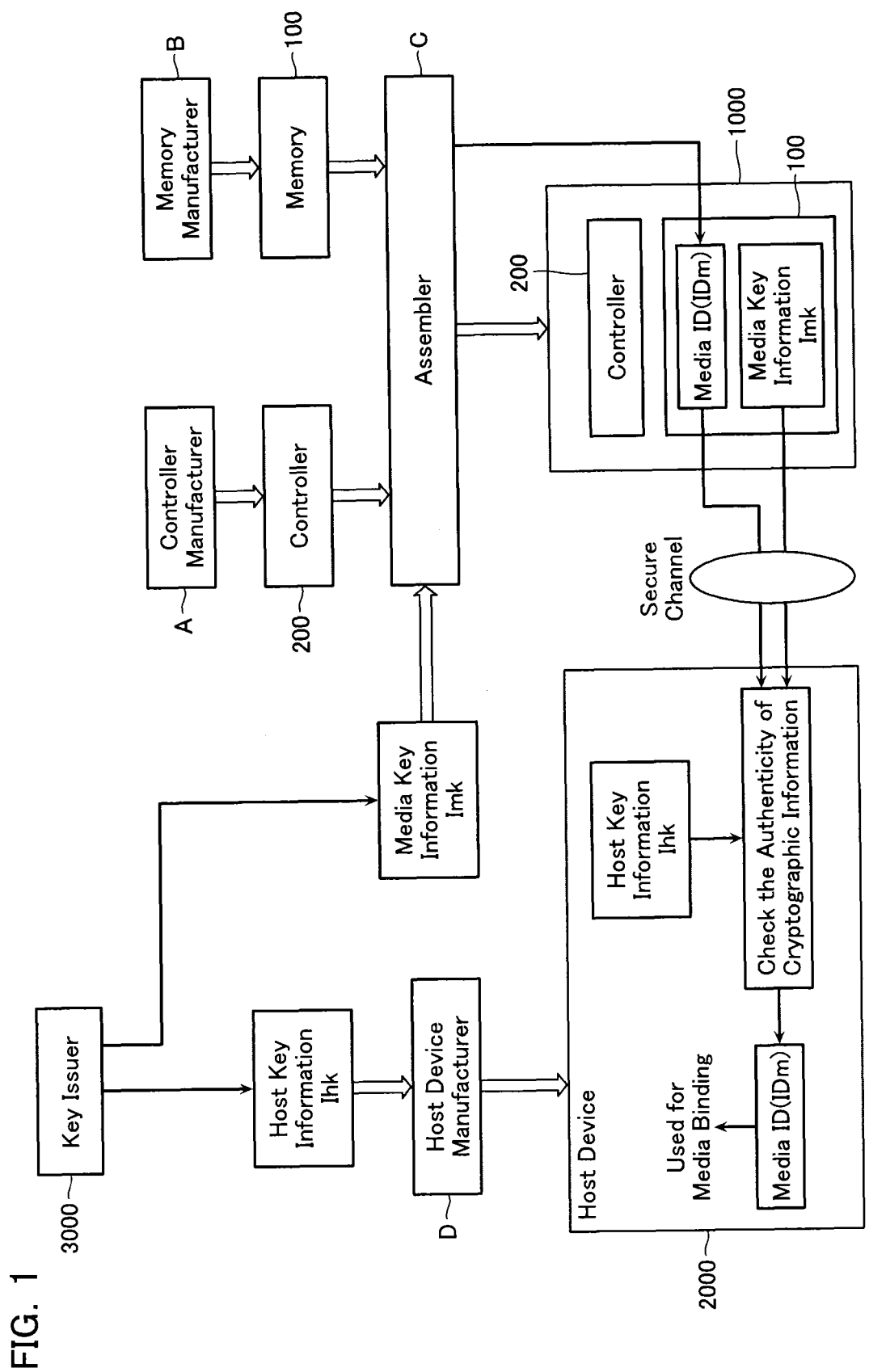
FIG. 1 explains the first embodiment (first content data protection technology)

With reference to FIG. 1, a first content protection technology typified by CPRM or the like used in an SD card will be explained.

Specifically, an medium ID authentication technology for content data protection, and steps for manufacturing a card in which this technology is applied.

A memory card 1000 is composed of a memory 100 as typified by a NAND flash memory, and a controller 200 for controlling the memory 100. The memory 100 and the controller 200 may be manufactured by the same manufacturer, or may be manufactured by independent manufacturers, respectively. FIG. 1 illustrates a case where a controller manufacturer A manufactures the controller 200 and a memory manufacturer B manufactures the memory 100. The manufacturers A and B may belong to the same cooperation.

The memory 100 and the controller 200 are assembled into one piece, and are packaged into a form of a card, thereby a memory card 1000 being manufactured. A manufacturer who is in charge of this assembly is called an assembler C.

Also, a host device 2000 is manufactured by a host device manufacturer D. The host device manufacturer D receives host key information (Ihk) from a key issue/management center 3000, and stores it in the host device 2000. Also, the key issue/management center 3000 provides medium key information (Imk) to the assembler C.

Here, in the first content protection technology, the memory 100 does not have a security function, and only the controller 200 has a security function.

Also, in the first content protection technology, the controller 200 does not hold peculiar information. An medium ID which has an important role in content protection is assigned to the memory 100 by the assembler C. The assembler C stores, in the non-user area of the memory 100, the medium ID (IDm) assigned with the medium key information Imk received from the key issue/management center 3000.

On the other hand, the host device manufacturer D receives host key information (Ihk) from the key issue/management center 3000 in a similar manner. The host key information (Ihk) is assigned to the host device 2000 at the time of manufacturing.

The medium key information (Imk) and the medium ID (IDm) are used when the memory card 1000 and the host device 2000 perform authentication process. Using a secure channel established based on the these pieces of information, means for preventing falsification is conducted. Through this secure channel, the medium ID (IDm) is sent from the memory card 1000 to the host device 2000 together with the medium key information (Imk). The host device 2000 performs authentication of the memory card 1000 by matching the host key information (Ihk) held therein with the medium ID (IDm) and medium key information (Imk).

When authentication is completed, the host device 2000 performs encryption of information used for content protection (for example, a content key), using the received medium ID (IDm). The host device 2000 also performs a process for linking (medium binding) content data and the medium ID (IDm) by performing encryption process such as MAC (Message Authentication Code) using the medium ID (IDm) for a content key or content-adherent information. This may prevent unauthorized copy even if content data, a content key or content-adherent information are illegally copied to another medium, because there is no linking found with the medium ID (IDm).

Here, the reason why unauthorized copy may be prevented resides in uniqueness of the medium ID (IDm). If the memory cards 1000 each does not have unique medium ID (IDm), but plural memory cards 1000 share the same medium ID (IDm), unauthorized copy of content data is made possible without destroying the content protection system.

Recently, several hundred millions of memory cards are manufactured, and the number of assemblers are also increasing drastically. Thus, there are increasing number of suppliers who fail to assign different medium IDs (IDm) to different memory cards. This causes plural memory cards with the same medium ID (IDm) to be put on the market.

Under such circumstances, It is desired that a method be proposed that may effectively prevent falsification of the medium ID (IDm). With reference to FIG. 2, while describing the difference from the first content protection technology, a second content protection technology will be described.

<Second Content Protection Technology>

In the first content protection technology, the assembler C assigns the medium ID (IDm) to the memory card 1000. In the second content protection technology, the controller manufacturer A and the memory manufacturer B assign peculiar information (in FIG. 2. an secure ID, a key, and a parameter) at the time of production of the controller 200 or the memory 100.

Specifically, the controller manufacturer A generates peculiar information according to controller key information (Ick) received from the key issue/management center 3000, and this information is assigned to the controller 200. In addition, memory manufacturer B generates peculiar information according to memory key information (Imemk) received from the key issue/management center 3000, and assign the peculiar information to the memory 100. The assembler C has a role of combining the controller 200 and the memory 100 that are provided with the peculiar information in this way, with medium key informational (Imk) received from the key issue/management center 3000 to assemble the memory card 1000.

Here, the medium key information (Imk) is given in an encrypted state, and secret information is not disclosed to the assembler C. The assigned peculiar information is used for authentication with the host device 2000, together with the medium key information (Imk). In this example, the medium ID (IDm) is not recorded directly in the controller 200 or the memory 100. The medium ID (IDm) is medium identification information derived based on the peculiar information stored in the controller 200 or the memory 100.

In addition, in the second content protection technology, the memory 100 has a security function, and the memory manufacturer B assigns peculiar information to the memory 100 at the time of production of the memory 100. The number of the controller manufacturers A is smaller than that of the assemblers C in view of technical aspects and market aspects. The number of the memory manufacturers B is further smaller than that of the controller manufacturers A.

In security technologies, it is necessary to let any one of the components in the devices that deal with data such as the memory card 1000 or the host device 2000 have a role of a fort of trust (a root of trust), by all means. Here, a manufacturer who are provided with a role of fort of trust (root of trust) is required to be a reliable manufacturer.

The inventor of the present invention focused on the fact that as the number of manufacturers (the number of players) increases, the number of untrustworthy manufacturers increases, and came to the above-described concept. According to the second content protection technology (FIG. 2), it is possible to improve the robustness of the system, as compared to the first content protection technology, which allows the only assembler C to assign the medium ID (FIG. 1).

In the second content protection technology, the peculiar information that forms a basis of the uniqueness of the medium ID (IDm) is provided to both of the memory 100 and the controller 200. This may maintain the robustness of the system even if either one of the security of the memory 100 or the controller 200 is destroyed, provided that the security of the other one is kept effective. In addition, a similar effect can be expected when either one of the manufacturers (A or B) assigned inappropriate peculiar information.

Then, a configuration example of the memory card 1000 according to the second content protection technology will be explained with reference to FIG. 3. As stated above, the memory card 1000 is composed of the memory 100 and the controller 200.

The controller 200 has a hidden area 201 for recording the peculiar information and the other secret information; an authentication circuit 202 for providing a security function; a memory control circuit 203 for controlling the memory 100; a memory interface 204; and a host interface 205.

The memory 100 has a hidden area 101 for recording the peculiar information and the other secret information as a memory area; a ROM area 102 for recording management information adherent to the peculiar information and the secret information; and a read/write area 103. Furthermore, the memory 100 comprises an authentication circuit 107 for providing a security function, and a memory periphery circuit 108 for controlling read/write/erase of data.

For the memory 100, the read/write area 103 is an area that provides a function of a normal memory area to the controller 200. However, the controller 200 further classifies the read/write area 103 into a plurality of areas, and the controller 200 controls access to the memory 100 from the host device 2000. That is, the read/write area 103 is further classified into a system information recording area 104 (System Area) to which only the controller 200 may access for the host device 2000 but to which the host device 2000 cannot access; a secret recording area 105 (Protected Area) that may be accessed by the host device 2000 when authentication between the host device 2000 and the controller 200 succeeded; and a normal recording area (Normal Area) that is accessible from the host device 2000 without authentication.

The normal recording area 106 is used as a normal data recording area for storing user data or the like. The secret recording area 105 is used to record secret information such as content keys, and medium keys. The system information recording area 104 is used to record the above-mentioned peculiar information, secret information, management information adherent thereto, and the like.

In the embodiments that will be described hereinbelow, explanation will be made for a method of using the peculiar information or the like provided to the controller 200 and the memory 100, respectively. First, the explanation will be made in view of the peculiar information stored in the controller 200. Next, the explanation will be made in view of the peculiar information stored in the memory 100.

Figure 4:
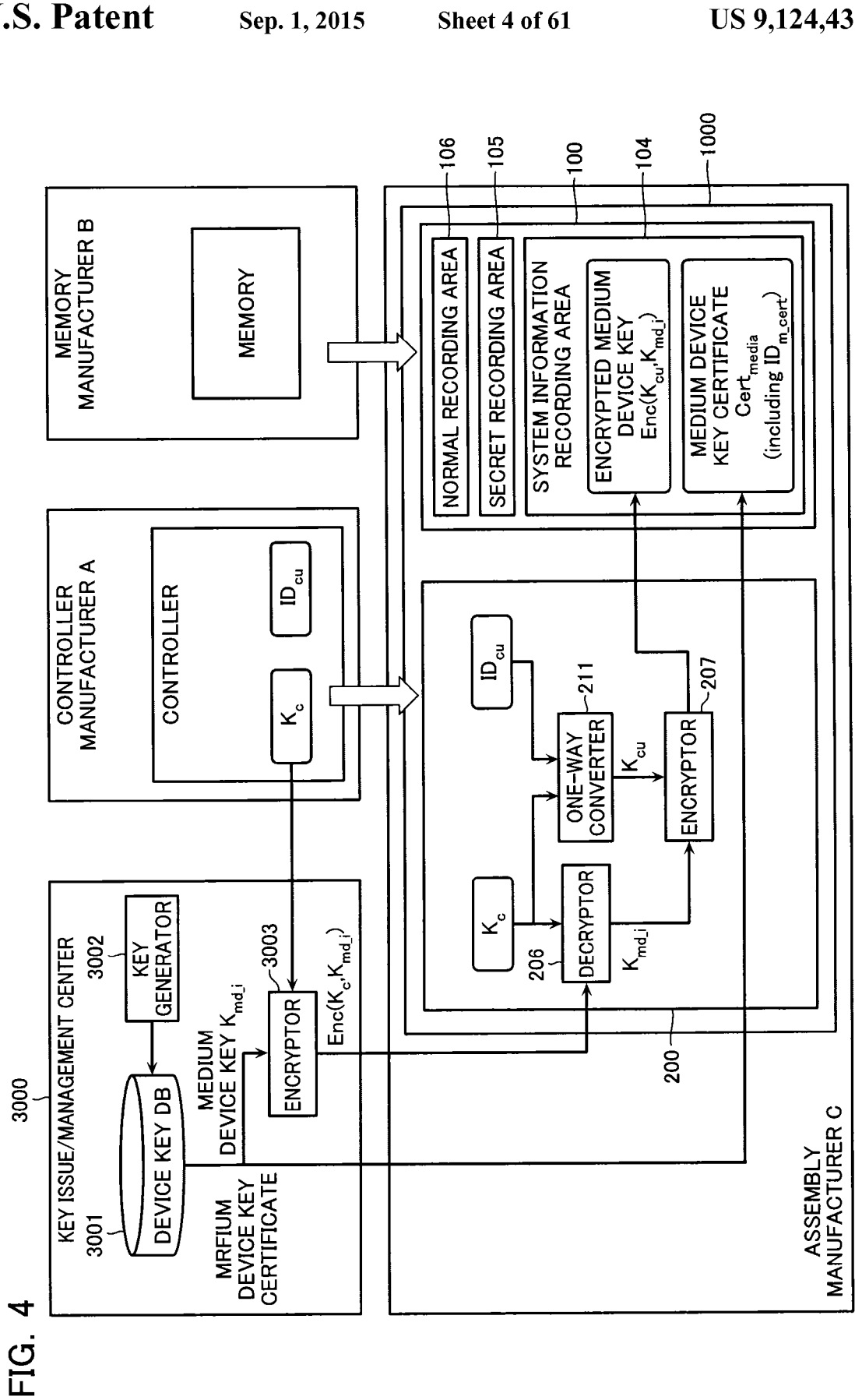
FIG. 4 explains a manufacturing process of the memory card 1000 according to the second embodiment.

Referring now to FIG. 4, a method of manufacturing the memory card 1000, and a method of writing the medium device key Kmd_i and the medium device key certificate Cert$_{media}$ will be described. In FIG. 4, components similar to those of the first embodiment (FIG. 2) are assigned with the same reference numerals. In this embodiment, a controller key Kc as peculiar information and a controller unique ID (IDcu) are provided only to the controller 200. Note that the controller key Kc and the controller unique ID (IDcu) are recorded in a hidden area (not shown in FIG. 4) in the controller 200 by the controller manufacturer A. However, it is also possible that, as explained in the first embodiment, an example where the memory manufacturer B stores the peculiar information in the memory 100, according to the fourth embodiment described later. The controller key Kc and the controller unique ID (IDcu) may be stored in a fuse circuit provided in the controller. However, a method of storing is not limited to this.

The uniqueness of the controller key Kc and that of controller unique ID (IDcu) may be different. For example, it is possible that each controller 200 has a controller key Kc with a unique value. Alternatively, each lot of the controllers 200 may have a unique value thereof. Or each manufacturer of the controller 200 may have a unique value thereof. In addition, it is possible that each controller 200 has a controller unique ID (IDcu) with a unique value. Alternatively, each lot of the controllers 200 may have a unique value thereof. Or each manufacturer of the controller 200 may have a unique value thereof. Although the granularity of the uniqueness may be selected as required, it is preferable that at least either one of the controller key Kc and the controller unique ID (IDcu) has unique values for different controllers 200.

Figure 2:
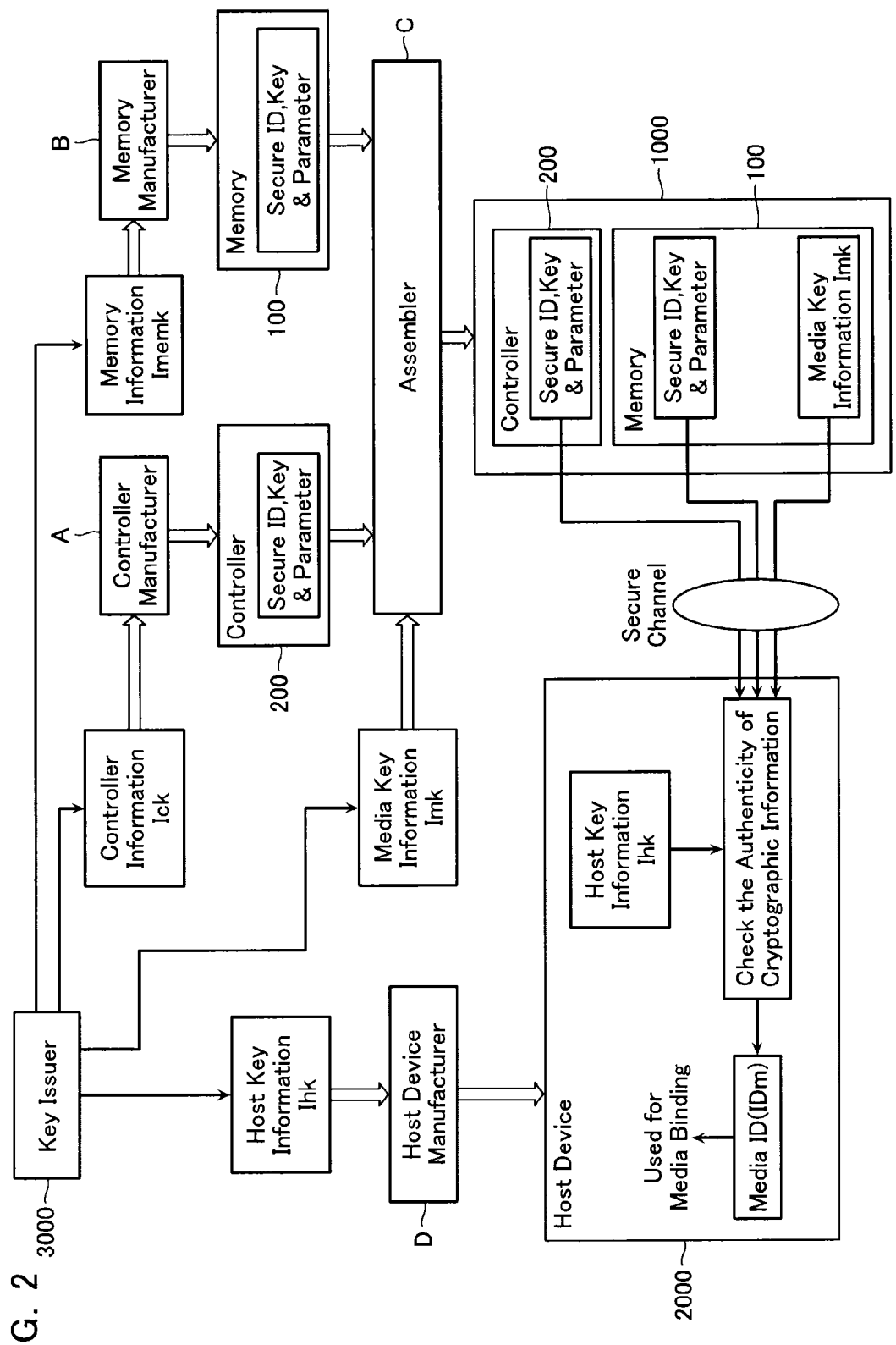
FIG. 2 explains the first embodiment (second content data protection technology)
Figure 3:
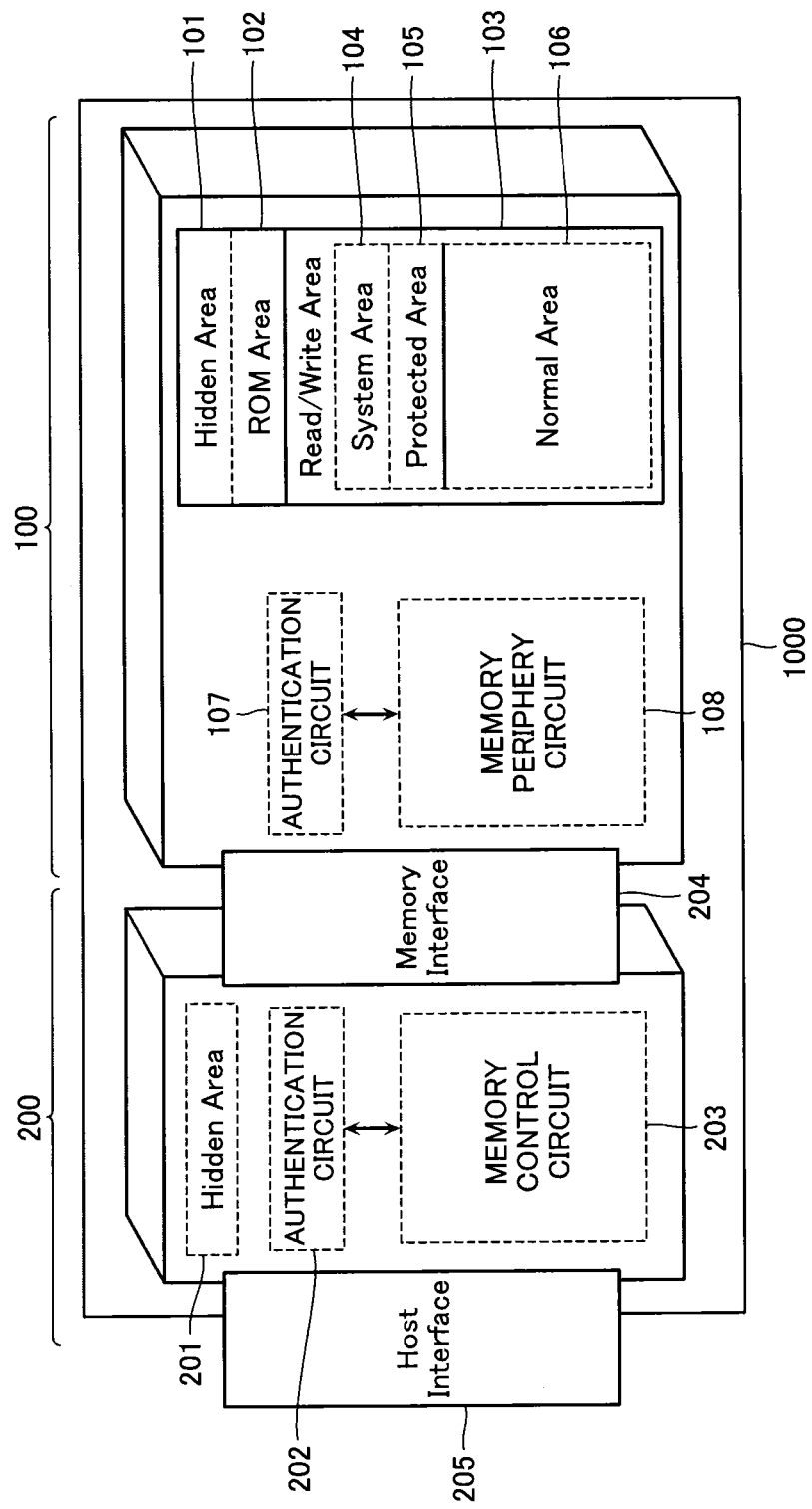
FIG. 3 illustrates a configuration example of the memory card 1000 according to the second content data protection technology.

The medium device key Kmd_i and the medium device key certificate Cert$_{media}$ to be written in the memory card 1000 are provided from the key issue/management center 3000 to the assembler C (the medium device key Kmd_i and the medium device key certificate Cert$_{media}$ are information constituting a mart of information corresponding to medium key information in FIG. 2). The assembler C combines the controller provided with the controller key Kc as peculiar information and the controller unique ID (IDcu) and the memory 100 to assemble the memory card 1000. Then, the assembler C encrypts and writes the medium device key Kmd_i in the memory 100 together with the medium device key certificate Cert$_{media}$ to manufacture the memory card 1000. In this case, the controller Kc and the controller unique ID (IDcu) assigned to the controller 200 are used for write the medium device key Kmd_i.

The medium device key Kmd_i and the medium device key certificate Cert$_{media}$ are written to the information recording area 104 in the memory 100 included in the memory card 1000, via controller 200. Although omitted in FIG. 4, the memory card 1000 is connected to a device having a certain communication function (for example, a personal computer, a mobile phone terminal, a public terminal, and the like). Through such a device with a communication function, data issued in the key issue/management center 3000 is written in the memory card 1000.

Note that the controller key Kc is assigned by the key issue/management center 3000 and provided to the controller manufacturer A. Alternatively, it is assigned by the controller manufacturer A, and is notified to the key issue/management center 3000. The controller unique ID (IDcu) is assigned to the controller manufacturer A. The controller unique ID (IDcu) is notified to the key issue/management center 3000 as required. Alternatively, the controller unique ID (IDcu) is assigned by the key issue/management center 3000 and is provided to the controller manufacturer A. Note that the controller Kc may be received and sent between the controller manufacturer A and the key issue/management center 3000 using PGP encryption.

The key issue/management center 3000 comprises a key generation unit 3002 for generating a medium device key Kmd_i and medium device key certificate Cert$_{media}$, a device key database 3001 for managing the generated medium device key Kmd_i and the medium device key certificate Cert$_{media}$, and encryption unit 3003 encrypting the medium device key Kmd_i using the controller key Kc received from the controller manufacturer A.

The control key Kc is used for encrypting the medium device key Kmd_i in the key issue/management center 3000. The medium device key Kmd_i is generated in the key generator 3002, and then stored in the device key database 3001. The encryption unit 3003 is supplied with the corresponding medium device key Kmd_i from the device key database 3001, and encrypts it using the controller key Kc to generate encrypted medium device key Enc (Kc, Kmd_i).

The controller key Kc is information that only the controller manufacturer A and the key issue/management center 3000 may acquire. However, to reduce a damage when information on the controller key Kc is leaked to external by accident or by a certain reason, it is desirable that different controller keys Kc(s) are used among different groups including a certain number of the controllers, for example in a unit of production lot.

Note that, in the key generator 3002 and the device key database 3001, not only the medium device key Kmd_i and the medium device key certificate Cert$_{media}$ for the memory card 1000 are generated and maintained, but also a host device key Khd_i or a host device certificate Cert$_{host}$ for the host device 2000 described later are generated and maintained in a similar way.

The assembler C is supplied with the controller 200 from the controller manufacturer A, and receives from the key issue/management center 3000 a medium device key encrypted for the controller 200 (encrypted medium device key Enc (Kc, Kmd_i)), and a medium device key certificate Cert$_{media}$ corresponding to the medium device key. In order to receive a desired encrypted medium device key Enc (Kc, Kmd_i), a model number of the controller 200 or a production lot number thereof may be provided. This allows the medium device key encrypted by a authentic controller key Kc to be received.

In the production process of the memory card 1000, the encrypted medium device key Enc (Kc, Kmd_i) is temporarily written in the buffer RAM (not shown) of the controller 200. Then, the controller 200 decodes the encrypted medium device key Enc (Kc, Kmd_i) using the controller key Kc held in its own decryptor 206. The medium device key Kmd_i is thereby provided in the controller 200.

On the other hand, the one-way converter 211 operates a one-way function using the controller key Kc and the controller unique ID (IDcu) held in the controller 200 as input values thereto to generate a controller unique key Kcu. The medium device key Kmd_i is encrypted in the encryptor 207 again using this newly generated controller unique key Kcu, thereby generating an encrypted medium device key Enc (Kcu, Kmd_i). This encrypted medium device key Enc (Kcu, Kmd_i) is stored in the system information recording area 104 of the memory 100 supplied by the memory manufacturer B. In this case, the medium device key certificate Cert$_{media}$ corresponding to the encrypted medium device key Enc (Kcu, Kmd_i) is stored in the system information recording area 104 in a similar manner.

The controller unique key (Kcu) is generated using the controller key Kc and the controller unique ID (IDcu) as peculiar information which are secretly stored in the controller 200 and are provided with means for preventing reading or changing by the external of the controller. Accordingly, a risk of information necessary for decrypting the encrypted medium device key Enc (Kcu, Kmd_i) being leaked to external is small. It is extremely difficult to falsely perform re-encryption of the medium device key Kmd_i (after decryption by the original controller unique key Kcu1, encrypting it with another controller unique key Kcu2) in order that the encrypted medium device key Enc (Kcu, Kmd_i) once written in the memory 100 is made available in a separate controller 200.

In the second embodiment, a one-way function is used for generating the controller unique key Kcu from the controller key Kc and the controller unique ID (IDcu). However, it is possible to employ a function that can generate one piece of output data from two pieces of input data. The function is not limited to a one-way function. For example, it is possible to generate the controller unique key Kcu using an AES (Advanced Encryption Standard) encryptor or the like.

The memory card 1000 is manufactured by the procedures explained above. An authentication method and an information recording/reproduction system using the memory card 1000 manufactured by the method will be explained hereinbelow.

<System Configuration>

Figure 5:
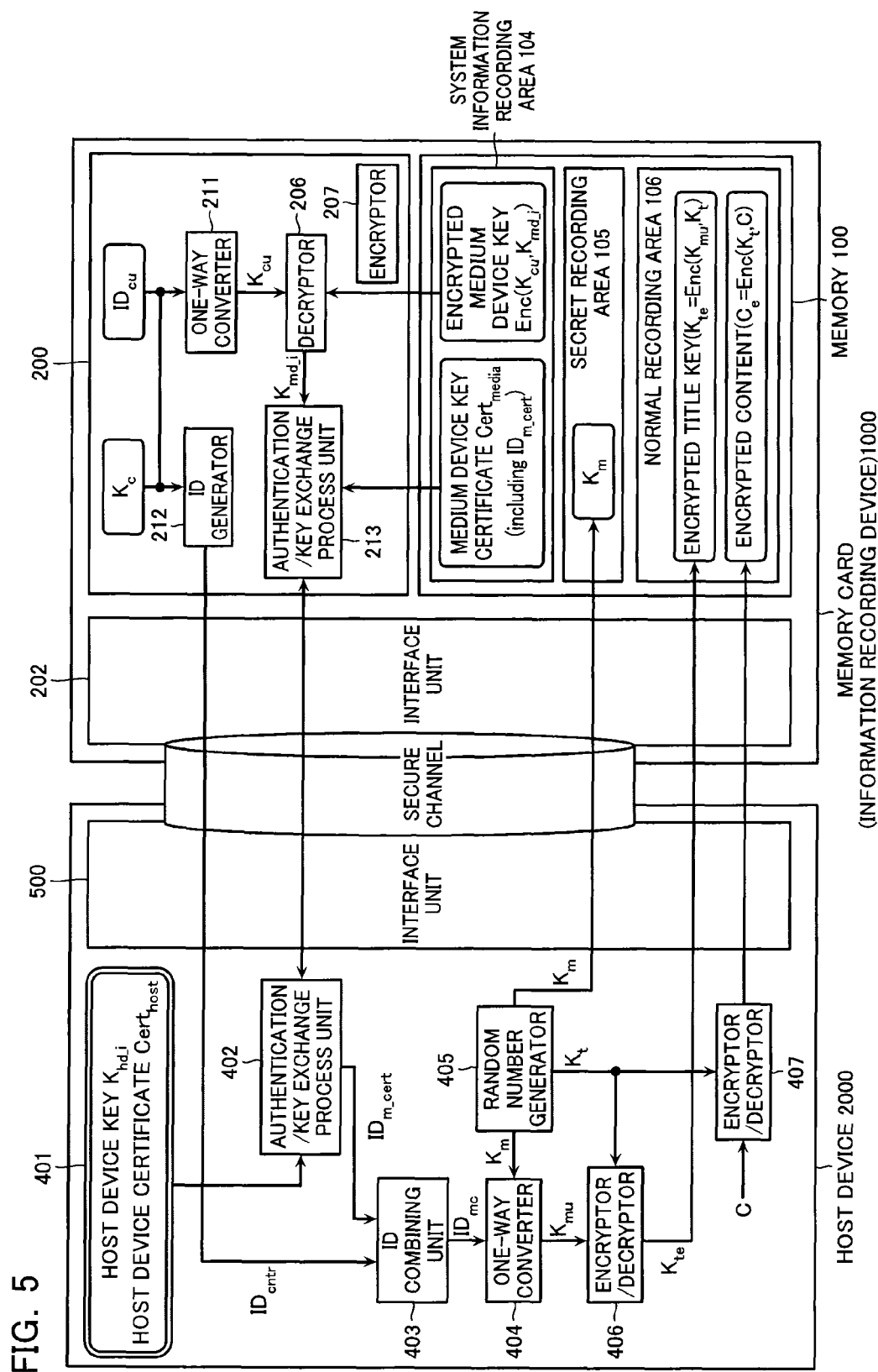
FIG. 5 explains an overall structure and an operation of the information reproduction/recording system according to the second embodiment.

Referring now to FIG. 5, the entire structure and the operation of the information recording/reproduction system according to the first embodiment will be described.

As noted above, the memory card 1000 is provided with the encrypted medium device key Enc (Kcu, Kmd_i) and the medium device key certificate Cert$_{media}$. Such the memory card 1000 is connected to the host device 2000, as shown in FIG. 5. This allows the memory card 1000 to be written with the content data C provided from the host device 2000, or to output the fetched content data C to the host device 2000, as shown in FIG. 5. The memory card 1000 and the host device 2000 together form an information recording/reproduction system.

Here, a structure of the host device 2000 will be described. The host device 2000 comprises a holding unit 401, an authentication/key exchange process unit 402, an ID combining unit 403, a one-way converter 404, a random number generator 405, an encryptor/decryptor 406, and an encryptor/decryptor 407.

The holding unit 401 stores above-described host device key Khd_j and a host device certificate Cert$_{host}$. The host device key Khd_j is a private key of the public key cryptosystem, and the host device certificate Cert$_{host}$ is data including a public key that forms a pair with the host device key Khd_j.

The authentication/key exchange process unit 402 has a function of performing an authentication/key exchange process with the authentication/key exchange process unit 213 of the memory card 1000, through an interface unit 500, 202 and a secure channel to output a medium device key certificate ID (IDm_cert). In addition, the ID combining unit 403 is configured to generate a memory card unique ID (IDmc) based on the public controller unique ID (IDcntr) and the medium device key certificate ID (IDm_cert).

Note that the public controller unique ID (IDcntr) has a value different from that of the controller unique ID (IDcu). It is a value generated by the ID generator 212 using the controller key Kc and the controller unique ID (IDcu). As a method of generating it in the ID generator 212, a method using a one-way function can be exemplified. The method may use other functions, as far as one piece of output data may be generated from two pieces of input data. The functions are not specifically limited to a one-way function.

This ID combining unit 403 functions as an identification information generating unit for generating a memory card unique ID (IDmc) based on the controller unique ID (IDcntr)

and the medium device key certificate ID (IDm_cert). This ID combining unit 403 merely couples two IDs to generate another new ID. In place of such a simple combination, it is possible to generate a new ID using a one-way function or a cryptographic algorithm, for example.

The one-way converter 404 generates medium unique key Kmu using a one-way function, to which the memory card unique ID (IDmc) and a medium key Km generated at the random number generator 405 are input. The random number generator 405 generates a random number, and generates the medium key Km and a title key Kt based on the acquired random number. The encryptor/decryptor 406 encrypts the title key Kt by the above-mentioned medium unique key Kmu. In addition, the encryptor/decryptor 407 encrypts the content data C by the title key Kt (to obtain encrypted content data Enc (Kt, C)).

Note that, in the present embodiment, the medium unique key Kmu is generated by the host device 2000, and the medium unique key Kmu is used as an encryption key for encrypting the title key Kt. Similarly to the conventional content data protection technology, it is also possible to employ a scheme in which a medium unique key Kmu stored in the secret recording area 105 is directly used for encrypting the content data C. Also, a double encryption key scheme is also available in which a user key Ku unique to a user is encrypted by a medium unique key Kmu, a content key Kct is encrypted by the user key Ku, and further content data is encrypted by the content key Kct. In addition, not only the medium key Km and the title key Kt may be generated in a host device, they may be written in the memory card 1000 in advance, or may be provided from an external device (not shown).

<Method of Writing Content Data>

Next, an operation when content data C is written to the memory card 1000 from the host device 2000 will be described with reference to FIG. 5. First, the memory card 1000 generates the controller unique key Kcu from the controller key Kc and the controller unique ID (IDcu) using the one-way converter 211. Then, the encrypted medium device key Enc (Kcu, Kmd_i) is decoded using this controller unique key Kcu, thereby the medium device key Kmd_i being obtained. The medium device key Kmd_i and the medium device key certificate $Cert_{media}$ are transferred to the authentication/key exchange process unit 213.

On the other hand, the host device 2000 transfers the host device key Khd_j and the host device certificate $Cert_{host}$ to the authentication/key exchange process unit 402. The authentication/key exchange process is thereby performed in the authentication/key exchange process unit 213 and 402. When the process is completed, a secure channel is established between the memory card 1000 and the host device 2000. When secure channel is established, the ID generator 212 may output a public controller unique ID (IDcntr) which was generated by itself through the interface unit 200 and 502 and through a secure channel. The authentication/key exchange process will be explained using FIG. 8.

When a secure channel is established, the ID generator 403 couples the public controller unique ID (IDcntr) and the medium device key certificate ID (IDm_cert) to generate the memory card unique ID (IDmc).

The host device 2000 generates the medium key (Km) using the random number generator 405, and stores the generated medium key Km in the secret recording area 105 of the memory card 1000 via the secure channel and the interface units 500 and 202.

The host device 2000 generates the medium unique key Kmu from the medium key Km and the memory card unique ID (IDmc) using the one-way converter 404.

The host device 2000 generates the title key Kt using the random number generator 405, and the title key Kt is further encrypted by the medium unique key Kmu using the encryptor/decryptor 406. The encrypted title key Kte=Enc (Kmu, Kt) is stored in the normal recording area 106 of the memory card 100.

The host device 2000 encrypts the content data C using the title key Kt, and the encrypted content data Ce=Enc (Kt, C) is stored in the normal recording area 106 of the memory card 1000. With the above-described processes, a record operation of the content data C is completed.

<Method of Reading Content Data>

Figure 6:
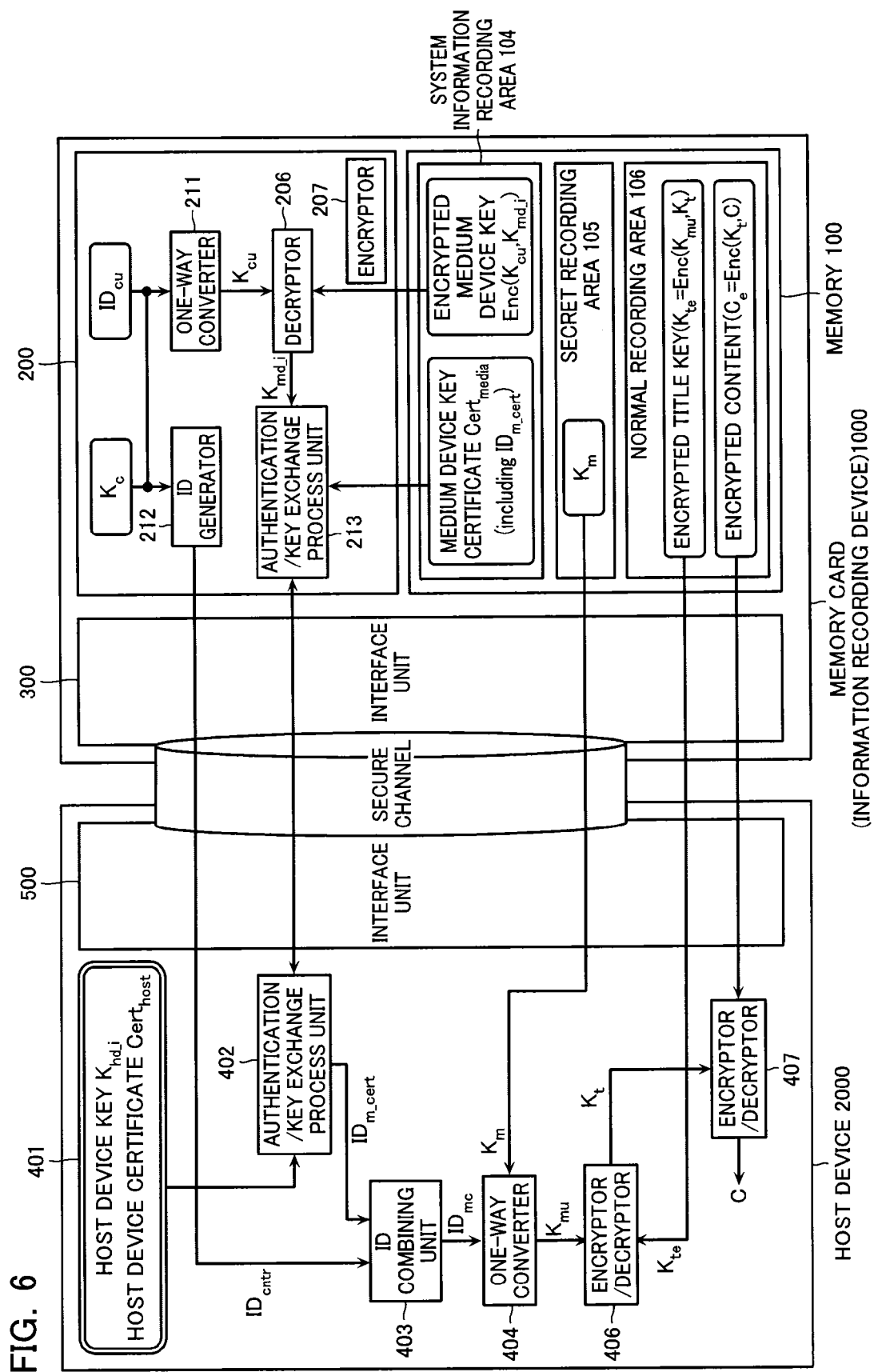
FIG. 6 explains an operation when content data C is read from the memory card 1000 to the host device 2000 in the second embodiment.

Next, an operation when the content data C is read from the memory card 1000 to the host device 2000 will be described with reference to FIG. 6. The authentication/key exchange process in the authentication/key exchange process units 213 and 402, and the operation in the ID combining unit 403 are generally the same as in the write operation (FIG. 5).

When the authentication/key exchange process is completed, and thereby a secure channel is established, an access to the secret recording area 105 and the system information recording area 104 is enabled (that is, designation of a logic address of the secret recording area 105 and the system information recording area 104 becomes possible). In addition, the medium key Km stored in the secret recording area 105 of the memory card 1000 is provided to the one-way converter 404 of the host device 2000 through the secure channel. The one-way converter 404 generates the medium unique key Kmu using this medium key Km and the above-mentioned memory card unique ID (IDmc). The encryptor/decryptor 406 decodes the encrypted title key Enc (Kmu, Kt) stored in the memory card 1000 using this medium unique key Kmu, thereby the title key Kt being obtained. Then, the encryptor/decryptor 407 decrypts the encrypted content data Enc (Kt, C) stored in the memory card 100 using the provided title key Kt, thereby the content data C being obtained.

As explained above, in this embodiment, the medium device key Kmd_i and the medium device key certificate $Cert_{media}$ in accordance with the public key cryptosystem are used for the authentication/key exchange process. However, the controller unique ID (IDcntr) is generated based on the controller key Kc of the controller 200 and the controller unique ID (IDcu), and is supplied to the host device 2000 through a secure channel. Because it is transmitted through the secure channel, the controller unique ID (IDcntr) does not leak to outside, and the falsification is prevented.

Also, based on this controller unique ID (IDcntr) and the medium device key certificate ID (IDm_cert), the memory card unique ID (IDmc) is generated by the ID combining unit 403. Based on this memory card unique ID (IDmc), the medium unique key Kmu of the memory 100 in the memory card 1000 is generated. Thus, according to the present embodiment, even when an authentication/key exchange using the public key cryptosystem is processed, the controller unique ID (IDcntr) unique to the controller 200 can be interrelated with a pair of a public key and a private key, thereby spread of clone cards can be prevented.

[Third Embodiment]

Figure 7:
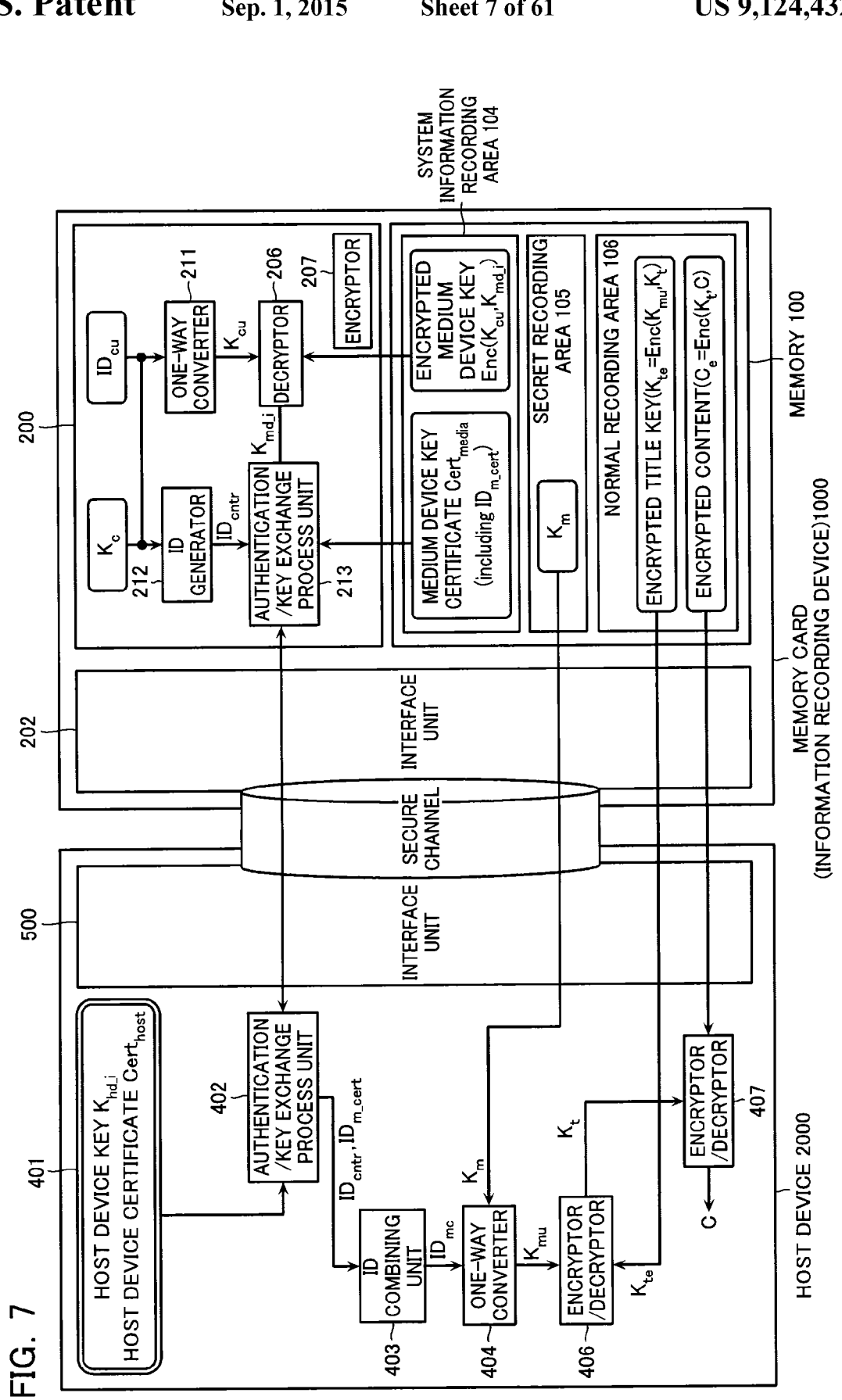
FIG. 7 is a block diagram illustrating a structure of the information recording/reproduction system according to the third embodiment.

FIG. 7 is a block diagram showing the structure of the information recording/reproduction system according to the third embodiment. Since the hardware structure of the memory card 1000 may be similar to those shown in FIG. 3, the explanation thereof is omitted hereinbelow. In this embodiment, as shown in FIG. 7, the operation of the authentication/key exchange process unit 213 is different. That is, with regard to the authentication/key exchange process unit 213 here, the public controller unique ID (IDcntr) generated in the ID generator 212 is not directly sent to the host device 2000, but is sent to the authentication/key exchange process unit 213 in the controller 200. Then, the public controller unique ID (IDcntr) is used as one of the parameters of the authentication/key exchange process.

When the authentication/key exchange process is completed, the public controller unique ID (IDcntr) is transmitted to the ID combining unit 403 with the medium device key certificate ID (IDm_cert). The operation thereafter is generally the same as the second embodiment.

Figure 8:
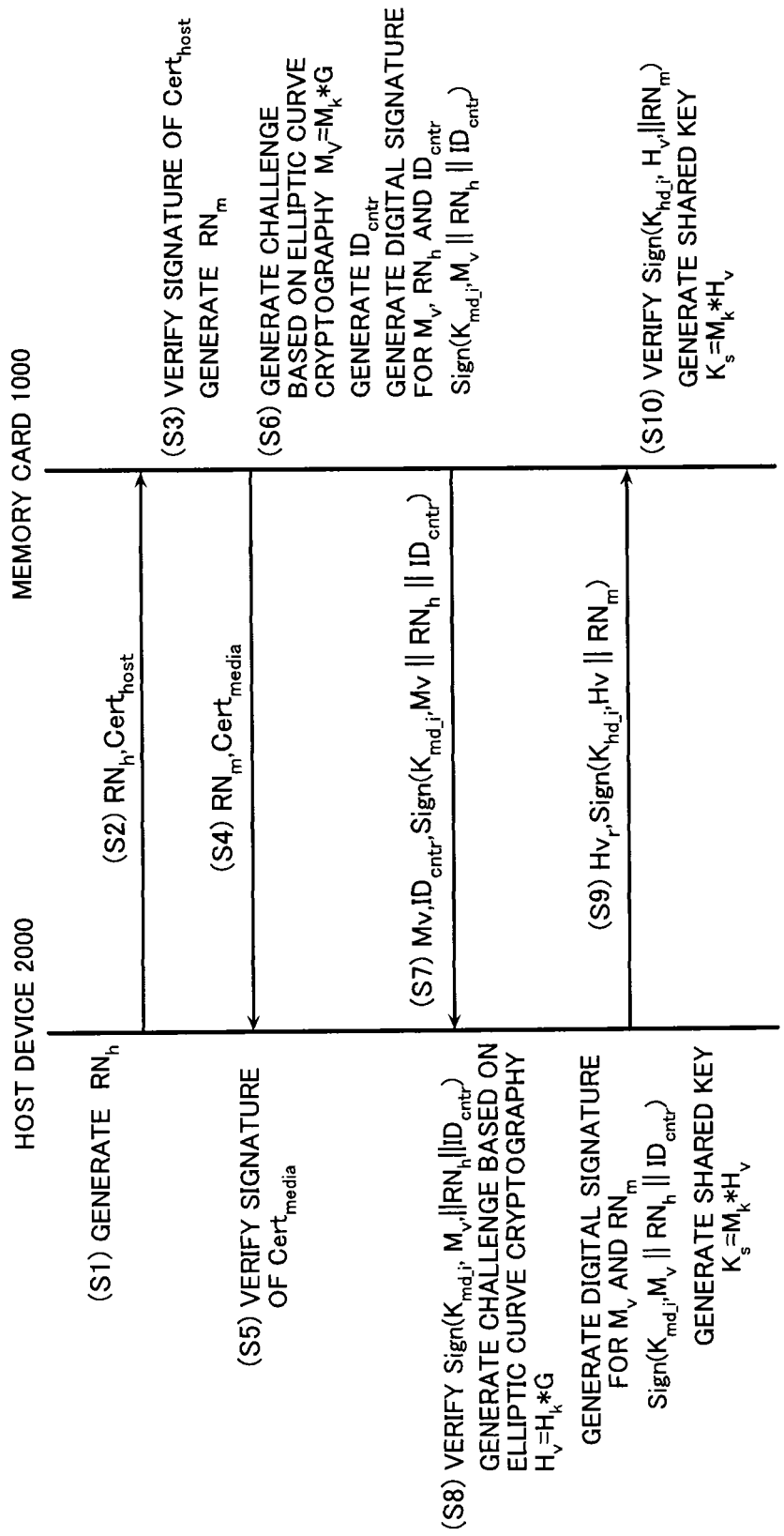
FIG. 8 explains steps in an operation when a standard authentication key exchange based on elliptic curve cryptography is used.

FIG. 8 describes procedures of an operation when a standard authentication/key exchange based on elliptic curve cryptography is used.

The host device generates a random number RNh (step S1), and transfers it to the memory card 1000 with the host device certificate $Cert_{host}$ (step S2). The memory card 1000 verifies a digital signature contained in the received host device certificate $Cert_{host}$, and generates a random number RNm (step S3).

Subsequently, the memory card 1000 sends the random number RNm and the medium device key certificate ($Cert_{media}$) to the host device (step S4). In response to this, the host device 2000 verifies a digital signature contained in the received medium device key certificate $Cert_{media}$. In time with step S4, the memory card 1000 generates a random number Mk necessary for Diffie-Hellman key exchange process in the elliptic curve cryptography. It also calculates a value for challenge Mv (=Mk*G) using a base point G of the elliptic curve. The public controller unique ID (IDcntr) is generated in the ID generator 212. In addition, using the medium device key Kmd_i, a digital signature for the value for challenge Mv, the random number RNh received in step S2 and the controller unique ID (IDcntr) is generated (step S6). The memory card 1000 sends the value for challenge Mv generated in step S6, the controller unique ID (IDcntr) and the digital signature generated in step S6 to the host device 2000 (step S7).

The host device 2000 verifies the signature received in step S7, generates a random number Hk necessary for Diffie-Hellman key exchange process in the elliptic curve cryptography, and calculates a value for challenge Hv (=Hk*G) using a base point G of the elliptic curve. Then, it generates a digital signature for the value for challenge Hv and the random number RNm received in step S4, using the host device key Khd_j, and calculates a shared key Ks (=Hk*Mv) shared by the authentication/key exchange process (step S8).

The host device 2000 sends the value for challenge Hv generated in step S8 and the digital signature to the memory card 1000 (step S9). In response to this, the memory card 1000 verifies the digital signature received in step S9, and calculates the shared Key Ks (=Mk*Hv).

When the signature cannot be inspected properly in the digital signature verification process in the above-described processes, the processes thereafter are aborted in any of the steps.

By performing the above-mentioned authentication/key exchange process, the memory card can share a shared key with the host device secretly. In the authentication/key exchange process, the shared Key is calculated using challenges generated by the host device and the memory card. Accordingly, the values of the shared key are different among different authentication/key exchange processes.

In the above-described embodiment, a public controller unique ID (IDcntr) is generated based on a pair of a controller key Kc and a controller unique ID (IDcntr) in the ID generator 212. However, instead of this, the public controller unique ID (IDcntr) may be generated based on the controller unique ID (IDcu) only. As long as the controller 200 may generate other peculiar information that may be disclosed to external while keeping the controller unique ID (IDcu) hidden therein in a secret state, parameters user here may be anything. However, a function used for generation need to be irreversible one such as a one-way function. That is, it is necessary to select a function with which the original controller unique ID (IDcu) cannot be obtained by performing a reverse calculation based on the acquired public controller unique ID (IDcntr).

[Fourth Embodiment]

Next, with reference to FIG. 9, an authenticator, an authenticatee, and an authentication method according to a fourth embodiment will be described. In this embodiment, there is shown an example where secret information Nkey as peculiar information and secret identification information SecretID are given from the memory manufacturer B to the memory 100 only. However, as explained in the first embodiment, according to the above-mentioned second and third embodiments, it is possible that this embodiment may be combined with an example where the controller manufacturer A stores the peculiar information in the controller 200.

<1. Configuration Example (Memory System)>

A configuration example of a memory system according to the fourth embodiment will be described with reference to FIG. 9.

Figure 9:
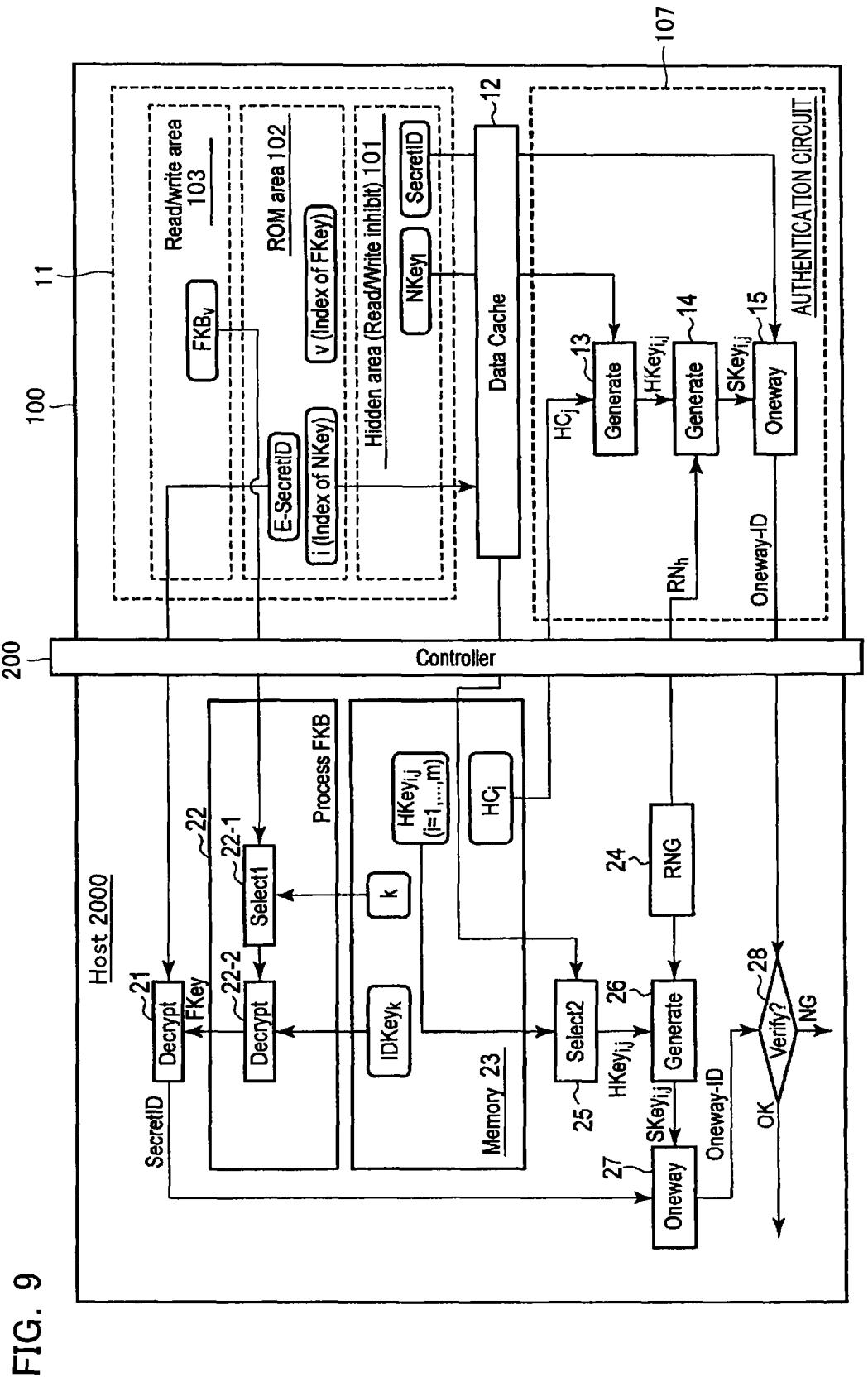
FIG. 9 shows a block diagram illustrating a configuration example of the memory system according to the fourth embodiment.

FIG. 9 illustrates a state after the secret information Nkey and the secret identification information SecretID have been given from the memory manufacturer B to the memory 100. In this embodiment, there is shown an example where the memory 100 is a NAND type flash memory as an example. Here, the uniqueness of the secret information Nkey and the secret identification information SecretID may be determined in any way. For example, it is possible that each memory 100 has secret information NKey with a unique value. Alternatively, each lot of the memories 100 may have secret information Nkey with a unique value. Or each manufacturer of the memory 100 may have secret information Nkey with a unique value. In addition, it is possible that each memory 100 has secret identification information SecretID with a unique value. Alternatively, each lot of the memories 100 may have secret identification information SecretID with a unique value. Or each manufacturer of the memory 100 may have secret information Nkey with a unique value.

Although the granularity of the uniqueness may be selected as required, it is preferable that at least either one of the secret information NKey or the secret identification SecretID has unique values for different memories 100.

As shown in the figure, the memory system according to the fourth embodiment includes a NAND flash memory 100 as an authenticatee, a host device 2000 as an authenticator, and a controller 200 mediating therebetween. The host device 2000 accesses the NAND flash memory 100 via the controller 200.

Here, a manufacturing process of a semiconductor product such as the NAND flash memory 100 will briefly be described. The manufacturing process of a semiconductor product can mainly divided into a preprocess to form a circuit on a substrate wafer and a postprocess to cut the wafer to individual pieces and then to perform wiring and packaging a piece in a resin.

The controller 200 is configured in various ways such being configured to be included in the NAND flash memory 100 in the preprocess, configured to be included in the same package in the postprocess, though not included in the preprocess, and provided as a different chip from the NAND flash memory 10. The description below including FIG. 9 is provided by taking a case when the controller 200 is provided as a different chip from the NAND flash memory 100 as an example. The controller 200 and the NAND flash memory 100 are packaged in a shape of a card (a memory card 1000), as shown in FIG. 3, for example. However, they are not limited to this form.

If not mentioned specifically below, the controller 200 mediates between the host device 2000 and the NAND flash memory 100 in many cases to exchange data and instructions therebetween. Even in such a case, the controller 200 does not change intrinsic content of the above data and instructions and thus, details may be provided below as an abbreviated description. Details of configuration examples of the NAND flash memory 100 and the controller 200 will be provided later.

Furthermore, if the host device 2000 is configured as dedicated hardware like a consumer device, it is possible to assume not only a case where the device is configured by combining dedicated hardware with firmware, but also a case where all functions of the device are realized by software operating in a PC. The present embodiment can basically be applied regardless of which configuration the host device 2000 adopts.

Each component and data processing shown in FIG. 9 will be described below. The present embodiment shows the method of reading secret identification information SecretID recorded in an authenticatee in a state hidden from third parties and also verifying that the data has been read from an authentic authenticatee and a configuration example when the method is applied to a memory system using the NAND flash memory 10.

1-1. NAND Flash Memory

In the present embodiment, the NAND flash memory 100 is an authenticatee.

As shown in the figure, the NAND flash memory 100 according to the present embodiment includes a cell array (Cell array) 11, a data cache (Data Cache) 12 disposed in a peripheral area of the cell array 11, data generators (Generate) 13, 14, and a one-way converter (Oneway) 15. The data generators (Generate) 13, 14 and the one-way converter (Oneway) 15 constitute an authentication circuit 107.

The cell array 11 includes: a hidden area (Hidden area) 101 where both reading and writing to/from external are inhibited; a ROM area (ROM area) 102 where writing from external is inhibited; a read/write area (Read/Write area) 103 where both reading and writing to/from external are permitted, and the like.

The read/write area (normal area) 103 is an area into which data can be written from outside of the NAND flash memory 10 and data can be read to outside of the NAND flash memory 10. In the read/write area 103, key management information FKBv (Family Key Block) that is an encrypted FKey bundle prepared to hide FKeyv is stored. In contrast to other data recorded in the NAND flash memory 10, key management information FKBv may be recorded not only when the NAND flash memory 100 is fabricated, but also when the storage medium for general users such as an SD card is fabricated by coupling the controller and the NAND flash memory 100. Alternatively, the key management information FKBv may be downloaded from a server and recorded in accordance with a user's request after the sales of the storage medium. Details thereof will be described below.

The key management information FKBv is information used to decrypt hidden information FKeyv based on secret information IDKeyk held by the host device 2000 and index information k of the secret information IDKeyk, or information used to decrypt hidden information FKeyv based on secret information IDKeyk held by the host device 2000 and identification information of the host device 2000.

The key management information FKBv may be information prepared uniquely for each of the NAND flash memories 10. Not only that, it may be information that can be commonly attached to (can be associated with) a plurality of the NAND flash memories 10 such as production lot unit or wafer unit of the NAND flash memories 10 in accordance with the manufacturing process. Index information v of the key management information FKBv may be identification information or version number information of the key management information FKBv.

The hidden area 101 is an area inhibited from both reading and writing into/from outside the NAND flash memory 10. In the hidden area 101, secret information NKeyi used by the NAND flash memory 100 for an authentication process and secret identification information SecretID of the NAND flash memory 100 are recorded.

The ROM area 102 is an area inhibited from writing from outside the NAND flash memory 10, but is permitted to read data therefrom. In the ROM area 102, index information v (index of FKey) to indicate hidden information FKeyv hidden by the key management information FKBv, secret identification information (SecretID) encrypted by the hidden information FKeyv (E-SecretID), and index information i (index of NKey) to indicate the secret information NKeyi are recorded.

In the present embodiment, data is generally recorded after an error correction code is attached so that, even if an error occurs in data when the index information i or the index information v is recorded, correct identification information can be read. However, to simplify the description, error correction encoding and decoding processes are not specifically illustrated.

Incidentally, the ROM area 102 may be, for example, an OTP (One Time Program) area into which data is permitted to write only once or an normal area permitted to read and write into in the manufacturing process of the NAND flash memory 100 before being converted into a read-only area by rewriting a management flag after shipment. Alternatively, a method may be used in which a write command for the area is set as a specific command different from a command for a normal area, and this specific command is not provided to the recipient of the NAND flash memory 100.

In addition, it is also possible to employ a configuration in which the controller 200 limits functions provided to the host device 2000 to reading only, although the area is dealt as a normal area in the NAND flash memory 100.

As will be described below, information recorded in the ROM area 102 is associated with information recorded in the hidden area 101. Accordingly, if information recorded in the ROM area 102 is tampered with, the authentication function of the NAND flash memory 100 cannot be made to work effectively. Therefore, there is no concern about security due to tampering. Accordingly, it is not necessary to prepare the ROM area 102, and to ROM area 102 may be replaced with an normal area in which the reading and writing data is permitted.

In such a case, the ROM area 102 in the figure may be replaced with the read/write area (normal area) 103. In this connection, a portion of data recorded in the ROM area 102 may be recorded in the read/write area (normal area) 103. For example, a configuration in which index information v (index of FKey) is recorded in the read/write area (normal area) and encrypted secret identification information (E-SecretID) and index information v (index of FKey) are recorded in the ROM area 102 is possible. The above configuration examples of the ROM area 102 are also applicable to the ROM area 102 described herein as other embodiments or modifications below.

The encrypted secret identification information E-SecretID is data obtained by encrypting secret identification information SecretID attached uniquely to each of the NAND flash memories 100 using the hidden information FKeyv. Alternatively, for a purpose of pre-recorded content distribution in which content data is recorded in NAND flash memories in advance and is set on sale, the same content data is recorded in NAND flash memories in advance. In this case, the same E-SecretID is recorded in the NAND flash memories storing the content data. In this case, for example, the same encrypted secret identification information maybe stored in plural NAND flash memories.

The data cache 12 temporarily stores data read from the memory (cell array) 11.

The data generators 13, 14 are circuits that generate output data by performing a preset operation based on a plurality of pieces of input data.

The data generator 13 generates secret information HKeyi,j by converting a constant HCj received from the host device 2000 using the above-described secret information NKeyi. The data generator 14 generates a session key SKeyi,j by converting a random number RNh received from the host device 2000 using the secret information HKeyi,j. The data generators 13 and 14 can be implemented as hardware (circuit), software, or a combination of hardware and software.

If the data generators 13 and 14 are implemented as circuits, the same circuit as the one-way converter 15 described below, a circuit diverting the one-way converter, or an Advanced Encryption Standard (AES) encryptor can be used to make the circuit size smaller as a whole. Similarly, the two data generators, which are illustrated as different component so that the data processing procedure may be understood easily, may be formed by repeatedly forming the same circuits. In this example, a configuration of HKeyi,j=AES_E (NKeyi, HCj), SKeyi,j=AES_E (HKeyi,j, RNh) and the like can be adopted.

The one-way converter 15 performs a one-way conversion on input data and key data input separately to output one-way converted input data. The one-way converter 15 can be implemented as hardware (circuit), software, or a combination of hardware and software.

The one-way converter 15 converts the SecretID read from the hidden area 101 by a one-way function using the session key SKeyi,j generated by the data generator 14 to generate one-way conversion identification information Oneway-ID (=Oneway(SKeyi,j, SecretID)). If the one-way converter 15 is implemented as a hardware circuit, it is possible that the data generator 14 or the like is diverted to be used as a one-way converter 15, to make the circuit size smaller as a whole, as described above. In this example, a configuration like Oneway-ID=AES_E(SKeyi,j, SecretID)(+)SecretID can be adopted.

Though not shown, an output unit to output data to the host device 2000 via the controller 200 and like are actually arranged as structural elements.

1-2. Host Device

In the present embodiment, the host device 2000 is an authenticator.

As shown in the figure, the host device (host) 2000 according to the present embodiment includes a decrypter (Decrypt) 21, an FKB processor (Process FKB) 22, a memory (Memory) 23, a random number generator (RNG) 24, a selector (Select 2) 25, a data generator (Generate) 26, a one-way converter (Oneway) 27, and a data verification unit (Verify) 28. In addition, for example, an error correction processing unit and the like may be included if necessary.

The decrypter 21 decrypts input data by using key data input separately to output decrypted input data. In the present embodiment, the decrypter 21 reads the encrypted secret identification information E-SecretID from the NAND flash memory 100 via the controller 200. Then, the decrypter 21 decrypts the encrypted secret identification information E-SecretID using hidden information FKey input from the FKB processor 22 (data selector 22-1) described below to output secret identification information Secret ID.

The FKB processor 22 decrypts key management information FKBv read from the NAND flash memory 100 by using secret information IDKeyk and index information k of the IDKeyk hidden in the memory 23 to output generated hidden information FKey to the decrypter 21. In the present embodiment, the FKB processor 22 includes a data selector (Select 1) 22-1 and a decrypter (Decrypt) 22-2.

The data selector 22-1 in the first stage selects data that can be decrypted by IDKeyk hidden in the memory 23 by using index information k recorded in the memory 23 from among an encrypted FKey bundle (key management information FKBv) read from the NAND flash memory 100 to output the selected data to the decrypter 22-2.

The decrypter 22-2 decrypts data selected by the data selector 22-1 by using the secret information IDKeyk hidden in the memory 23 to output generated hidden information FKey to the decrypter 21.

The memory 23 records index information k, secret information IDKeyk, set of secret information HKeyi,j (i=1, ..., m; j is a fixed value for HKeyi,j), and a constant HCj. It hides at least the secret information IDKeyk and set of secret information HKeyi,j (i=1, ..., m) from outside the host device 2000. The constant HCj is a constant held in the host device 2000 in advance to be sent to the NAND flash memory 100 when authentication is requested (Request authentication). Details thereof will be described below.

The random number generator 24 generates and outputs a random number RNh used for an authentication process.

The data selector 25 in the second stage selects HKeyi,j needed for the authentication process from the set of secret information HKeyi,j hidden by the host device 2000 using index information i read from the ROM area 102 of the NAND flash memory 100 via the data cache 12.

The data generator 26 is an operation unit that generates output data by performing a predetermined operation on a plurality of pieces of input data. In the present embodiment, the data generator 26 generates a session key SKeyi,j by converting the random number RNh generated by the host device 2000 using the secret information HKeyi,j hidden by the host device 2000. As the data generator 26, for example, the above-described AES encryptor may be used.

The one-way converter 27 converts the secret identification information SecretID output from the decrypter 21 by a one-way function using the session key SKeyi,j output from the data generator 26 to generate one-way conversion identification information Oneway-ID.

The data verification unit 28 compares the one-way conversion identification information Oneway-ID received from the NAND flash memory 100 and one-way conversion identification information Oneway-ID obtained from the one-way converter 27 in the host device 2000 to see whether both Oneway-IDs match. If both values of the one-way conversion identification information Oneway-ID match (OK), the data verification unit 28 judges that secret identification information SecretID obtained by the decrypter 21 is an authentic ID and delivers the obtained secret identification information SecretID to subsequent processes. On the other hand, if both values thereof do not match (NG), the data verification unit 28 judges that the secret identification information SecretID is an unlawful ID and outputs a message to that effect.

In addition, as means for revoking an unlawful host device when secret information held by the host device 2000, for example, IDKeyk and HKeyi,j are leaked and the unlawful host device having the leaked information is produced by an illegal manufacturer, countermeasures such as removing information from the key management information (FKBv) with which FKey can be derived from IDKeyk held by the unlawful host device. The countermeasures will be described below in connection with the description with reference to FIG. 11. When taking the countermeasures, it is useful to provide association among IDKeyk, k, HKeyi,j, and HCj. This is because if there is such association, both of secret information IDKeyk and HKeyi,j held by the unlawful host device can be identified by observing HCj notified by the unlawful host device for authentication. Sharing information of all or a portion of HCj with IDKeyk, configuring information of all or a portion of HCj based on a result of an encryption process of IDKeyk, and configuring information of all or a portion of IDKeyk based on a result of an encryption process of HCj can be adopted as methods of association. Further, it is desirable to use HKeyi,j, in addition to FKey and IDKeyk to generate key management information FKBv. This will be described below in a paragraph in which a configuration example of FKB is described.

If the host device 2000 is a dedicated hardware device like a consumer device, the secret information IDKeyk and secret information HKeyi,j are recorded, for example, after being encrypted by a method specific to the manufacturer in an internal dedicated memory.

If the host device 2000 is a program executed in a PC or the like, the secret information IDKeyk and secret information HKeyi,j are held in a state that can be protected from an unlawful analysis by tamper resistant software (TRS) technology. If the security module is contained in the host device 2000, the secret information IDKeyk and secret information HKeyi,j are recorded in a state after measures to hide the secret information being taken by using the function of a security module.

The controller (Controller) 19 performs data transfer with the host device 2000 by controlling the NAND flash memory 100. For example, the controller 200 interprets an instruction received from the host device 2000 and converts the instruction into an instruction conforming to the interface specifications of the NAND flash memory 100, and then sends out the instruction to the NAND flash memory 100. The controller 200 can adopt various interface standards such as the SD Memory standard, SDIO standard, and eMMC standard if necessary.

The controller 200 secures a portion of the normal area 103 to store control data needed for the operation of the controller 200. The controller 200 may have a function to convert a logical address received from the host device 2000 into a physical address of the NAND flash memory. The controller 200 may also have a function to perform the so-called wear leveling to make exhaustion of the cell array 11 uniform. However, at least the hidden area 101 is excluded from wear leveling.

The configuration example of the memory system is not limited to the one described above. For example, an error correction processing unit (not shown) and other structural elements may be included if necessary. Further, there may be a plurality of pieces of secret information NKeyi held by the NAND flash memory 100. That is, if a combination of NKeyi and index information i corresponding thereto is defined as a slot, a plurality of slots are recorded in the NAND flash memory 10. A slot number is attached to each of the slots and the host device 2000 reads index information i of each slot number and selects one of the slots to perform authentication.

In this case, the host device 2000 notifies the NAND flash memory 100 of information corresponding to the selected slot number and the NAND flash memory 100 executes an authentication process by using information corresponding to the notified slot number. Further, all information held in the NAND flash memory 100 may be defined as one slot, and a plurality of information slots may be prepared. That is, secret information NKeyi, index information i, key management information FKBv, index information v, secret identification information SecretID, and encrypted secret identification information E-SecretID are defined as one slot, and a plurality of slots are recorded in the NAND flash memory 10. A slot number is attached to each of the slots and the host device 2000 reads index information i of each slot number and selects one of the slots to perform authentication. In this case, the host device 2000 notifies the NAND flash memory 100 of information corresponding to the selected slot number and the NAND flash memory 100 executes an authentication process by using information corresponding to the notified slot number.

The method by which the NAND flash memory 100 has a plurality of slots is shown above, but the method is not limited to the above one and any configuration sharing a portion of information by a plurality of slots can be adopted. For example, secret identification information SecretID, encrypted secret identification information E-SecretID, key management information FKBv, and index information v may be shared by a plurality of slots while other information being individually held by each slot.

The method by which the NAND flash memory 100 has a plurality of slots and slot numbers and which slot to use for authentication is notified by the host device 2000 is applicable to all other embodiments described herein below.

<2. Authentication Flow>

Next, the authentication flow of a memory system according to the first embodiment will be described with reference to FIG. 10.

(Step S11)

When the authentication is started (Start), the host device 2000 reads an encrypted FKey bundle (FKB: Family Key Block), which is key management information, and encrypted secret identification information SecretID (E-SecretID) from the NAND flash memory 100.

(Step S12)

Subsequently, the host device 2000 executes a data selection process by the data selector (Select 1) 22-1 based on the read key management information FKB to read encrypted hidden information FKey that can be decrypted by the host device 2000. The host device 2000 also obtains hidden information FKey by decrypting the encrypted hidden information FKey by the decrypter 22-2 using hidden secret information IDKeyk. Further, the host device 2000 obtains secret identification information SecretID by decrypting the E-SecretID read from the NAND flash memory 100 using the obtained FKey.

(Step S13)

Subsequently, the host device 2000 requests to read index information i to the NAND flash memory 100.

(Step S14)

Subsequently, in response to the request from the host device 2000, the NAND flash memory 100 loads the index information i from the cell array 11 and outputs the index information i to the host device 2000.
(Step S15)
Subsequently, the host device 2000 generates a random number RNh needed for an authentication request. By using the random number RNh for the authentication process, a common key that is different each time can be used with the NAND flash memory 100 for processes below.
(Step S16)
Subsequently, the host device 2000 sends out a constant HCj held in advance and the random number RNh to the NAND flash memory 100 along with the an authentication request (Request authentication).
(Step S17)
Subsequently, the NAND flash memory 100 loads secret information NKeyi (i=1, . . . , m) and secret identification information SecretID from the hidden area 101, which are stored in the data cache 12.
(Step S18)
Subsequently, the NAND flash memory 100 generates secret information HKeyi,j by a data generation process of the data generator 13 using the hidden secret information NKeyi and the constant HCj received from the host device 2000.
(Step S19)
Subsequently, the NAND flash memory 100 generates a session key SKeyi,j (=Generate(HKeyi,j, RNh)) by a data generation process of the data generator 14 using the received RNh.
(Step S20)
Subsequently, the NAND flash memory 100 generates one-way conversion identification information Oneway-ID (=Oneway (SKeyi,j, SecretID)) by executing a one-way conversion process of the one-way converter 15 on the secret identification information SecretID using the generated session key SKeyi,j. The generated one-way conversion identification information Oneway-ID is sent out to the host device 2000.
(Step S21)
In parallel with step S18, the host device 2000 selects secret information HKeyi,j needed for an authentication process with the NAND flash memory 100 from the set of secret information HKeyi,j (i=1, . . . , m) hidden in advance, using the received index i.
(Step S22)
Subsequently, the host device 2000 generates the SKeyi,j (=Generate(HKeyi,j, RNh)) by a data generation process of the data generator 26 using the selected HKeyi,j and the generated RNh.
(Step S23)
Subsequently, the host device 2000 generates one-way conversion data Oneway-ID by executing a one-way conversion process of the one-way converter 27 on the secret identification information SecretID using the generated session key SKeyi,j.
(Step S24)
Subsequently, the host device 2000 determines whether the one-way conversion identification information Oneway-ID received from the NAND flash memory 100 and the Oneway-ID generated by the host device 2000 match.
If both values of the Oneway-ID match (OK), the host device 2000 judges that the SecretID obtained by the decrypter 21 is an authentic ID and delivers the SecretID to subsequent processes. On the other hand, if both values thereof do not match (NG), the host device 2000 judges that the SecretID is an unlawful ID and outputs a message to that effect.

With the above operation, the authentication flow according to the first embodiment is completed (End).
If the NAND flash memory 100 has a plurality of slots as described in a configuration example of the memory system, the host device 2000 needs to notify the NAND flash memory 100 of the slot number used for authentication. In such a case, the slot number may be notified in step S16 or in a step before step S16.

<3. FKB (Family Key Block)>

Next, key management information FKB (Family Key Block) according to the fourth embodiment will be described in more detail with reference to FIG. 11.
To generate key management information FKB conforming to the NAND flash memory 100 in which secret identification information SecretID is recorded, FKeyv is encrypted one by one, using one piece of IDKeyi (i=1, . . . , n) in a set of IDKeyi as secret key information prepared in advance. That is, the key management information FKB is a set of encrypted FKeyv (E-FKeyv,i)=Encrypt (IDKeyi, FKeyv) and the set of encrypted FKeyv is called an encrypted FKey bundle.
Note that the configuration of the key management information FKB is not limited to the configuration in the present embodiment. For example, in case where the specific IDKeyi is leaked, encrypted FKeyv (E-FKeyv) which can be decrypted from the leaked IDKeyi is deleted from the FKB, so that the host device 2000 holding the IDkeyi cannot decrypt the Fkey from the encrypted Fkey bundle in the host. As a result, when the NAND flash memory with the newly configured FKB is used, the host device 2000 can not obtain (decrypt) correct FKeyv and secret identification information SecretID. In this manner, the function to revoke the host device 2000 holding the secret information IDKeyi can be provided.
When, as described above, the secret information IDKeyk, the index information k, the secret information HKeyi,j, and the constant HCj are associated, HKeyi,j may also be diverted, in addition to FKey and IDKeyk, for the generation of FKBv. For example, configurations such as E-FKeyv, i=Encrypt (Encrypt(IDKeyi, FKeyv), HKeyi,j), E-FKeyv, i=Encrypt (Encrypt(HKeyi,j, FKeyv), IDKeyi), and E-FKeyv,i=Encrypt(HKeyi,j, IDKeyi(+)FKeyv) may be adopted. This has the effect of preventing, when keys are leaked from a plurality of the host devices 2000, the secret keys IDKeyi, HKeyi,j of different devices from being combined. That is, by making decryption of FKey impossible unless IDKeyi and HKeyi,j are correctly combined. By observing HCj, HKeyi that is linked to the Hcj can be identified, and furthermore, IDKeyi can be identified. This also allows the leaked IDKeyi to be revoked.
Further, the method of generating the key management information FKB is not limited to the method in the present embodiment. For example, the function to revoke the host device 2000 can also be provided if the key management information FKB is generated by using MKB (Media Key Block) technology used in CPRM (see Non-patent document 1), or MKB technology disclosed in Non-patent document 3.
The MKB technology efficiently shares common secret information (Media Key) (among devices not to be revoked) while realizing device revocation in a situation in which each of a plurality of devices has a mutually different piece of secret information. It is also called Broadcast Encryption.
If the MKB technology is applied, for example, a configuration example of the memory system is shown like in FIG. 12. The shown memory system is different from the memory system in FIG. 9 in that the FKB processor (Process FKB) 22 is shown as a superordinate concept. Also in this case, the leaked key can be identified and revoked by associating the data of FKB decrypted based on the node number of the host device 2000 that is information corresponding to K or IDKeyi and a host key group allocated to the node number with HKeyi,j and HCj.

<4. Writing Secret Information and FKB>

Next, writing secret information or key management information FKB into the NAND flash memory 100 will be described.

4-1. When Writing Secret Information or Key Management Information FKB During Manufacture of the NAND Flash Memory First, a case where secret information or key management information FKB is written, for example, during manufacture of the NAND flash memory 100 will be described by using FIGS. 13 and 14. The description will be provided along the flow in FIG. 14.

A key issue/management center 3000 generates data below:
key management information FKBv (v=1, ..., n);
hidden information FKeyv(v=1, ..., n);
index information v (v=1, ..., n);
secret information NKeyi; and
index information i.

As described above, the key management information FKBv is generated by encrypting the hidden information FKeyv. In addition, the index information v may be a plurality of values. If, for example, the key issue/management center 3000 generates three values of 1, 2, and 3 as index information v, the key issue/management center 3000 generates (FKB1, FKey1), (FKB2, FKey2), and (FKB3, FKey3) in accordance with the generated index information v.

Of the generated data, the key issue/management center 3000 delivers the hidden information FKeyv(v=1, ..., n), the index information v(v=1, ..., n), the secret information NKeyi, and the index information i to the memory manufacturer B. For the delivery of these pieces of data, for example, the key issue/management center 3000 uses safe means such as sending the data to the memory manufacturer B after the data being encrypted using a public key of the memory manufacturer B obtained in advance.

In addition to the NAND flash memory 100, the memory manufacturer B further holds data 31 such as FKBv (v=1, ..., n) delivered by the key issue/management center 3000. The memory manufacturer B includes selectors 32, 33, a generator 34, and an encryption unit 35.

(Step S31)

With the above configuration, the memory manufacturer B first generates the secret identification information SecretID by the generator (SecretID Generator) 34.

(Step S32)

Subsequently, the memory manufacturer B that receives the data 31 selects one value from v by the selector 32. Further, the selector 32 selects FKeyv corresponding to the selected v. The memory manufacturer B encrypts the generated secret identification information SecretID to generate encrypted secret identification information E-SecretID using the selected FKeyv.

(Step S33)

Subsequently, the memory manufacturer B writes the value of v into the ROM area 102 of the NAND flash memory 100 as the index information v (index of FKey).

The memory manufacturer B also writes the value of index information i (index of NKey) into the ROM area 102 of the NAND flash memory 100 and the value of NKeyi into the hidden area 101.

Further, the memory manufacturer B writes the value of secret identification information SecretID into the hidden area 101 of the NAND flash memory 100 and the value of encrypted secret identification information E-SecretID into the ROM area 102.

With the above operation, predetermined secret information and key management information FKB can be written during manufacture of the NAND flash memory 100 (End). Regarding the order of writing each of the above values, the encrypted secret identification information E-SecretID is a value obtained after an encryption process and can be written after the encryption process by the encryption unit 35. Otherwise, there is no restriction on the order of writing operation and the values may be written in an order different from the order of the above example.

Further, the memory manufacturer B delivers the NAND flash memory 100 for which the write process has been completed to the assembler C.

Thus, in the present embodiment, the NAND flash memory 100 can be assumed to be in a state in which index information v (index of FKey) or the like is already written.

4-2. When FKB is Written by the Assembler

Figure 15:
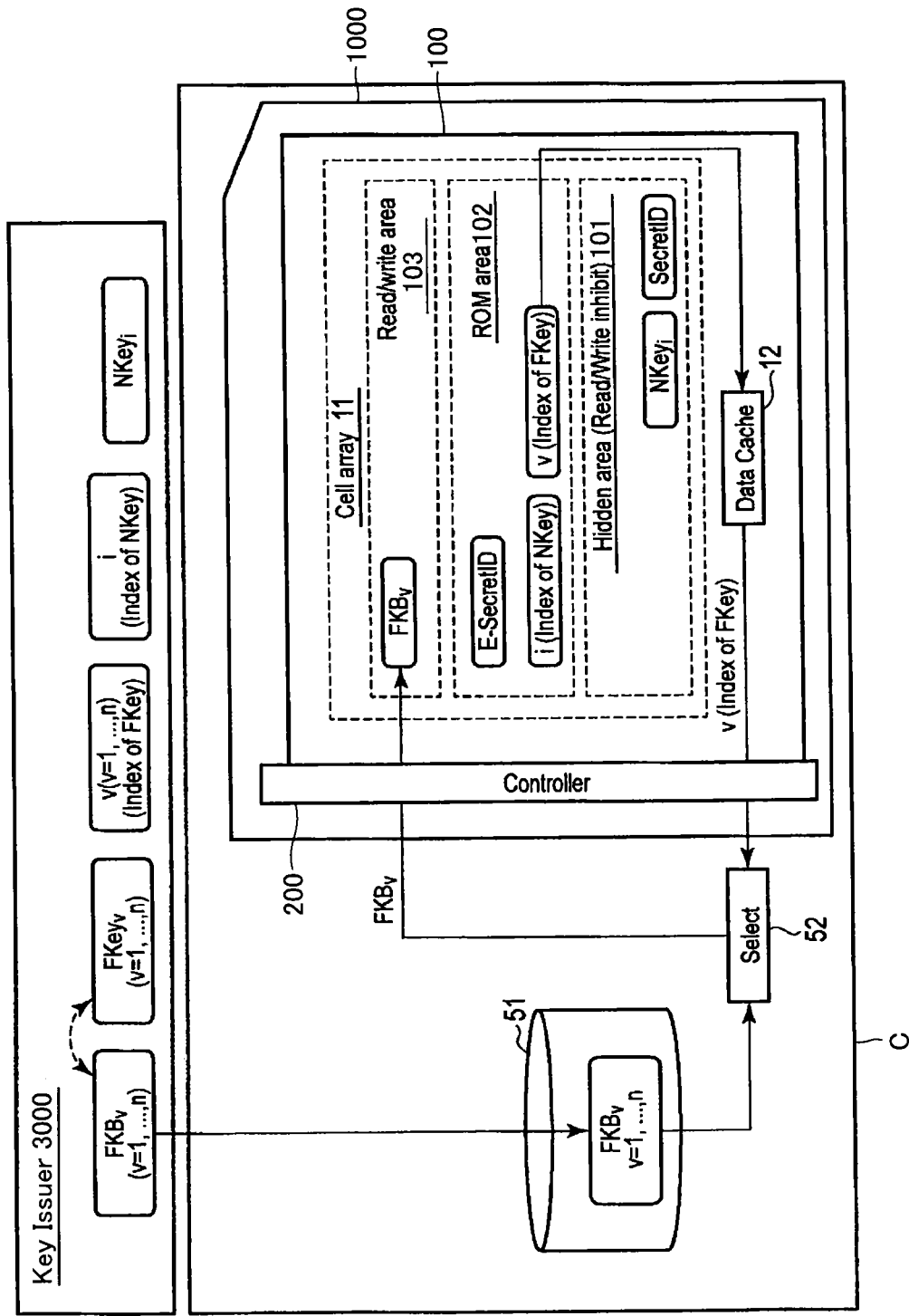
FIG. 15 is a diagram illustrating a write process of FKB by a card manufacturer according to the fourth embodiment.
Figure 16:
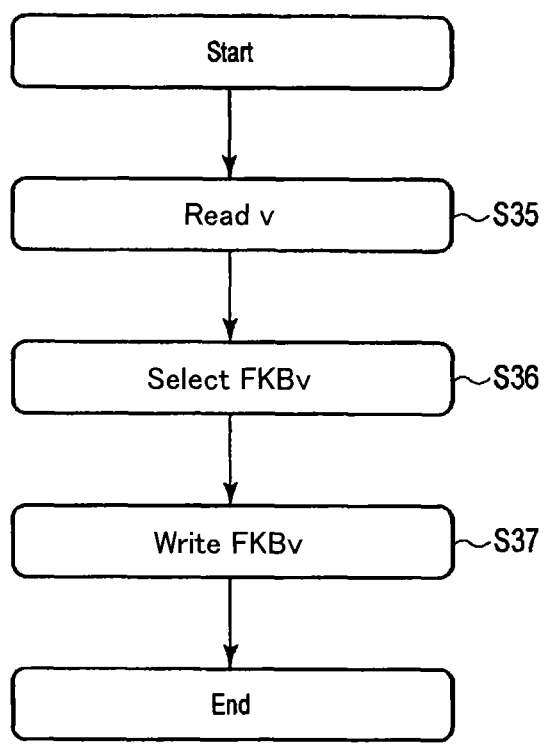
FIG. 16 is a flow chart showing a process in FIG. 15.

Next, a case where the assembler C writes FKB will be described with reference to FIGS. 15 and 16. The description will be provided based on the flow in FIG. 16.

The assembler C receives from the memory manufacturer B the NAND flash memory 100 to which the predetermined information v and the like have been written.

Then, the assembler C manufactures the memory card 100 for general users or the like, for example, an SD card by connecting the controller 200 that controls the NAND flash memory 100.

The assembler C comprises the memory card 100. In addition, it holds data (FKBv) 51 received from the key issue/management center 3000, and comprises a selector 52.

The process of writing key management information FKBv by the assembler C is as follows.

(Step S35)

First, the assembler C receives the FKBv from the key issue/management center 3000 as the data 51. For the delivery of the data 51, the above safe means is used.

Then, the assembler C reads the value of the index information v recorded in the ROM area 102 of the NAND flash memory 100 into the data cache 12 or the like (via the controller 200).

(Step S36)

Subsequently, the assembler C selects the FKBv corresponding to the value of the read index information v through the selector 52.

(Step S37)

Subsequently, the assembler C writes the selected key management information FKBv into the read/write area 103 of the NAND flash memory 100 via the controller 200.

<Advantageous Effects>

According to the authenticator, authenticatee and authentication method according to the fourth embodiment, at least the following advantageous effects (1) to (3) can be obtained.

(1) Even if secret information has leaked from the host device 2000, it is possible to prevent unlawful use of secret information of the NAND flash memory 100 using the leaked information.

As described above, the host device 2000 as an authenticator may be provided, not only as a dedicated hardware device such as a consumer device, but also, for example, as a program executable in a PC or the like, and, in some cases, the software functions as a substantial host device. On the other hand, the NAND flash memory 100 as an authenticatee is a storage medium. Even in the case where a program called "firmware" mediates, an important process or information is stored in a hidden state in hardware in the memory 100.

Thus, there is concern that the tamper-resistance (the resistance to attacks) of software executed in a PC becomes lower, compared to the storage medium. Thus, there is concern that, by attacking the host device (authenticator) 20 with a low tamper-resistance, secret information hidden in the NAND flash memory (authenticatee) 10 with a high tamper-resistance is also exposed, leading to a disguise as a device with a high tamper-resistance.

Thus, in the configuration according to the fourth embodiment and the authentication method therefor, as described above, the NAND flash memory 100 with a relatively high tamper-resistance hides first key information (NKeyi) that can generate second key information (HKeyi,j) therefrom in the memory 100. On the other hand, the host device 2000 hides only the second key information (HKeyi,j) that cannot generate the first key information (NKeyi) therefrom in the memory 23.

Thus, the NAND flash memory 100 generates the second key information (HKeyi,j) hidden by the authenticator 20 by using the constant HCj received from the host device 2000 and the first key information (NKeyi) hidden by the NAND flash memory 100. The NAND flash memory 100 further generates a session key SKeyi,j using the second key information (HKeyi,j) and the random number RNh.

The host device 2000 generates a session key SKeyi,j, using the second key information (HKeyi,j) selected by the index information I, and the random number RNh. As a result, the NAND flash memory 100 and the host device 2000 share the same session key SKeyi,j.

Thus, in the present embodiment, the secret level of information hidden by the NAND flash memory (authenticatee) 100 and the secret level of information hidden by the host device (authenticator) 2000 can be made asymmetric. In the present embodiment, for example, the secret level of information hidden by the NAND flash memory 100 with a relatively high tamper-resistance can be set higher than the secret level of information hidden by the host device 2000 with a relatively low tamper-resistance.

Thus, even if information hidden by the host device 2000 is leaked, the NAND flash memory 100 cannot be "disguised" by using the leaked information because the secret level of information hidden by the NAND flash memory 100 with a relatively high tamper-resistance is higher. Therefore, unlawful use of secret information of the NAND flash memory 100 using the leaked information can advantageously be prevented. As a result, for example, it becomes possible to reliably determine that ID information read from the host device 2000 is information that has been read from the intended authenticatee 10 and to revoke unlawful use thereof by remote parties.

(2) Advantages for Implementation

In a configuration like the present embodiment, as described above, restrictions are also imposed on circuit scales, for example, in an environment in which hardware implementation of a public key cryptosystem process or an MKB process, which requires a relatively large circuit scale, is difficult to achieve.

However, according to the present embodiment, though the key information is asymmetric, there is no need to use the public key cryptosystem process requiring a relatively large circuit scale. Furthermore, by making the secret levels of information hidden by the host device (authenicator) 2000 and the NAND flash memory (authenticatee) 100 asymmetric as described above, authentication means is implemented by which with information leaked from one device alone, the other device cannot be disguised and the session key SKeyi,j is shared by the authenticator 20 and the authenticatee 10.

Thus, implementation can be said to be advantageous even in a severe environment in which the above restrictions are imposed. Further, as described above, the circuit scale can be further reduced by sharing the data generator and encryptor in a memory system as the same process.

(3) The Manufacturing Process can Advantageously be Simplified and Manufacturing Costs can be Reduced.

The NAND flash memory 100 according to the present embodiment includes in the read/write area 103 key management information (FKBv) attached uniquely to each of the NAND flash memories 100 or attached commonly to a plurality of the NAND flash memories 100 in units of the production lot or the like, depending on its intended purpose.

Further, the NAND flash memory 100 according to the present embodiment includes in ROM area 102 encrypted secret identification information (E-SecretID) attached uniquely to each of the NAND flash memories 100.

If the key management information (FKBv) is made common in units of the production lot, peculiar information that needs to be recorded in each of the NAND flash memories 10 can be reduced to small data in data size such as the encrypted secret identification information (E-SecretID). In other words, information to be written is divided into commonly attached key management information (FKBv) and unique encrypted secret identification information (E-SecretID), and these pieces of information are encrypted in two stages. This allows the data size of unique encrypted secret identification information (E-SecretID) to be written into the NAND flash memories 100 to be reduced.

Figure 13:
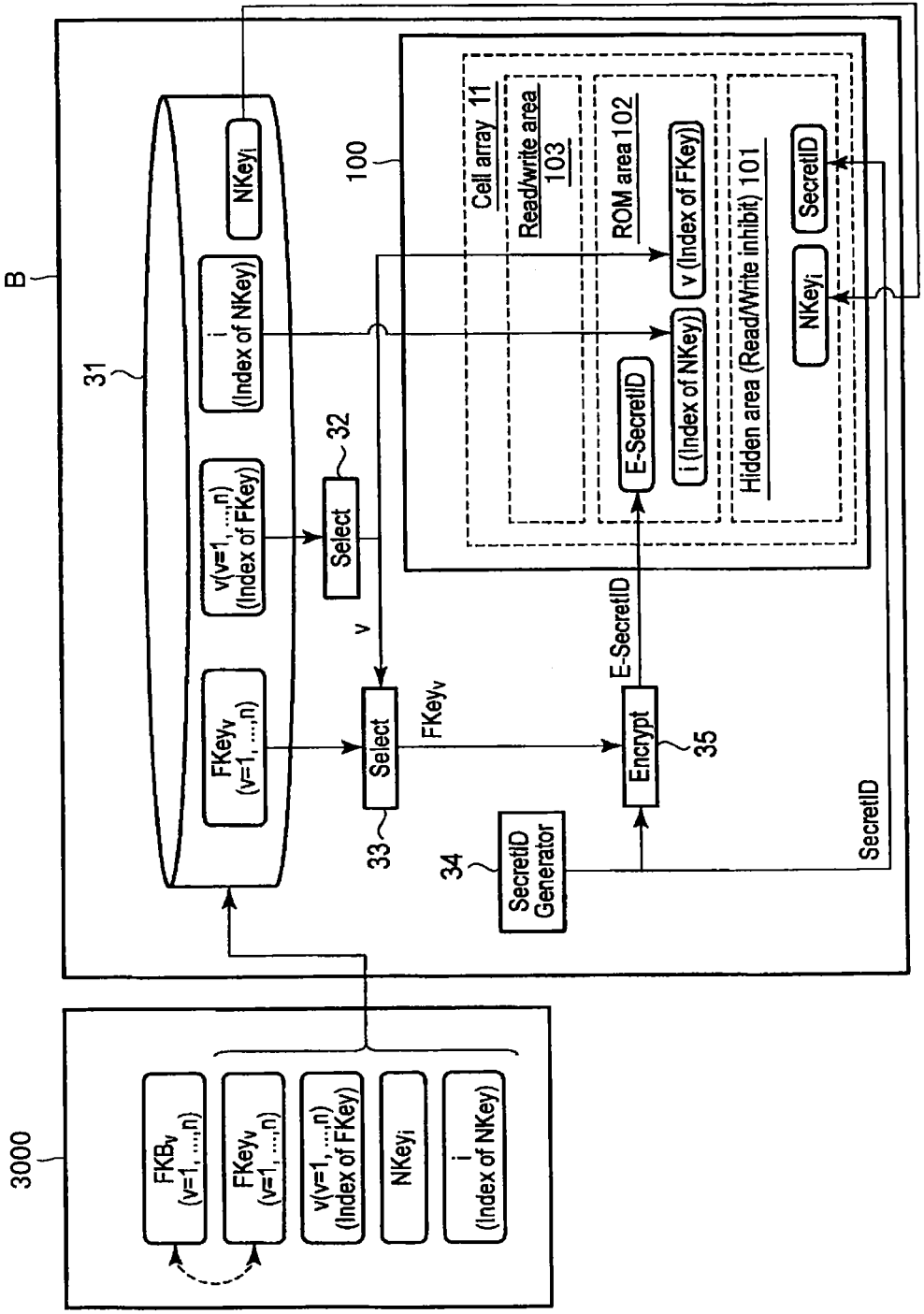
FIG. 13 is a diagram illustrating a write process of secret information by a NAND manufacturer according to the fourth embodiment.
Figure 14:
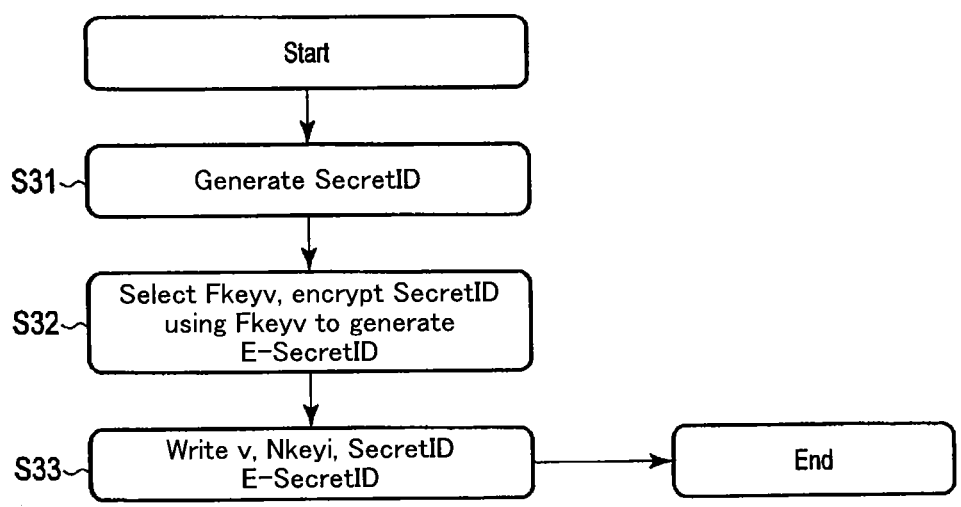
FIG. 14 is a flow chart showing a process in FIG. 13.

For example, as shown in FIGS. 13 and 14 above, the memory manufacturer B writes peculiar information (E-SecretID) into each of the NAND flash memories 100 received from the key issue/management center 3000 during manufacture of the NAND flash memories.

The encrypted key management information (FKBv) commonly attached to the NAND flash memories 100 can commonly be written into the NAND flash memories 100 by the assembler C. For example, as shown in FIGS. 15 and 16, the assembler C writes the common key management information FKBv to each of the NAND flash memories 100 received from the key issue/management center 3000. Thus, the size of unique data that must be written into each of the NAND flash memories 100 by the memory manufacturer B can be reduced.

If information unique to the NAND flash memory 100 and whose data size is large is written during manufacture of the NAND flash memories 10, the manufacturing process will be more complicated and the manufacturing time will be longer, leading to increased costs of manufacturing. According to the configuration and method in the present embodiment, however, such a complex manufacturing process becomes unnecessary by dividing information to be written into commonly attached key management information FKBv and unique encrypted secret identification information (E-SecretID) and encrypting the information in two stages and therefore, the manufacturing process can advantageously be simplified and manufacturing costs can be reduced. Moreover, the manufacturing time can be shortened, offering advantages of being able to reduce power consumption.

Also on the side of the host device 20, advantages similar to those of the NAND flash memory 100 can be gained by adopting a configuration of generating E-SecretID by encrypting SecretID, which is a unique value to the NAND flash memory, by using hidden information FKey and further generating key management information FKB by encrypting FKey using IDKeyk.

[First Modification (when FKB is Downloaded and Written Later)]

An authenticator, an authenticatee, and an authentication method according to a first modification will be described. In the description, overlapping points with the first embodiment will be omitted.

<Writing FKB>

Writing an encrypted FKey bundle (FKB) will be described.

The process in the first modification is a process that is not particularly needed if the encrypted FKey bundle (FKB) is written during manufacture of the NAND flash memory 10. However, then the NAND flash memory 100 and the controller 200 are connected and the NAND flash memory 100 is acquired by a general user as, for example, an SD card and FKB is written later on the market when the card is used.

Figure 17:
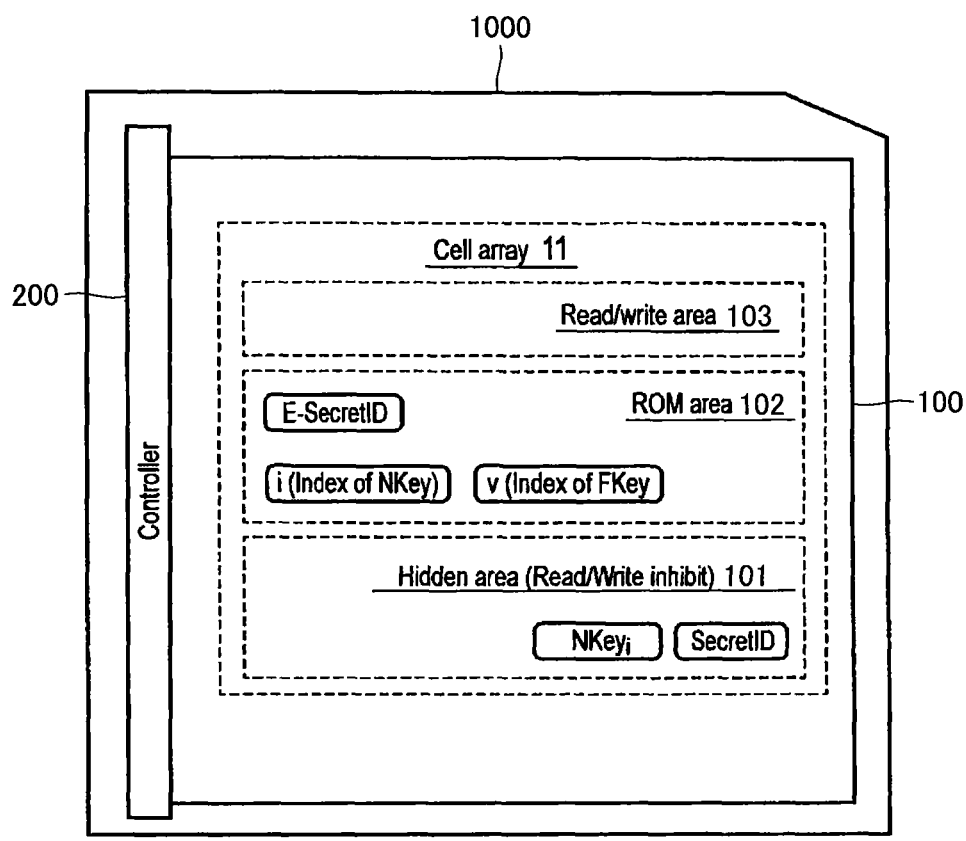
FIG. 17 is a diagram showing an authenticatee according to a first modification.

FIG. 17 shows a state in which the key management information FKB is, as described above, recorded in the unrecorded memory card 100.

As shown in the figure, the NAND flash memory 100 has secret information NKeyi and secret identification information SecretID recorded in the hidden area 101. Index information i needed to identify the secret information NKeyi, index information v needed to identify the key management information FKB, and secret identification information SecretID (E-SecretID) encrypted by FKeyv specified by the index information v are recorded in the ROM area 102.

The first modification is different from the fourth embodiment in that the FKB, which is an encrypted FKey bundle, is not recorded in the read/write area 103.

Figure 18:
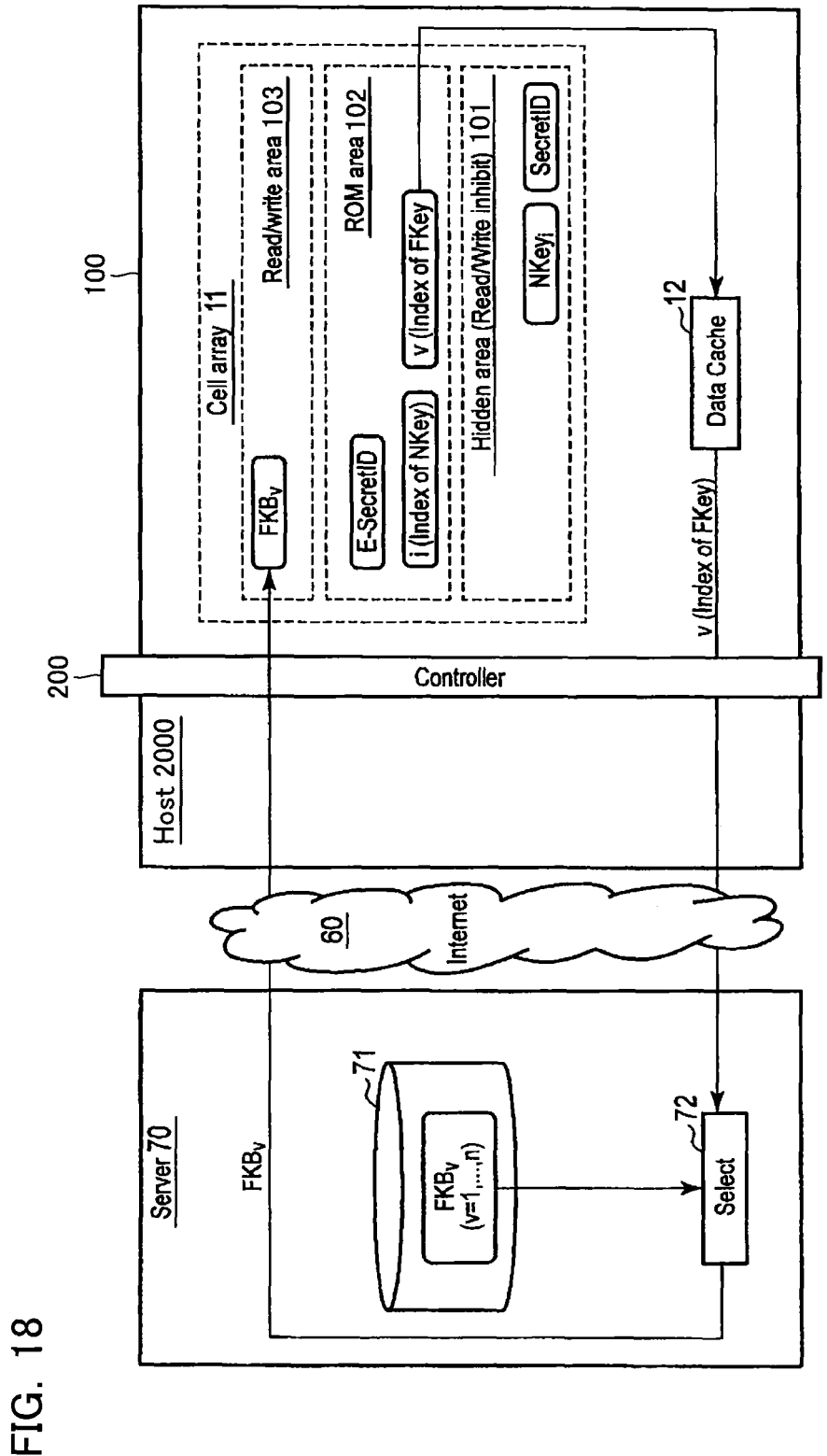
FIG. 18 is a block diagram showing a system downloading FKB according to the first modification.

Next, with reference to FIG. 18, a case where the FKB is downloaded from a server and recorded in the unrecorded memory card 100 as described above will be described.

In this case, as shown in the figure, the data cache 12 is arranged in the NAND flash memory 100 if necessary.

A server 70 according to the present embodiment includes an FKB data base (Set of FKBi's (i=1, . . . , x)) 71 and a selector 72 to select key management information FKBv based on index information v.

The server 70 and the memory system (the NAND flash memory 100, the controller 200, and the host device 2000) are electrically connected for communication via an Internet 60.

The host device 2000 includes a function to determine whether it is necessary to newly write FKB and to request FKB to the server if necessary.

<FKB Write Flow>

Figure 19:
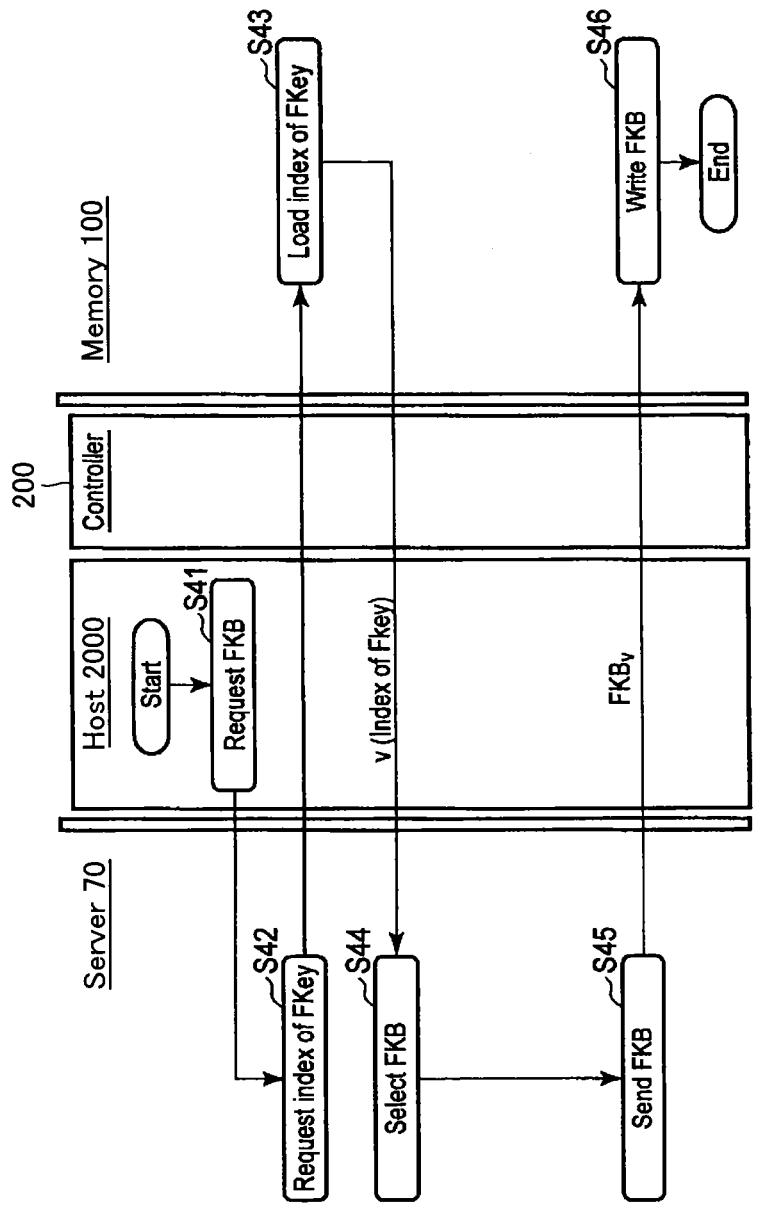
FIG. 19 explains a flow of downloading the encrypted FKeyID bundle (FKB) from the server to write it to the NAND type flash memory 100.

Next, the flow to download an encrypted FKeyID bundle (FKB) from the server 70 and to write the FKB into the NAND flash memory 100 will be described with reference to FIG. 19.

(Step S41)

Figure 11:
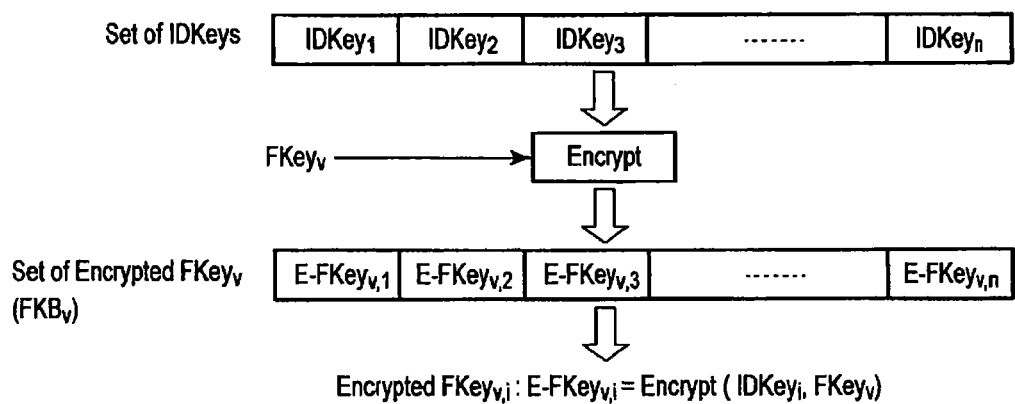
FIG. 11 is a diagram showing a configuration example of an encrypted FKey bundle (FKB) according to the fourth embodiment.
Figure 12:
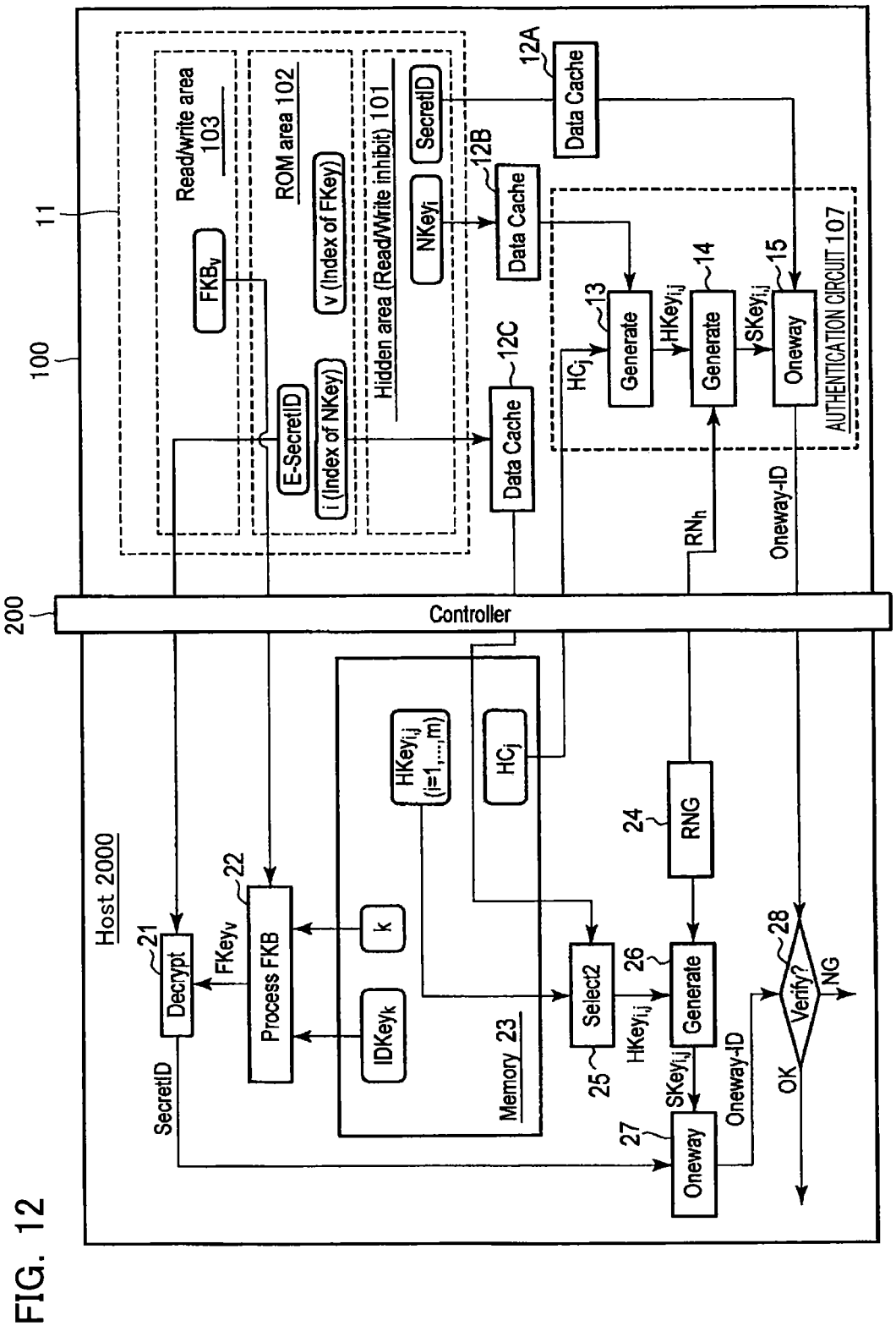
FIG. 12 is a block diagram showing a configuration example of the memory system according to the fourth embodiment.

First, as shown in FIG. 11, when the host device 2000 determines that it is necessary to download FKB, FKB writing is started and the host device 2000 issues an FKB request to the server 70.

(Step S42)

Subsequently, the server 70 requests index information v needed to identify FKeyv to the NAND flash memory 10.

(Step S43)

Subsequently, the NAND flash memory 100 reads v from the ROM area 102 and sends out v to the server 70.

(Step S44)

Subsequently, the server 70 selects FKBv corresponding to the received v from the FKB database 71.

(Step S45)

Subsequently, the server 70 sends out the selected FKBv to the NAND flash memory 100.

(Step S46)

Subsequently, the NAND flash memory 100 writes the received FKBv into the read/write area 103 for recording.

With the above operation, the download flow of the encrypted FKey bundle (FKB) is completed. (End).

Other configurations and operations are substantially the same as those in the fourth embodiment.

<Advantageous Effects>

According to the authenticator, authenticatee and authentication method according to the first modification, at least the advantageous effects (1) to (3) similar to those in the fourth embodiment can be obtained.

Further, according to the first modification, the present embodiment can be applied if necessary when FKB is written later.

[Fifth Embodiment]

Next, a fifth embodiment will be described. In the description, overlapping points with the first embodiment will be omitted.

In the fourth embodiment, after the authentication of the NAND flash memory 100 by the host device 2000 is successfully completed, both share the secret identification information SecretID. As a process after the authentication, for example, the host device 2000 encrypts content data and writes the encrypted content data into the NAND flash memory 100. For this process, using the shared secret identification information SecretID can be considered.

The present embodiment intends to protect secret identification information SecretID even in such a process. Thus, in the description, overlapping points with the fourth embodiment will be omitted.

<Memory System>

Figure 20A:
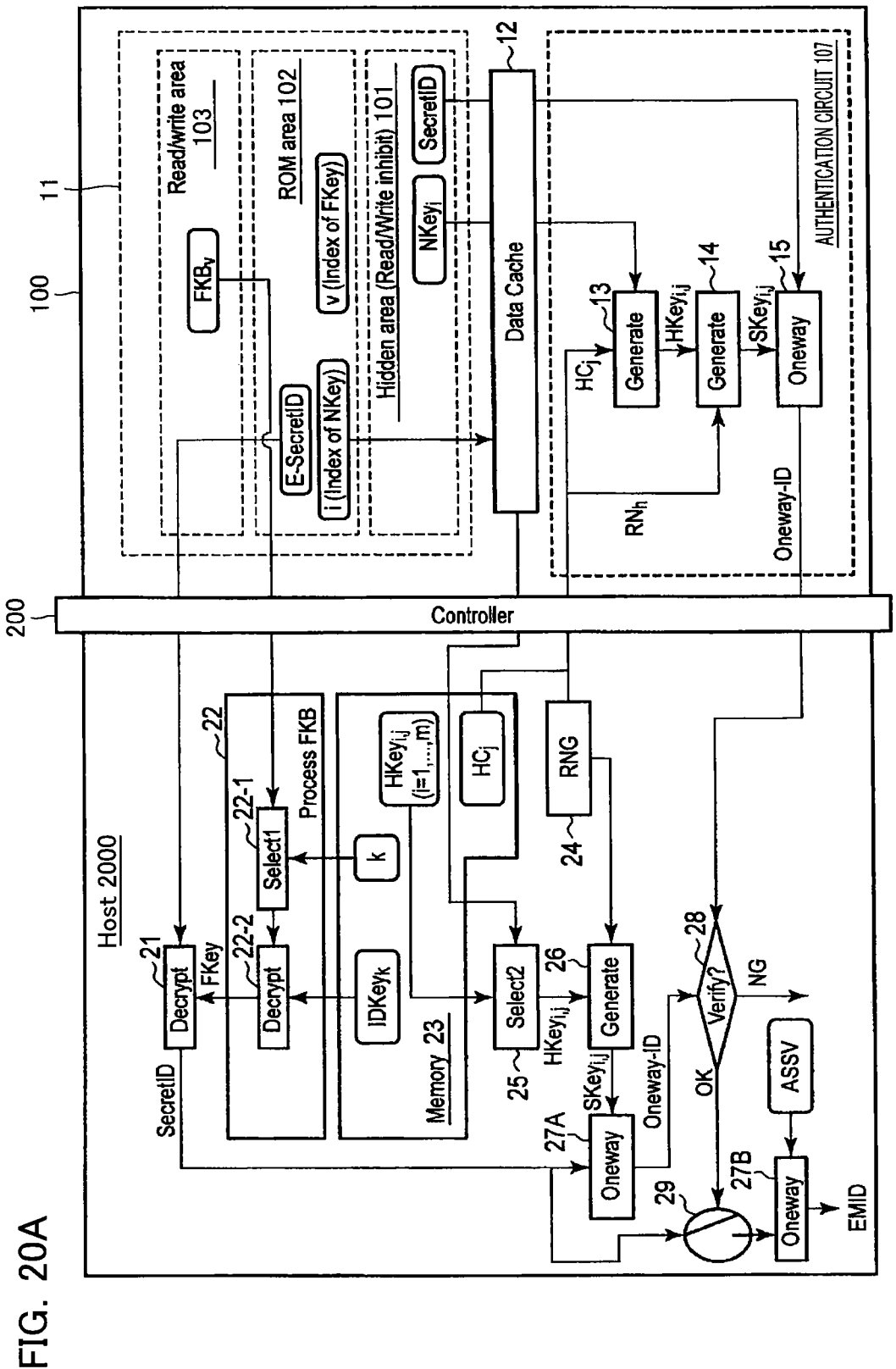
FIG. 20A is a block diagram illustrating an configuration example of the memory system according to the fifth embodiment.

A memory system according to the fifth embodiment is shown as in FIG. 20A.

As shown in FIG. 20A, the memory system according to the present embodiment is different from that in the fourth embodiment in that the system further includes a one-way converter (Oneway) 27B, a switch unit 29, and information (ASSV) commonly held by all host devices 20 handling target content data.

If a determination result when both values of Oneway-ID match in a data verification unit (Verify) 28 (OK) is input as a control signal, the switch unit 29 turns on a signal path to output secret identification information SecretID to the one-way converter 27B.

The one-way converter (Oneway) 27B converts secret identification information SecretID input from the switch unit 29 by a one-way function using the information (ASSV) commonly held by all host devices handling target content data to generate one-way conversion identification information EMID(EMID=Oneway(SecretID, ASSV)).

Thus, in the fifth embodiment, after the secret identification information SecretID is verified by the host device 20, the host device 2000 converts the secret identification information SecretID using information (ASSV) commonly held by all intended host devices to calculate one-way conversion identification information EMID. Thus, the host device 2000 can execute the process of content encryption and the like by using EMID, instead of SecretID.

Other configurations and operations are substantially the same as those in the fourth embodiment and thus, a detailed description thereof is omitted.

<Advantageous Effects>

According to the authenticator, authenticatee and authentication method according to the fifth embodiment, at least the advantageous effects (1) to (3) similar to those in the fourth embodiment can be obtained.

Further, the fifth embodiment is different from the fourth embodiment in that the host device 2000 further includes the information (ASSV) commonly held by the one-way converter (Oneway) 27B, the switch unit 29, and all host devices handling target content.

According to the above configuration, after the secret identification information SecretID is verified by the host device 2000, the host device 2000 converts the secret identification information SecretID using the information (ASSV) commonly held by all intended host devices to calculate one-way conversion identification information EMID. Thus, the host device 2000 can execute the process of content encryption and the like by using the one-way conversion identification information EMID, instead of the secret identification information SecretID.

As a result, though not shown, the one-way conversion identification information EMID can be used for content encryption in a postprocess and thus, the secret identification information SecretID can be prevented from being leaked in the postprocess, further advantageously increasing confidentiality of the secret identification information SecretID. Details thereof will be described below.

[First Modification of Fifth Embodiment]

Figure 20B:
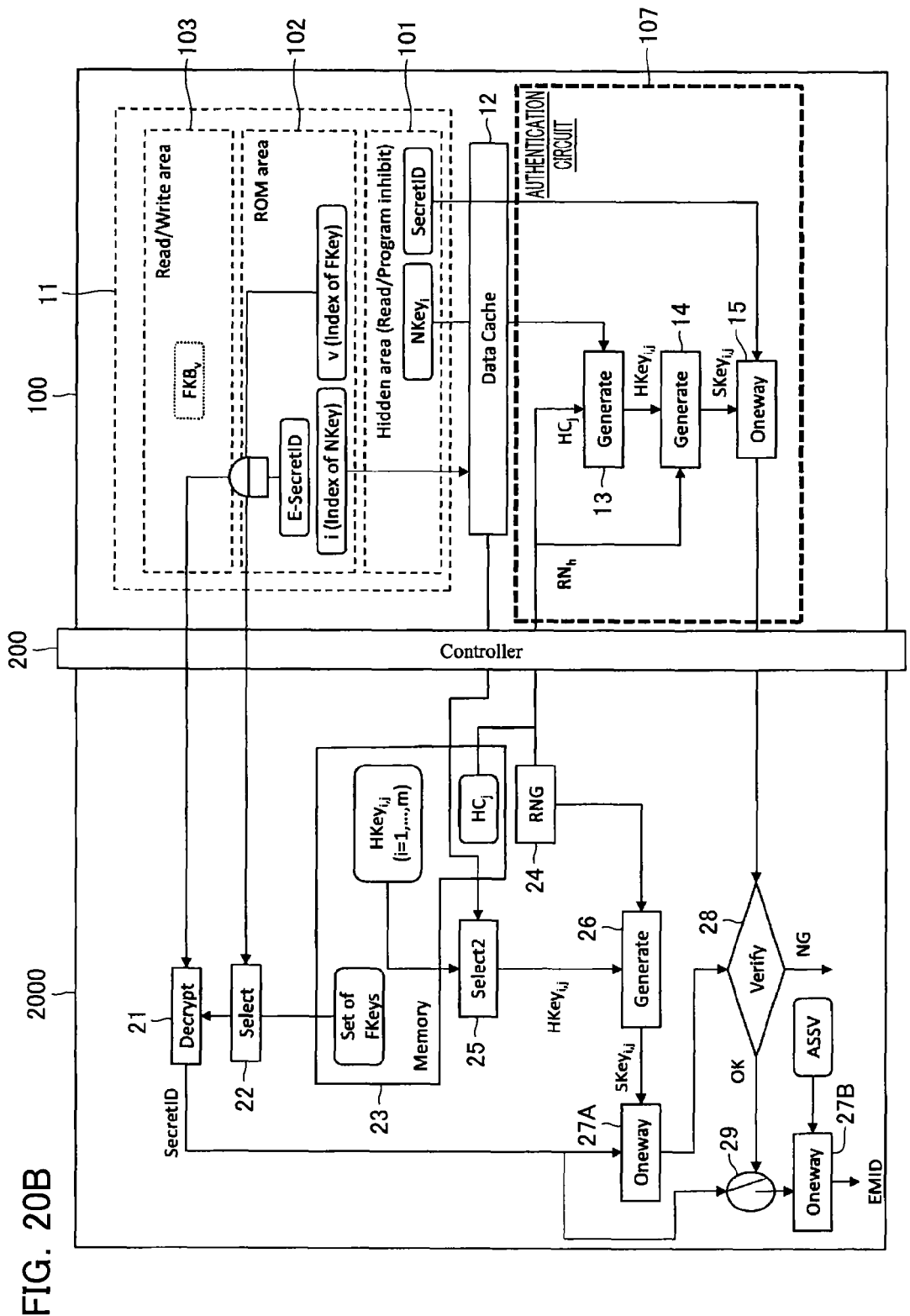
FIG. 20B explains a first modification of the fifth embodiment.
Figure 20C:
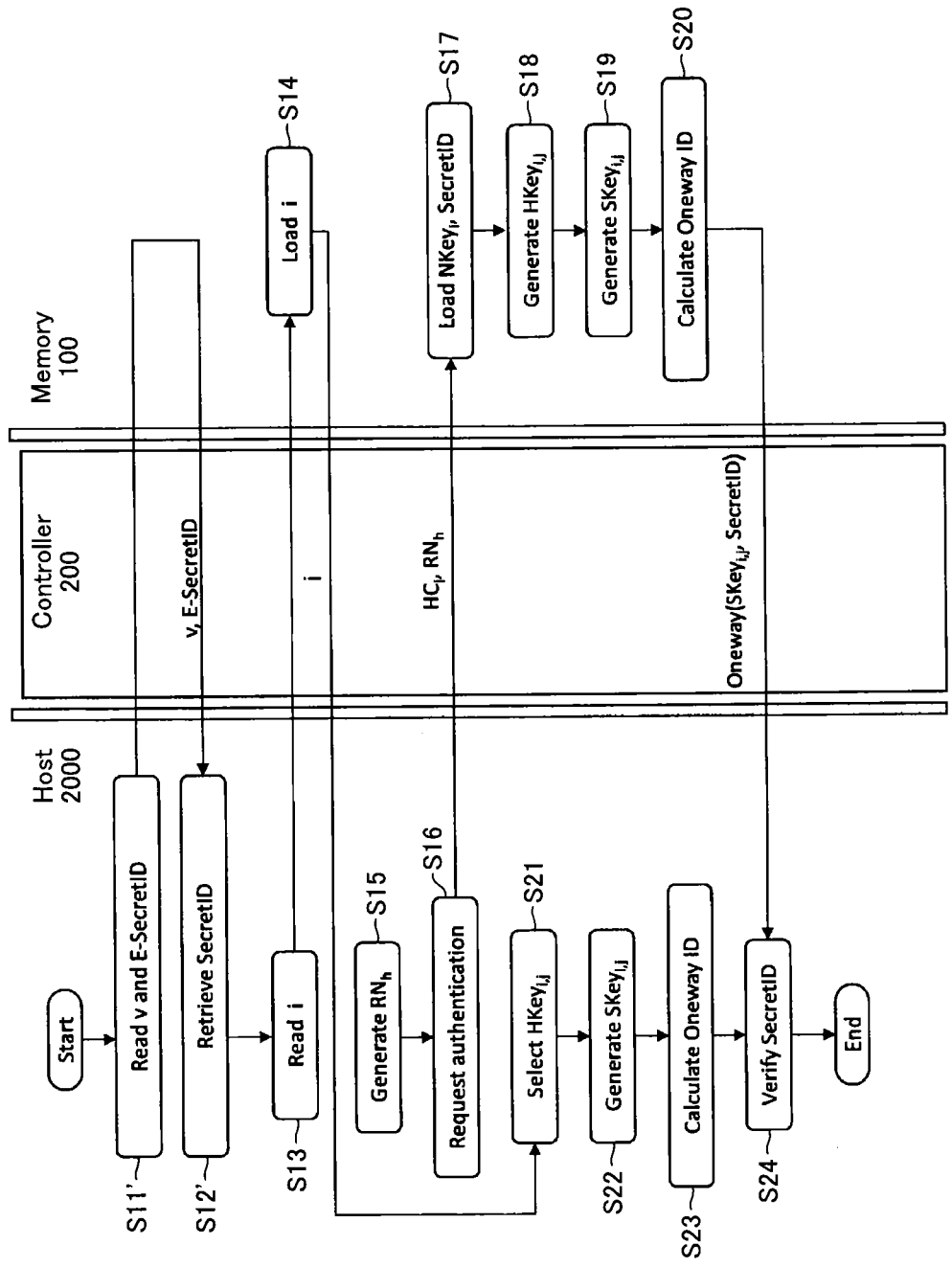
FIG. 20C explains a first modification of the fifth embodiment.

Referring now to FIGS. 20B and 20C, first modification of the fifth embodiment will be described. In the description, overlapping points with the first embodiment will be omitted.

The first modification is different from the fifth embodiment in data held in the host device 2000, processes performed by the host device 2000, and data held in the NAND flash memory 100, in the authentication operation of the NAND flash memory 100 conducted by the host device 2000.

That is, in the fifth embodiment, the memory 23 provided in the host device 2000 stores index information k, secret information IDKeyk, a set of secret information HKeyi,j (i= 1, . . . , m, where j is a fixed value in Hkeyi, j), and a constant HCj. In addition, the host device 20 hides at least secret information IDKeyk and a set of secret information HKeyi,j (i=1, . . . , m) from the outside of the host device 2000. In contrast, in the first modification, hidden information FKeyv (v=1, . . . , n) (Set of Fkeys) are provided instead of secret information IDKeyk and index information k. That is, FKeyv itself is stored in the memory 23. In the fifth embodiment, the host device 2000 derived the Fkeyv from the secret information IDKeyk and FKBv. Thus, the host device 2000 does not need to have means for reading FKBv to derive the secret information FKeyv, and means for performing Process FKB. Instead of this, the host device 2000 needs to have means for reading v, and a means for selecting and utilizing FKeyv, depending on v. Also, the NAND type flash memory 100 does not need to have FKBv.

Whether to adopt the fifth embodiment (FIG. 20A) or adopt the first modification (FIG. 20B) may be selected based on the number of types of v in Fkeyv, the processing capability of the host device 2000, the number of types of the host devices 2000, the memory size of the host device 2000, presence or absence of the function of updating the hidden information in the host device 2000, and the size of FKBv that may be stored in the NAND flash memory 100, and the like.

For example, an example when the first modification is selected may be as follows. Increase in the number of types of the host devices 2000 may leads to increase in size of FKBv. In an NAND flash memory 100 according to a certain aspect, there seems to be a case in which it is difficult to have FKBv in the NAND type flash memory 100. When the host device 2000 has a function of updating hidden information, it is possible to distribute and update Fkeyv through a path different from that of FKBv. Thus, it is possible to make a change by suspending delivery of FKeyv to the unlawful host device 2000, without revoking the unlawful host device 2000 with FKBv. In general, when comparing the total amount of the secret information IDKeyk and FKeyv, the total amount of the secret information IDKeyk increases when the estimated number of types of the host devices increases. Accordingly, in view of the memory size of the host device 2000, the first modification is preferable.

Furthermore, when the host device 2000 itself does not have to be revoked, i.e., a storage medium including a NAND flash memory 100 therein and the host device 2000 are integrally operated by the same platform manager, there may be a case where it is not necessary to use FKBv, and further, it is not necessary to update FKeyv. For example, a case where recording media for game content or game devices are integrally operated by a single manufacturer is an example or the above-described case. Note that the first modification may be applicable to the first to third embodiments and other embodiments described later.

when information transmission and reception between the host device 2000 and the NAND flash memory 100 is conducted via a network, and the host device 2000 is in an online environment, this first modification is preferable. For example, when a case where the host device 2000 is an authentication server applies. When information transmission and reception is carried out via a network, the first modification is preferable because it does not need transmission and reception of FKBv, because smaller amount of information is more desirable. Furthermore, when the host device 2000 is an authentication server, FKeyv may be updated regularly. Also from this view, the first modification does not raise any problem.

Note that, not only in the first modification but in other embodiments, the configuration of the host device in this application is not limited. The host device may be a content reproduction device having similar configuration to that of a DVD player or the like, a recording device, and an authentication unit. It may be a game device. In addition, the host device may be configured by software, hardware, or combination of both. Alternatively, the host device may be a server. The configuration of data transmission/reception for an authentication process is not limited. That is, it is possible to employ various types of connection such as cable connection, wireless-network connection, local-network connection, intranet connection.

<Authentication Flow>

Next, with reference to FIG. 20C, the authentication flow of the memory system according to the first modification of the fifth embodiment will be described.

(Step S11')

When an authentication is started (Start), the host device 2000 reads index information v and encrypted secret identification information SecretID (E-SecretID) from the NAND type flash memory 100.

(Step S12')

Next, the host device 2000 performs data selection process by a data selection unit (Select 1) 22 based on the read index information v, and the host device 2000 obtains hidden information FKey based on hidden information FKeyv (v=1, . . . , n) hidden in the host device 2000.

Furthermore, the host device 2000 decrypts encrypted secret identification information E-SecretID that has been read from the NAND flash memory 100, using the provided hidden information FKey, thereby obtaining secret identification SecretID.

Figure 10:
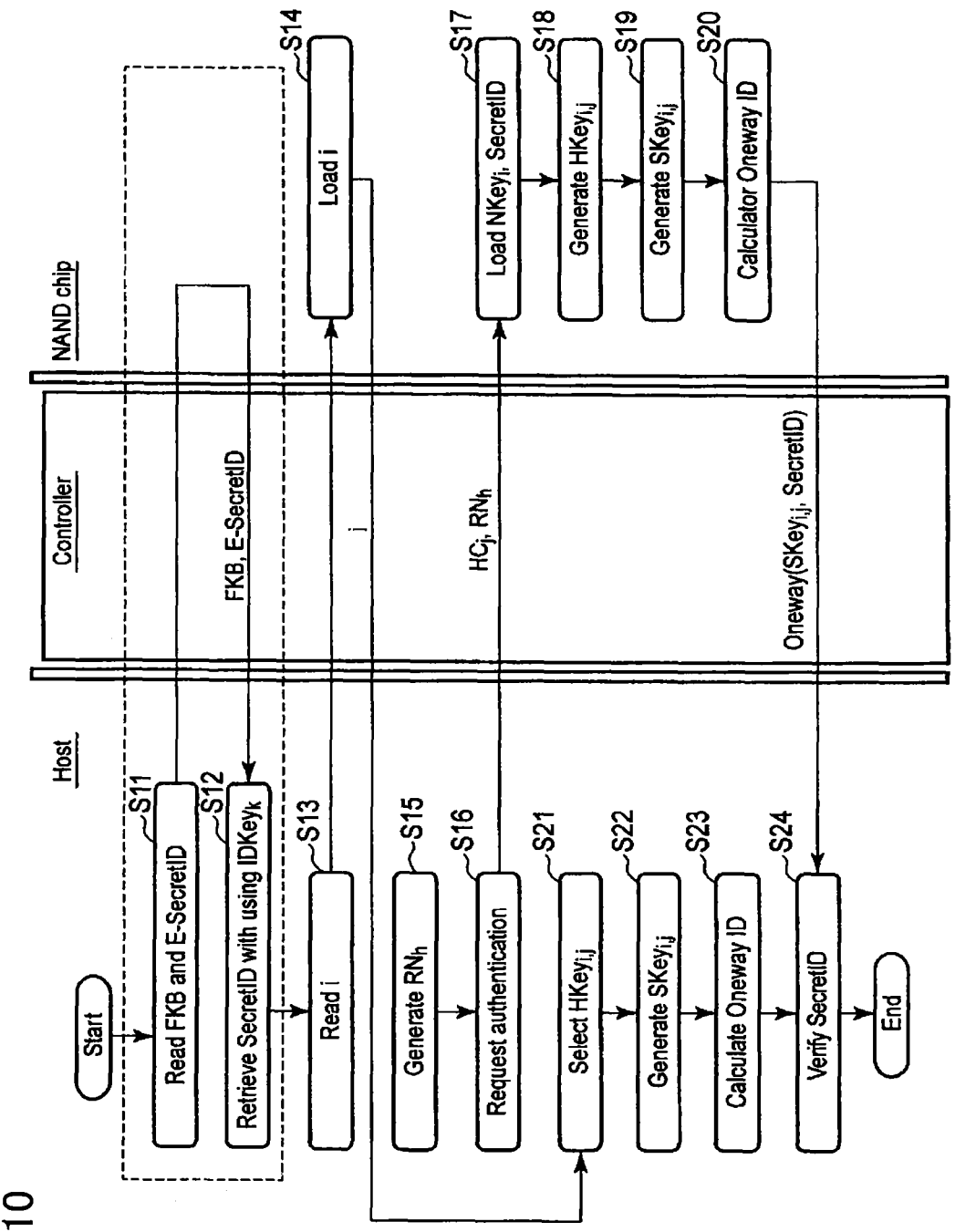
FIG. 10 is a flowchart illustrating an authentication flow of the memory system according to the fourth embodiment.

The content of Step 13-Step 24 are the same as Step S13-Step 24 of FIG. 10.

When both values of one-way conversion identification information Oneway-ID match (OK) in Step 24, the secret identification information SecretID obtained in a decryption unit 21 is judged to be an authentic ID, and the secret identification information SecretID is delivered to subsequent processes. That is, a calculation process for EMID is conducted by one-way conversion process based on secret identification SecretID and ASSV. On the other hand, in case of no matching (NG) the secret identification information SecretID is judged not to be an authentic ID (NG), outputs a message to that effect.

With the above-mentioned operation, an authentication flow according to the first modification of the fifth embodiment is completed (End).

<Advantageous Effects>

According to the authenticator, authenticate and method of authentication according to the first modification, at least the advantageous effects (1) to (2) similar to those in the fourth embodiment can be obtained. Further, the additional advantageous effects of the fifth embodiment can be obtained. Furthermore, implementation load of the host device 2000 and the NAND type flash memory 100 may be further reduced.

[Second Modification of Fifth Embodiment]

Figure 20D:
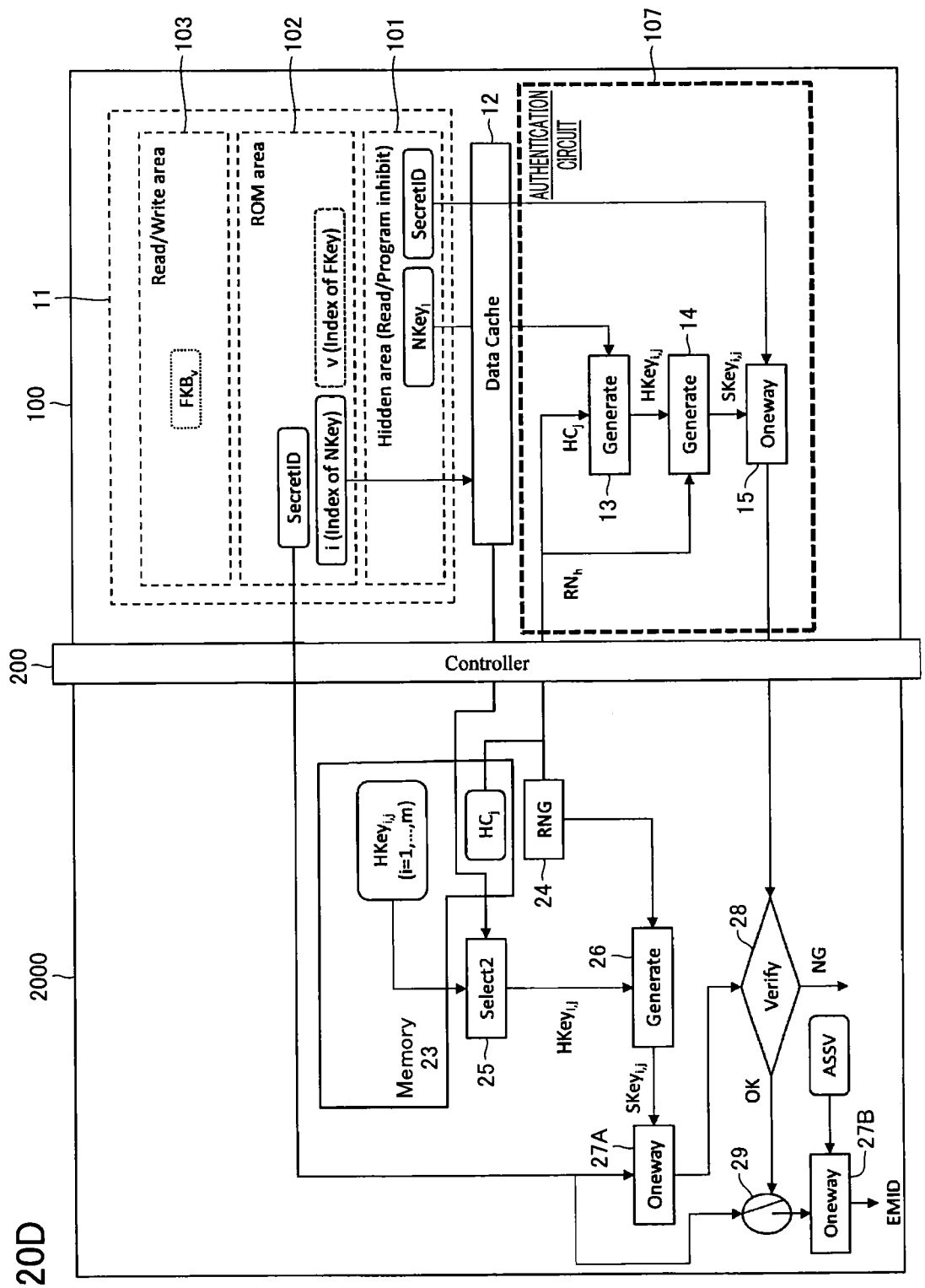
FIG. 20D explains a second modification of the fifth embodiment.
Figure 20E:
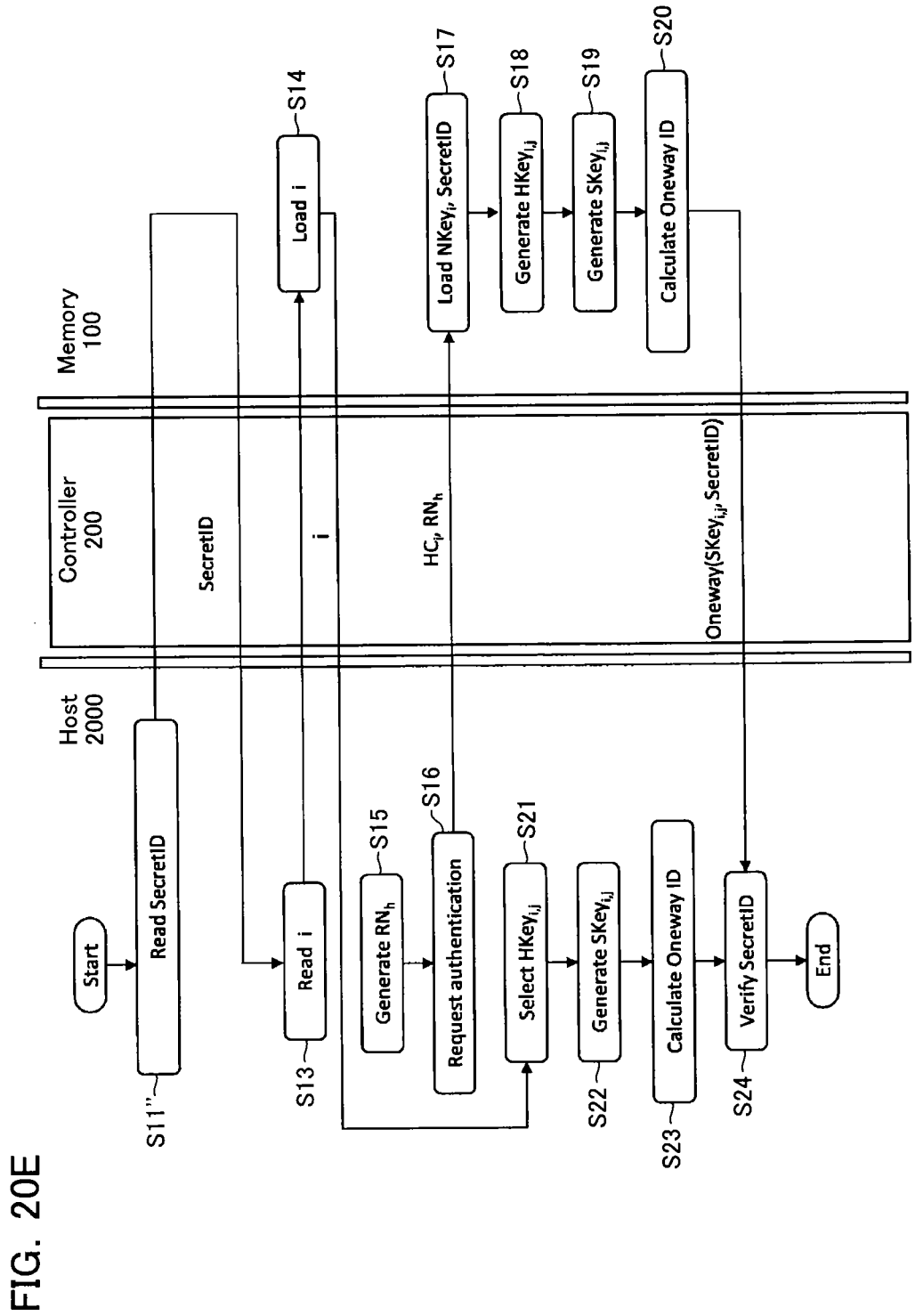
FIG. 20E explains a second modification of the fifth embodiment.

Next, the second modification of the fifth embodiment will be described with reference to FIGS. 20D and 20E. In the description, overlapping points with the first modification of the fifth embodiment will be omitted.

The second modification differs in data stored in the host device 2000, processed performed in the host device 2000, data stored in the NAND flash memory 100, access attribute of data stored in the NAND flash memory 100. In the first modification, the memory 23 included in the host device 2000 stores hidden information FKeyv (v=1, ..., n), a set of secret information HKeyi,j (i=1, ..., m. where j is a fixed value in the Hkeyv), and a constant HCj. At least the hidden information FKeyv (v=1, ..., n) and a set of secret information HKeyi,j (i=1, ..., m) are hidden from outside of the host device 2000. In contrast, in the second modification, the memory 23 does not have the hidden information FKeyv (v=1, ..., n). That is, the host device 2000 does not have to comprise means for reading v, and means for selecting and using Fkeyv according to v.

Instead of this, the host device 2000 has a function of directly reading secret identification information SecretID. The NAND flash memory 100 does not have to have v, and instead, the secret identification information SecretID is required to be readable from the host device 2000 from the ROM area 102.

The second modification is effective, when there is no need to provide some secret attribute to the secret identification information SecretID, that is, only uniqueness of SecretID, which is peculiar information owned by the NAND flash memory 100 is to be secured. As easily understood by comparing the fifth embodiment and the first modification thereof, the processing function and data that the host device 2000 and the NAND flash memory 100 should have and are greatly reduced. This is very effective when a characteristic to be required in the secret identification information SecretID is only securing uniqueness.

<Authentication Flow>

Then, with reference to FIG. 20E, the authentication flow of the memory system according to the second modification of the fifth embodiment will be described.

(Step S11")

When an authentication is started (Start), the host device 2000 reads encrypted secret identification information SecretID (E-SecretID) from the NAND type flash memory 100.

The content of Step S13-S24 are the same as content of Step S13-S24 of FIG. 10.

When both values of one-way conversion identification information Oneway-ID match (OK) in Step 24, the read secret identification information SecretID is judged to be an authentic ID, and the secret identification information SecretID is delivered to subsequent processes. That is, a calculation process for EMID is conducted by one-way conversion process based on secret identification SecretID and ASSV. On the other hand, incase of no matching (NG) the secret identification information SecretID is judged not to be an authentic ID (NG), outputs a message to that effect.

By the above-mentioned operation, an authentication flow according to the second modification of the fifth embodiment is completed (End).

<Advantageous Effects>

According to the authenticator, authenticatee and authentication method according to the second modification, at least the advantageous effects (1) to (2) similar to those in the fourth embodiment can be obtained. Further, at least the additional advantageous effects of the fifth embodiment can be obtained. In addition, the implementing load against the host device 2000 and the NAND flash memory 100 may be further reduced.

[Sixth Embodiment]

Figure 21:
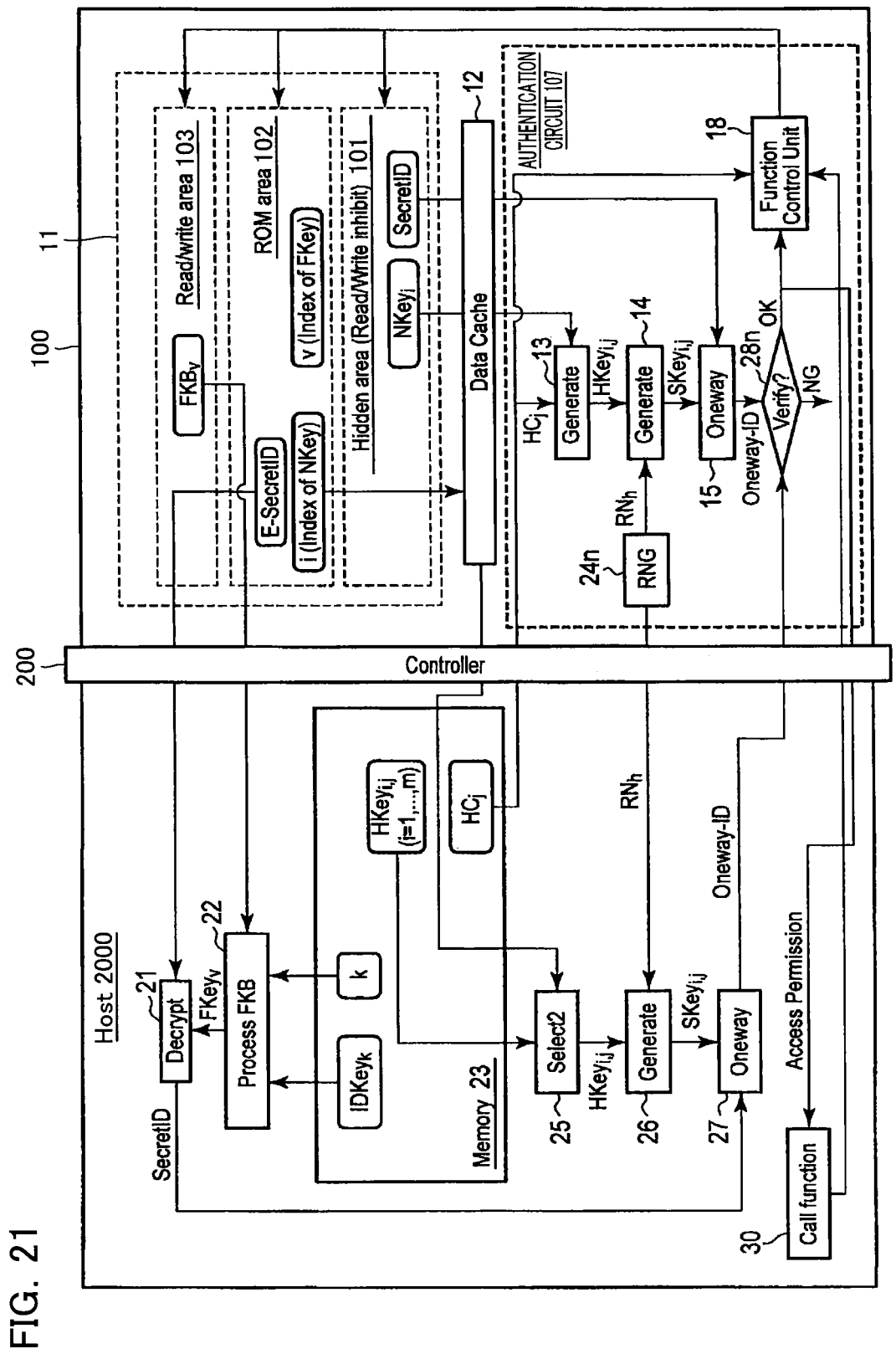
FIG. 21 is a block diagram showing a configuration example of a memory system according to the sixth embodiment.

Next, a sixth embodiment will be described with reference to FIG. 21. The sixth embodiment relates to an example in which a NAND flash memory 100 authenticates a host device 2000. The present embodiment shows a method of reading secret identification information SecretID in the NAND flash memory 100 in a state it is hidden from third parties. It also shows a method of reliably determining that the data has been read from the NAND flash memory 100. It also shows a method by which the NAND flash memory 100 inspects the host device 2000 based on the read data.

In the description, overlapping points with the above embodiments will be omitted.

<Memory System>

A memory system according to the sixth embodiment will be described with reference to FIG. 21. As shown in the figure, the present embodiment is different from the fourth embodiment in that the NAND flash memory 100 further includes a function controller 18, a random number generator 24n, and a data verification unit 28n, and the host device 2000 further includes a function call unit 30.

The random number generator (RNG) 24n generates a random number RNn used for authentication.

The data verification unit (Verify) 28n compares one-way conversion identification information Oneway-ID received from the host device 2000 and one-way conversion identification information Oneway-ID obtained from a one-way converter 15 in the NAND flash memory 100 to see whether both Oneway-IDs match. If both values match, the data verification unit 28n determines that the host device 2000 has obtained the correct Oneway-ID (OK) and if both values do not match, the data verification unit 28n determines that the host device 2000 has not obtained the correct Oneway-ID (NG).

Only if the host device 2000 obtains the correct Oneway-ID (OK), the function controller 18 enables a predetermined function on a memory 100 so that the predetermined function of the NAND flash memory 100 is made available to the host device 2000. Further, the constant HCj received from the host device 2000 may be input to the function controller 18 so that the predetermined function is controlled in accordance with HCj. The predetermined function will separately be described below.

The function call unit 30 executes the process of calling a predetermined function of the NAND flash memory 100 when the host device 2000 receives access permission information indicating that the NAND flash memory 100 has verified the authenticity of Oneway-ID generated by the host device 20.

<Authentication Flow>

Next, the authentication flow of a memory system according to the sixth embodiment will be described with reference to FIG. 22.

(Steps S11 to S14)

As shown in Figures, the same process as in the fourth embodiment is executed from the authentication start (Start) to steps S11 to S14.

(Step S51)

Subsequently, when index information i is received, the host device 2000 sends out a random number generation request (Request RNn) to the NAND flash memory 100.

(Step S52)

Subsequently, the NAND flash memory 100 receives the request and generates RNn by the random number generator 24n. The generated RNn is sent out to the host device 20.

(Steps S21 to S23)

Subsequently, the host device 2000 executes a process similar to steps S21 to S23 in the fourth embodiment.

(Step S53)

Subsequently, the host device 2000 requests for an authentication (Request authentication) to the NAND flash memory 100 and sends out the constant HCj and one-way conversion identification information Oneway-ID.

(Steps S17 to S20)

Subsequent to a process similar to steps S17 to S19 described above, in step S20, the NAND flash memory 100 executes a one-way conversion process by the one-way converter 15 on the secret information SecretID by using the generated SKeyi,j to generate one-way conversion identification information Oneway-ID (=Oneway(SKeyi,j, SecretID)).

(Step S54)

Subsequently, the NAND flash memory 100 verifies that the received one-way conversion identification information Oneway-ID and one-way conversion identification information Oneway-ID generated by the NAND flash memory 100 match. If both pieces of one-way conversion identification information Oneway-ID match (OK), the NAND flash memory 100 determines that the SecretID is an authentic ID. If both pieces of the one-way conversion identification information Oneway-ID do not match (NG), the NAND flash memory 100 determines that the secret information SecretID is an unlawful ID. Then, the NAND flash memory 100 returns the determination result to the host device 2000 and also gives permission (Permission) of call acceptance of a predetermined function.

(Step S55)

Subsequently, if the determination result in step S54 is a match (OK), the NAND flash memory 100 enables a predetermined function in the function controller 18 so that the predetermined function of the NAND flash memory 100 is made available to the host device 20.

(Step S56)

Subsequently, if the host device 2000 receives access permission information (Access Permission) indicating that the NAND flash memory 100 has verified authenticity of one-way conversion identification information Oneway-ID generated by the host device 2000, the host device 2000 returns an instruction to call the predetermined function through the function call unit 30.

(Step S57)

Subsequently, the NAND flash memory 100 receives a function call and executes the process in the function controller 18 according to the function call instruction received from the host device 2000 to return a status (Status) of the process result.

In this case, HCj received from the host device 2000 may be input to the function controller so that the predetermined function is controlled in accordance with HCj. The predetermined function will separately be described below.

<Advantageous Effects>

According to the authenticator, authenticatee and authentication method according to the sixth embodiment, at least the advantageous effects (1) to (3) similar to those in the fourth embodiment can be obtained. Further, at least the following advantageous effects (4) and (5) can be obtained.

(4) The NAND flash memory 100 can authenticate the host device 20.

The sixth embodiment is different from the fourth embodiment in that the NAND flash memory 100 further includes the function controller 18, the random number generator 24n, and the data verification unit 28n, and the host device 2000 further includes the function call unit 30.

Thus, according to the above configuration, the authentication function can be controlled in such a way that, for example, when the host device 2000 accesses the NAND flash memory 10, the NAND flash memory 100 provides a predetermined function only if the host device 2000 is reliable enough.

Thus, according to the present embodiment, recording media such as NAND flash memories that are normally authenticatees can advantageously authenticate the host device 2000 the other way round, as required.

(5) A mechanism that further controls whether to provide a predetermined function in accordance with peculiar information (constant HCj) of the authenticated host device 2000 can advantageously be provided. Details of the predetermined function will be described below.

[Seventh Embodiment (Mutual Authentication)]

Next, a seventh embodiment will be described. The seventh embodiment relates to an example in which a NAND flash memory 100 and a host device 2000 mutually authenticate.

In the description, overlapping points with the above embodiments will be omitted.

<Memory System>

Figure 23:
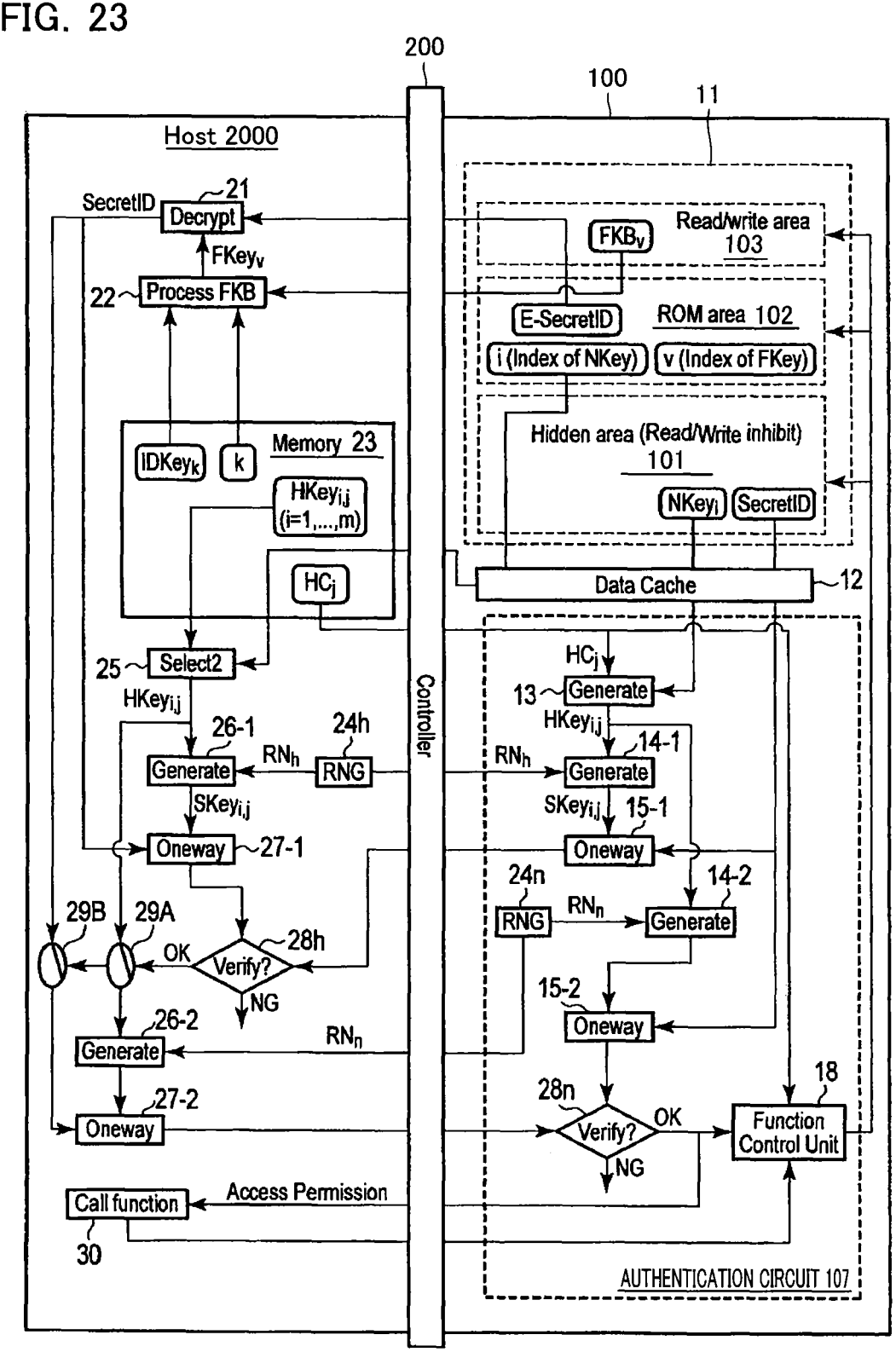
FIG. 23 is a block diagram showing an overall configuration example of a NAND chip according to the seventh embodiment.

A memory system according to the seventh embodiment will be described by using FIG. 23.

As shown in the figure, the present embodiment includes a configuration substantially combining a memory system according to the fourth embodiment and a memory system according to the sixth embodiment.

More specifically, the NAND flash memory 100 and the host device 2000 include random number generators 24n, 24h, generators 14-2, 26-2, one-way converters 15-2, 26-2, and data verification units 28n, 28h. Further, the present embodiment is different from the sixth embodiment in that the host device 2000 further includes a switch unit 29B.

The operation of each of the configurations is the same as in the above embodiments.

<Authentication Flow>

Next, the authentication flow of a memory system according to the seventh embodiment will be described with reference to FIG. 24. In principle, the authentication flow according to the present embodiment performs an authentication operation (the host device authenticates the NAND flash memory) according to the fourth embodiment and then performs an authentication operation (the NAND flash memory authenticates the host device) according to the sixth embodiment.

(Steps S11 to S24)

As shown in the figure, when the authentication is started (Start), first the host device 2000 authenticates the NAND flash memory 100 by following steps S11 to S24 similar to those in the fourth embodiment.

At this point, similar authentication is performed by using a random number RNh generated by the random number generator 24h.

(Steps S51 to S70)

Subsequently, if the determination result in step S24 is a match (OK), the authentication of the NAND flash memory 100 is determined to be completed.

Subsequently, the NAND flash memory 100 authenticates the host device 2000 by following steps S51 to S70 similar to those in the sixth embodiment.

At this point, similar authentication is performed by using a random number RNn generated by the random number generator 24n.

With the above steps, the authentication operation according to the seventh embodiment is completed (End).

<Configuration Example of the Function Control>

Next, a configuration example of the function control will be described by using FIG. 25.

Note that the function control here is a control method of a predetermined function according to the sixth and seventh embodiments by which, when the NAND flash memory 100 is an authenticator and the host device 2000 is an authenticatee, the NAND flash memory 100 authenticates the host device 2000 and provides the predetermined function to the host device 2000 based on the authentication result.

The configuration of the function control shown in the figure is included in each of the NAND flash memories 100. The function control includes a function controller 18 included in an authentication circuit 107, a parameter register 89, and a sequence control circuit 88.

The function controller 18 contained in the authentication circuit 107 controls functions to provide the predetermined function to the host device 2000 based on an authentication result or peculiar information (constant HCj or the like) of the host device 2000 as required. The function controller 18 updates control parameters 890 contained in the parameter register 89 based on an authentication result or peculiar information of the host device 20.

The control parameters 890 in the parameter register 89 contain at least one piece of access permission information (#0, #1, . . . , #3). For example, the access permission information #0 contains block addresses, page addresses, read attributes, write attributes, erase attributes, peculiar information, or the like. A block address shows control of the memory cell array 11 associated with the block address. A page address shows control of the memory cell array 11 associated with the page address. A read attribute shows read permission information associated with a block address, or a block address and a page address. A write attribute shows write permission information associated with a block address, or a block address and a page address. An erase attribute shows erase permission information associated with a block address, or a block address and a page address. Peculiar information indicates that the access permission information is a control parameter of the host device 2000 having the same peculiar information.

Each piece of the access permission information (#0, #1, . . . , #3) does not have to contain all the above information and may contain information in accordance with the needed control level. For example, specific information may not be contained if the control based on the peculiar information (such as the constant HCj) of the host device 2000 is not needed. Further, the page address may not be contained if the control in units of pages is not needed. Further, the block address may not be contained if the control in any block address is not needed and, for example, the control is intended for a predetermined block only or the whole NAND flash memory 100. Similarly, regarding read attributes, write attributes, and erase attributes, only those attributes of functions that need the control may be contained.

The sequence control circuit 88 controls an operation sequence in accordance with a command (CMD) provided by the host device 2000 according to the control parameters 890. For a data read command, for example, the sequence control circuit 88 controls, based on read attributes of the access permission information in the control parameters 890, the operation of reading (Read) data or rejecting to read data in accordance with the provided read command. If reading is permitted in the read attributes, data can be read from a cell array 11. In addition, the above operation example applies also to the data write operation and data erase operation.

<Advantageous Effects>

According to the authenticator, authenticatee and authentication method according to the seventh embodiment, at least the advantageous effects (1) to (5) similar to those described above can be obtained.

According to the present embodiment, the NAND flash memory 100 and the host device 2000 can mutually authenticate.

Figure 25:
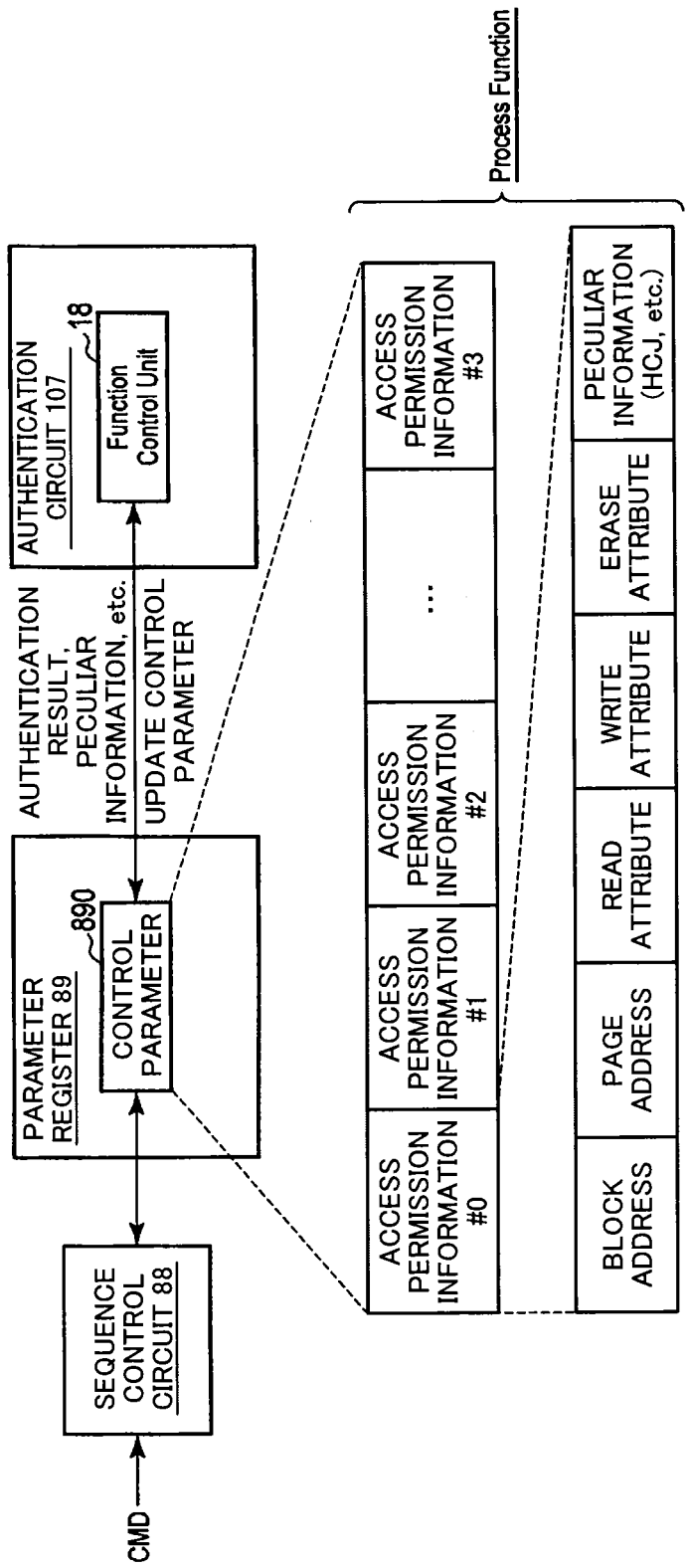
FIG. 25 shows an configuration example of function control.

Further, the NAND flash memory 100 according to the present embodiment realizes the function control by the configuration shown in FIG. 25. The sequence control circuit 88 can control an operation sequence in accordance with the provided command according to the control parameters 890. Thus, in the host device 2000 authenticated by the NAND flash memory 100, the host device 2000 can advantageously be permitted (Process function) to execute various function processes of the updated control parameters 890 based on peculiar information (constant HCj or the like) of the host device 2000.

Further, the NAND flash memory 100 according to the present example can include the function control of the configuration shown in FIG. 25 along with the sixth and seventh embodiments.

[Eighth Embodiment (Configuration Example of the NAND Flash Memory)]

Next, an eighth embodiment will be described. The eighth embodiment relates to a configuration example of a NAND flash memory 100 to which an authentication function according to the first to fourth embodiments is applied.

In the description, overlapping points with the above embodiments will be omitted.

<Overall Configuration Example of the NAND Flash Memory>

Figure 26:
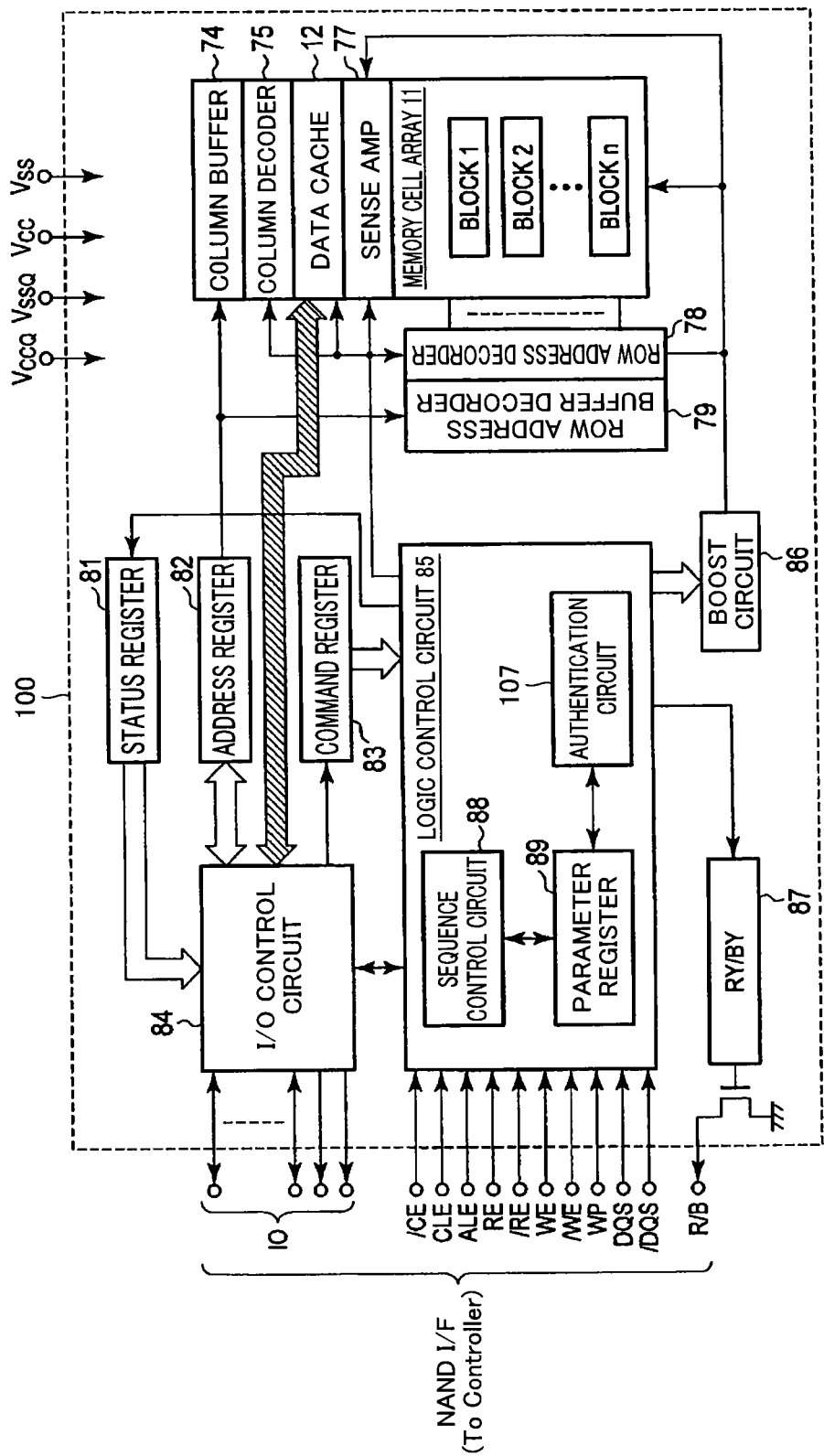
FIG. 26 is a block diagram showing an overall configuration example of a NAND chip according to an eighth embodiment.

An overall configuration example of the NAND flash memory 100 according to the eighth embodiment will be described by using FIG. 26.

As shown in the figure, the NAND flash memory 100 includes a memory cell array 11 and a peripheral circuit.

The memory cell array 11 includes a plurality of blocks BLOCK1 to BLOCKn. The configuration of each block, which will be described with reference to FIG. 27, contains a plurality of memory cell transistors MC, word lines WL, and bit lines BL. Data in the memory cell transistors MC in each block is erased by one operation. Data cannot be erased in units of memory cell transistors or pages. That is, individual blocks are the minimum erasure units.

The peripheral circuit includes a sense amplifier 77, an input/output control circuit 84, a logic control circuit 85, and the like.

The sense amplifier 77 reads data of a memory cell (memory cell transistor MC) in the memory cell array 11 via the bit line BL and detects the state of a memory cell in the memory cell array 11 via the bit line BL.

A data cache 12 temporarily holds data read from the sense amplifier 77 or data to be supplied to the sense amplifier 77.

A column decoder 75 selects the specific bit line BL, sense amplifier or the like based on an address signal supplied via an IO terminal from outside the NAND flash memory 10.

A column address buffer 74 temporarily holds address signals to supply the address signals to the column decoder 75.

A row decoder 78 receives various voltages needed for reading, writing, or erasing data from a voltage generator 86 to apply such voltages to the specific word lines WL based on an address signal.

A row address buffer decoder 79 temporarily holds address signals to supply the address signals to the row decoder 78.

The voltage generator 86 receives reference power supply voltages VSS, VCC, voltages VSSQ, VCCQ and the like to generate a voltage needed for writing, reading, or erasing data from these voltages.

The input/output control circuit 84 receives various commands that control the operation of the NAND flash memory 10, address signals, and write data via the IO terminal and also outputs read data. Address signals output from the input/output control circuit 84 are latched by an address register 82. Latched address signals are supplied to the column address buffer 74 and the row address buffer decoder 79. Commands output from the input/output control circuit 84 are latched by a command register 83. A status register 81 holds various status values for the input/output control circuit 84.

The NAND flash memory 100 receives various control signals for controlling a command, address, IO terminal for data input/output, and operation from outside as an external interface (NAND I/F). Control signals include, for example, a chip enable /CE, command latch enable CLE, address latch enable ALE, read enable RE and /RE, write enable WE and /WE, write protect WP, and clocks DQS, /DQS.

These control signals are received at corresponding terminals, and then transferred to the logic control circuit 85. The logic control circuit 85 controls the input/output control circuit 84 based on control signals to permit or inhibit a signal on the terminal IO from reaching the address register 82, the command register 83, a page buffer 12 or the like as a command, address, or data via the input/output control circuit 84. The logic control circuit 85 also receives a latched command from the command register 83.

Of control signals, a WE terminal supplies a data input clock, an RE terminal supplies a data output clock, a DQS terminal transmits a data input/output clock, a CLE terminal is intended for enabling that input data input as a command, an ALE terminal is intended for enabling that inputs data input as an address, and a CE terminal is intended to enable overall functions of data input/output.

An R/B terminal indicates an internal operating state of the NAND flash memory 10, a WP terminal transmits a write prevention signal to prevent erroneous writing, and Vcc/Vss/Vccq/Vssq terminals are used to supply power. Also in the present embodiment, a /RE terminal, /WE terminal, and /DQS terminal that transmit respective complementary signals are present for the RE terminal, WE terminal, and DQS terminal as terminals (Toggle) used when data transmission is realized by a high-speed interface.

The logic control circuit 85 includes a sequence control circuit 88, a parameter register 89, and an authentication circuit 107. The logic control circuit 85 also manages output of a ready/busy signal (R/B). More specifically, the logic control circuit 85 outputs a busy signal while the NAND flash memory 100 is busy.

The sequence control circuit 88 receives a command from the command register 83. The sequence control circuit 88 controls the sense amplifier 77, the voltage generator 86 and the like so that the process (such as reading, writing, or erasing data) instructed by the command can be performed based on the received command.

The parameter register 89 holds a variety of the control parameters 890 specifying the operation of the logic control circuit 85. The control parameters 890 are referred to or updated by the sequence control circuit 88 and used for control of a sequence of the logic control circuit 85 or the input/output control circuit 84.

The authentication circuit 107 executes the process related to the authentication. For example, as described above, the authentication circuit 107 also updates data, for example, rewrites the control parameters 890 contained in the parameter register. The authentication circuit 107 receives a command requesting the authentication and performs a specific operation for the authentication by using specific data in the memory cell array 11 to output the result out of the memory 10. In the process of executing a series of operations, the authentication circuit 107 permits the sequence control circuit 88 to read or write necessary data through updates of the control parameters 890.

A ready/busy circuit (RY/BY) 87 makes a notification of an R/B signal out of the NAND flash memory 100 via a switch transistor under the control of the logic control circuit 85.

<Configuration Example of the Block (BLOCK)>

Figure 27:
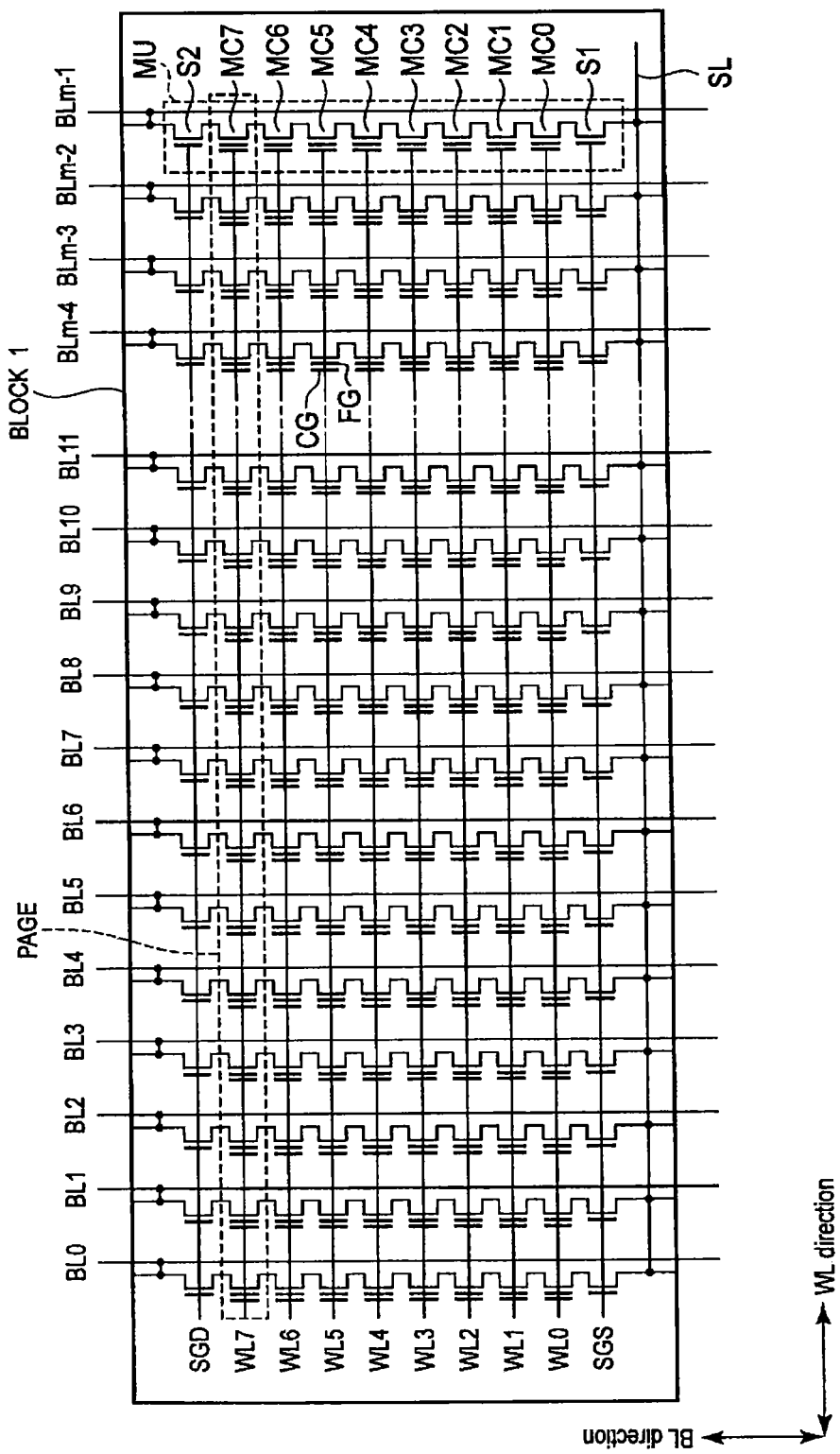
FIG. 27 illustrates configurations of blocks Block1-n of the NAND type flash memory 100.

Next, a configuration example of the block (BLOCK) forming the memory cell array 11 will be described by using FIG. 27. BLOCK1 in FIG. 27 is taken as an example for the description. Data in memory cells in the block BLOCK1 is erased, as described above, by one operation and thus, the block is the unit of data erasure.

The block BLOCK1 includes a plurality of memory cell units MU arranged in a word line direction (WL direction). The memory cell unit MU includes a NAND string (memory cell string) formed of eight memory cells MC0 to MC7 arranged in a bit line direction (BL direction) intersecting the WL direction and whose current path is connected in series, a select transistor S1 on the source side connected to one end of the current path of the NAND string, and a select transistor S2 on the drain side connected to the other end of the current path of the NAND string.

In the present embodiment, the memory cell unit MU includes eight memory cells MC0 to MC7, but may include two memory cells or more, for example, 56 or 32 memory cells and the number of memory cells is not limited to 8.

The other end of the current path of the select transistor S1 on the source side is connected to a source line SL. The other end of the current path of the select transistor S2 on the drain side is connected to a bit line BL provided above each memory cell unit MU corresponding to the memory cell unit MU and extending in the BL direction.

The word lines WL0 to WL7 extend in the WL direction to be commonly connected to control gate electrodes CG of a plurality of memory cells in the WL direction. A select gate line SGS extends in the WL direction to be commonly connected to a plurality of select transistors S1 in the WL direction. A select gate line SGD also extends in the WL direction to be commonly connected to a plurality of select transistors S2 in the WL direction.

A page exists for each of the word lines WL0 to WL7. For example, as shown by being surrounded with a broken line in the figure, page 7 (PAGE7) exists in the word line WL7. Because a data read operation or data write operation is performed for each page (PAGE), the page (PAGE) is the data read unit and the data write unit.

<Configuration Example of the Cell Array>

Figure 28:
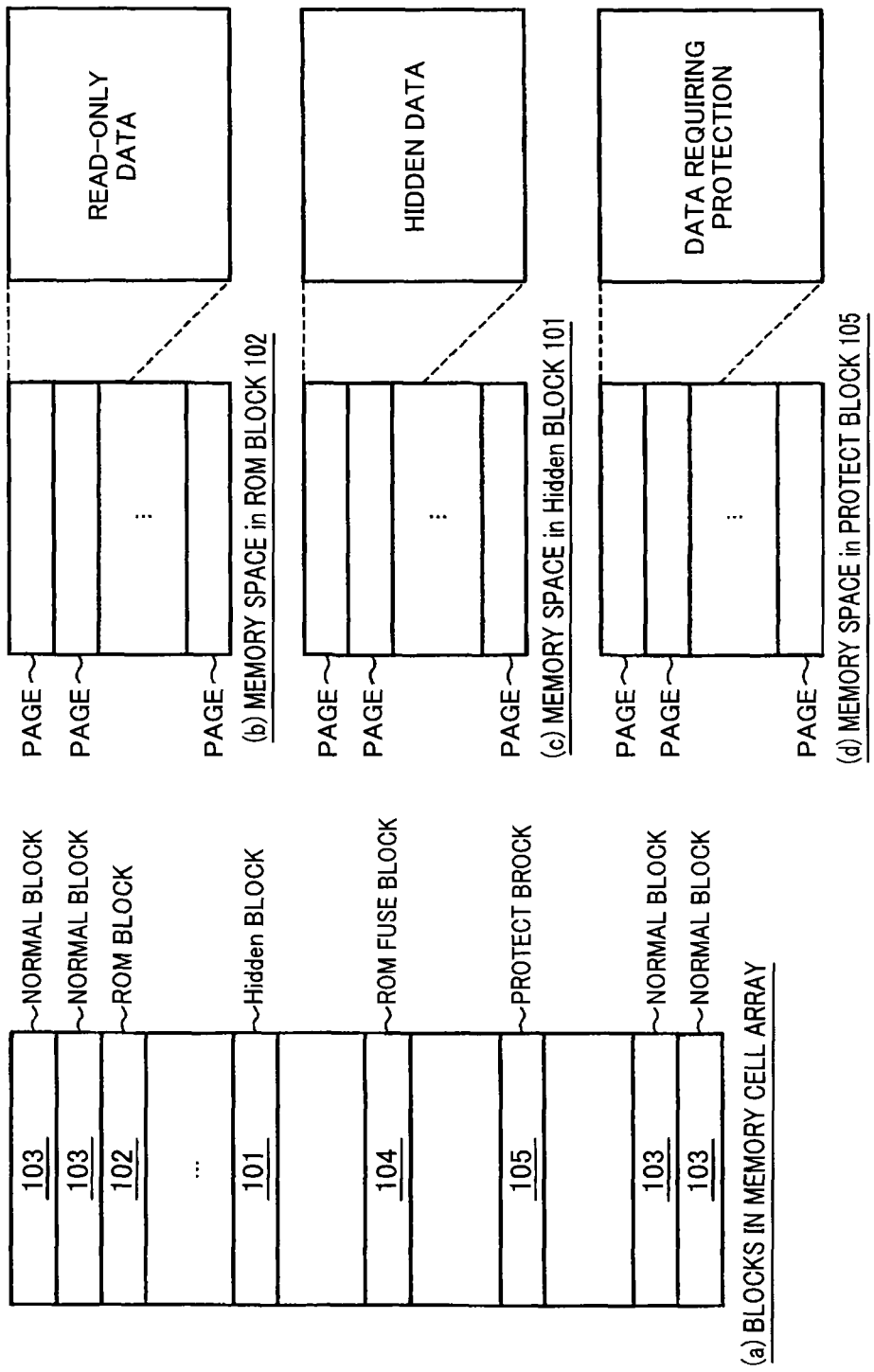
FIG. 28 shows a configuration of the memory cell array 11.

Next, the structure of the memory cell array 11 will be shown by using FIG. 28. As shown in (a), the memory cell array 11 includes a plurality of blocks (BLOCK) of a hidden area 101, a ROM block 102, a normal block 103, a ROM fuse block 1044, a protected block 1105 and the like. Each block includes, as described above, a plurality of pages. Normally, data is read or written in units of pages and data is erased in units of blocks.

As described above, both data writing and data reading are permitted to the normal block 103, which is used for normal data holding. The normal block corresponds to the above read/write area 103. The number of blocks is not specifically limited.

As described above, the hidden area 101 and the ROM block 102 are applied to the above authentication operation. The hidden area 101 corresponds to the above hidden area 101. The ROM block 102 corresponds to the above ROM area 102. The number of blocks is not specifically limited in both cases.

In the present embodiment, as shown in (b), read-only data is further recorded in the memory space of the ROM block 102.

In the present embodiment, as shown in (c), hidden data is further recorded in the memory space of the hidden area 101.

In the present embodiment, as shown in (d), protected data used by the authentication function described below is further recorded in the memory space of the protected block 11-5.

The ROM fuse block 104 is used, for example, for holding parameters for operation control of the NAND flash memory 10.

<Read-Only Data in the ROM Block>

Next, read-only data in the ROM block 102 will be described by using FIG. 29.

As shown in (a), read-only data is recorded in some page in the memory space of the ROM block 102. If read-only data is a sequence of read-only data A to Z, FIG. 29 shows three examples (b-1) to (b-3) intended for error correction of data.

As shown in (b-1), the first data pattern is an example of repeatedly recording the same data (A, A, , , , B, B, , , , ). In this case, error corrections can be made by reading read-only data repeatedly by the host device 2000 and making a majority vote determination by an error correction unit in the host device 2000 or the like. Alternatively, error corrections can be made by reading read-only data repeatedly by the controller 200 and making a majority vote determination by an error correction unit in the controller 200 or the like. Alternatively, error corrections can be made by making a majority vote determination of read-only data read repeatedly by an error correction unit in the NAND flash memory 10. For example, the number of times of repetition is desirably 16 times or more.

As shown in a second data pattern of (b), the second data pattern is an example of repeatedly recording a complementary data pair formed of data (A, B, , , , ) and inverted data thereof (inversion of A, inversion of B, , , , ). In this case, error corrections can be made by reading read-only data repeatedly by the host device 2000 and making a majority vote determination in consideration of complementary data pairs by an error correction unit in the host device 2000 or the like. Alternatively, error corrections can be made by reading read-only data repeatedly by the controller 200 and making a majority vote determination in consideration of complementary data pairs by an error correction unit in the controller 200 or the like. Alternatively, error corrections can be made by making a majority vote determination in consideration of complementary data pairs of read-only data read repeatedly by an error correction unit in the NAND flash memory 100.

Note that the reason why complementary data pairs are repeatedly recorded is due to an error mode of the NAND flash memory 100. The NAND flash memory 100 writes data by applying a predetermined voltage to the memory cell MC to inject electrons into a floating gate FG. Data is read by using a threshold voltage that varies depending on whether electrons are present in the floating gate FG of the memory cell MC. Data is erased by applying a voltage in the opposite direction of the voltage when data is written to extract electrons from the floating gate FG into the substrate. Though the amount of voltage application and a gate applied with the voltage in reading, writing, and erasing data are different, the voltage is applied in the memory cell MC in all these cases. Typical error modes of the NAND flash memory 100 caused by this principle include read program disturb and data retention problem. Read program disturb is an error mode in which data changes due to a change of the amount of electrons in the floating gate FG after repeatedly reading the local or adjacent pages or writing data into adjacent pages. Thus, a state of the memory cell changes to a weak program state, increasing the threshold voltage in most cases. Data retention problem is an error mode in which data changes because electrons are drawn from the floating gate after a page once written being left for a long time. Thus, a state of the memory cell changes to a weak erasure state, decreasing the threshold voltage in most cases. That is, there is a general trend of increase or decrease in these defective modes and thus, errors of data are likely to occur in the same direction.

Thus, data is recorded as complementary data as shown in second data pattern of (b-2). In this case, if data is 1 (unrecorded), inverted data thereof is 0 (recorded). Accordingly, both pieces of data shift in the 0 direction (increase of threshold voltage) for read program disturb. Conversely, both pieces of data shift in the 1 direction for data retention. Thus, whether at least an error has occurred can be determined more easily by storing complementary data. In this case, for example, the complementary data pair is desirably repeated at least eight times in the data pattern.

As shown in third data pattern of (b-3), the third data pattern is an example in which an error correcting code is further used in addition to read-only data (A, B, , , , Z). Because random errors occur in the NAND flash memory 100 in units of bits, for example, the BCH code, the LDPC code or the like capable of correcting random bit errors is desirable as the error correcting code.

In each example of the first to third data patterns, each piece of data may be randomized. Randomize is to make data to be recorded random by a method of, for example, calculating an exclusive OR of a generated random sequence and data to be recorded to eliminate data biases. The M sequence or the like may be used as the generation method of a random sequence.

In addition, in all examples of the first to third data patterns, each piece of data is recorded in a binary state. The binary state is a method of recording data by determining whether the threshold voltage in one memory cell belongs to a high level or a low level by setting one predetermined level as a reference and can hold information of 1 bit per memory cell. Such a recording method is generally called an SLC (Single Level Cell) recording. On the other hand, if data is recorded by determining to which level the threshold voltage in one memory cell belongs by setting a plurality of predetermined levels as a reference, information of a plurality of bits can be held by each memory cell. If, for example, four levels to which the threshold voltage belongs for recording, information of 2 bits can be held by each memory cell. Such a recording method is generally called an MLC (Multi Level Cell) recording. While the MLC recording can realize higher recording densities due to a larger recording capacity per cell, changes of recorded data with respect to shifts of the threshold voltage occur relatively more easily. Thus, it is desirable to record read-only data recorded in the ROM block 102 with a smaller number of bits per cell than normal data. In MLC of 4-level recording in which the number of bits per cell is 2, ROM data is desirably SLC-recorded. In MLC of 8-level recording in which the number of bits per cell is 4, ROM data is desirably recorded as MLC of 4-level recording in which the number of bits per cell is 2 or SLC-recorded.

<Configuration Example of ECC>

Next, a configuration example for performing the error correcting code (ECC) correction will be described, with reference to FIGS. 30-33.

Figure 29:
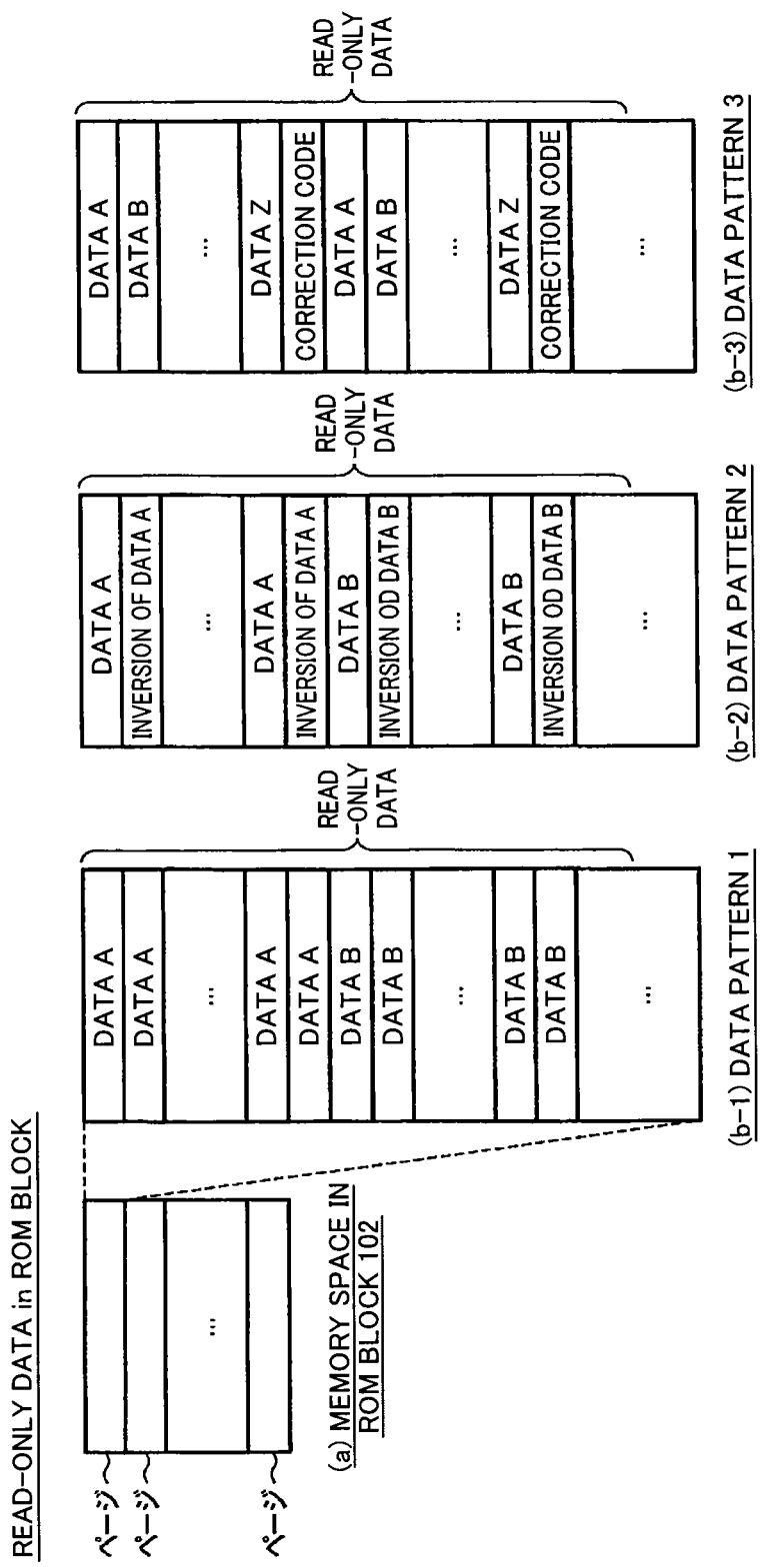
FIG. 29 explains read-only data in the ROM block 102.
Figure 30:
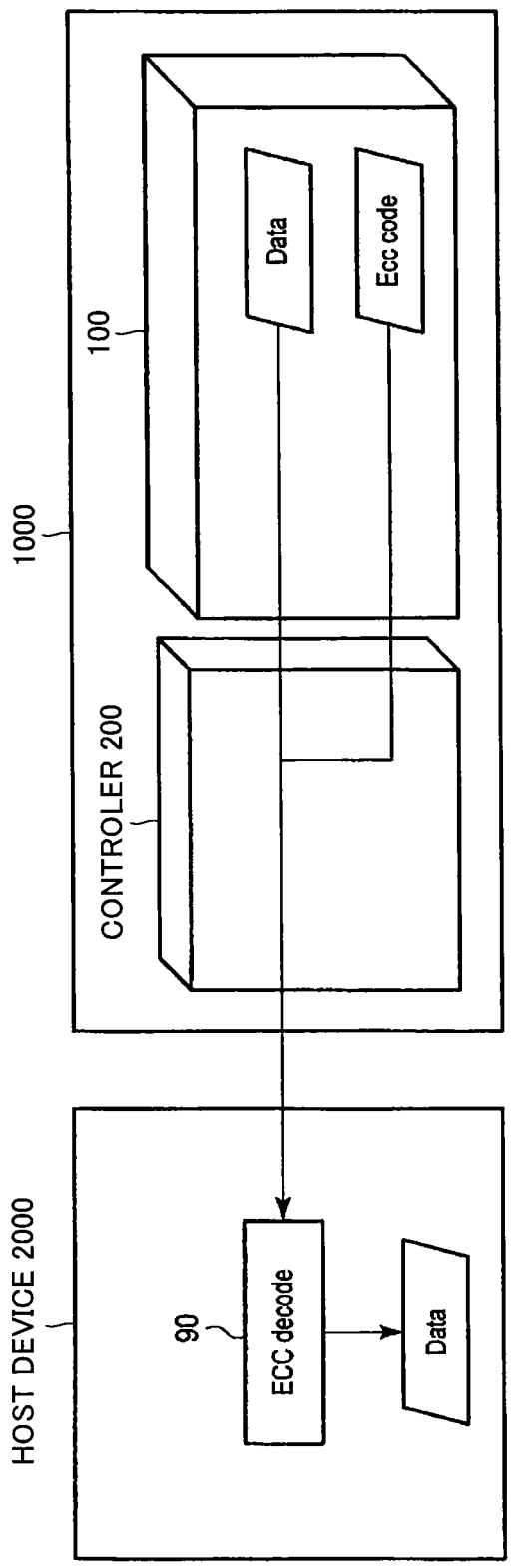
FIG. 30 is a block diagram showing a first configuration example of ECC.

The first to third data structures shown in FIG. 29 described above are different in a strict sense, but are considered to be correcting codes ECC in a broad sense that redundancy is attached to the original data. Thus, each data structure is considered to include data and a correcting code attached to the data. It is necessary for at least of the host device 2000, the controller 200, and the NAND flash memory 100 to have the corresponding correcting function.

Figure 22:
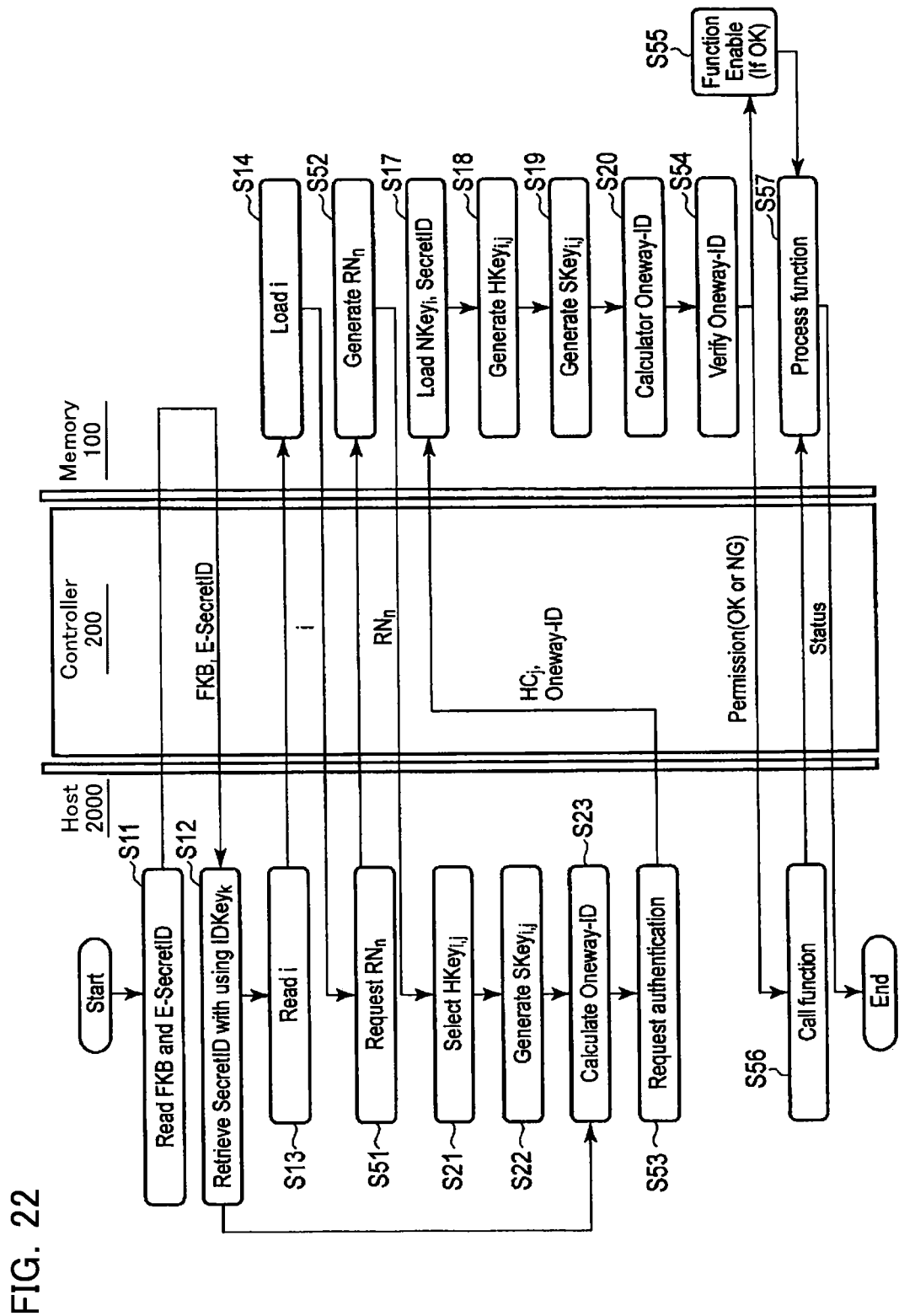
FIG. 22 is a flow chart showing the authentication flow of the memory system according to the sixth embodiment.

A first example shown in FIG. 22 is an example in which the host device 2000 has a correcting function (ECC decode) 90. In this case, the controller 200 and the NAND flash memory 100 do not execute a correcting process and deliver signed data (Data) to the host device 2000 and the host device 2000 executes the correcting process through the correcting function (ECC decode) 90 to generate predetermined data (Data).

Figure 31:
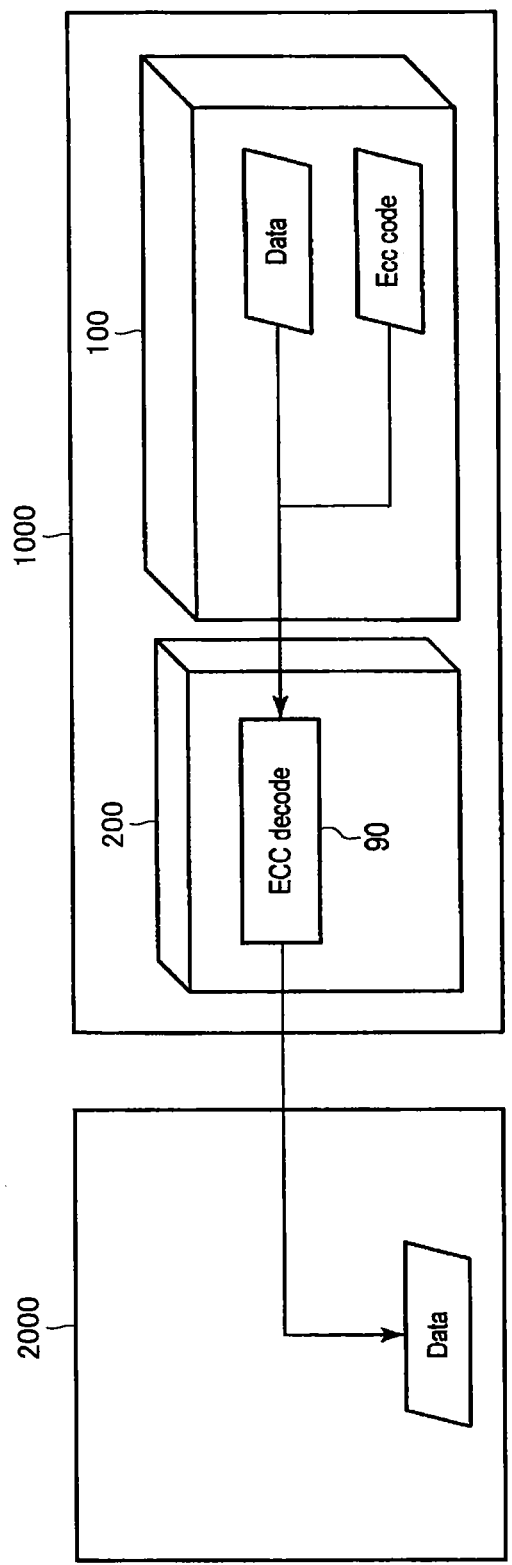
FIG. 31 is a block diagram showing a second configuration example of ECC.
Figure 32:
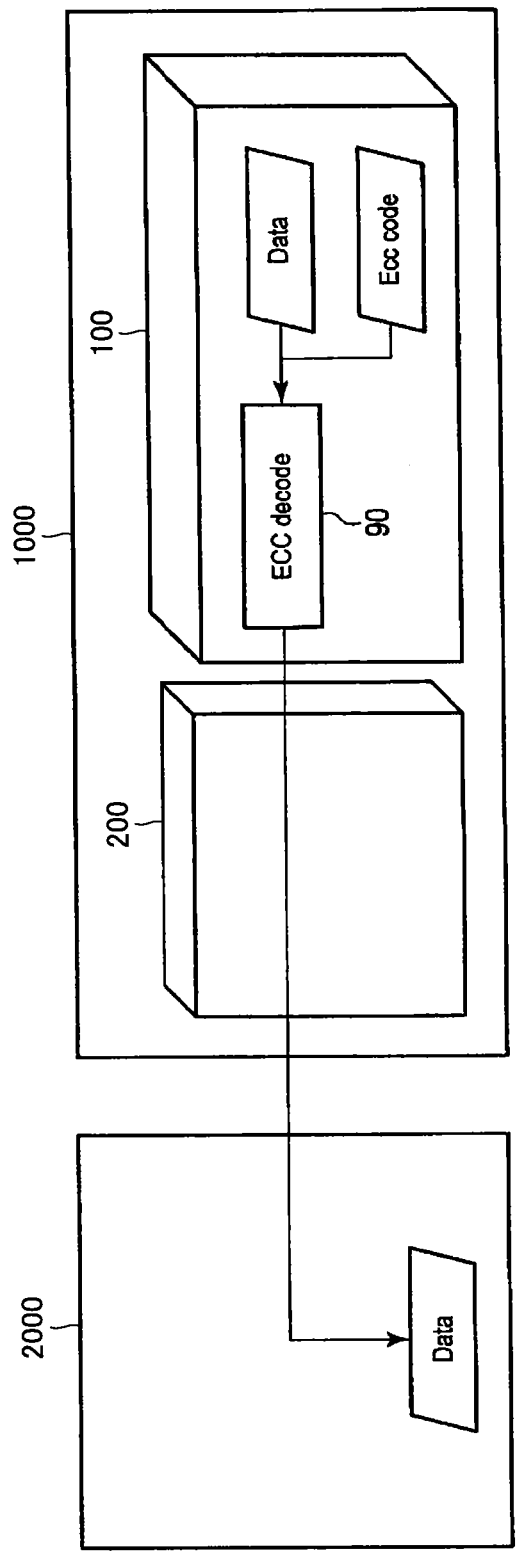
FIG. 32 is a block diagram showing a third configuration example of ECC.

A second example shown in FIG. 31 is an example in which the controller 200 has the correcting function (ECC decode) 90. In this case, the NAND flash memory 100 does not execute the correcting process, while the controller 200 executes the correcting process and delivers corrected data (Data) to the host device 2000.

Figure 24:
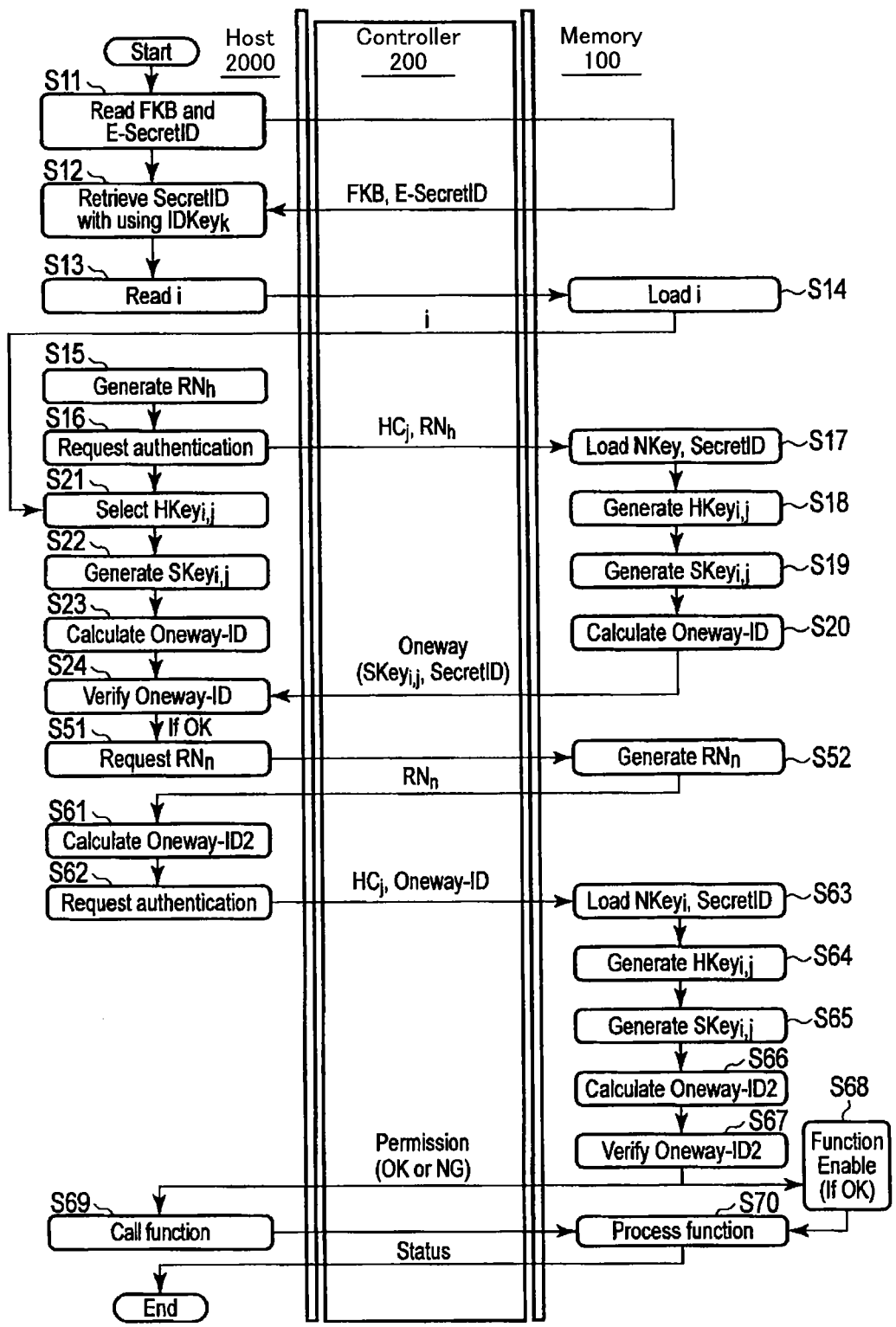
FIG. 24 is a flow chart showing the authentication flow of the memory system according to the seventh embodiment.

A third example shown in FIG. 24 is an example in which the NAND flash memory 100 has the correcting function (ECC decode) 90. In this case, the NAND flash memory 100 executes the correcting process and delivers corrected data (Data) to the host device 2000 via the controller 200.

Figure 33:
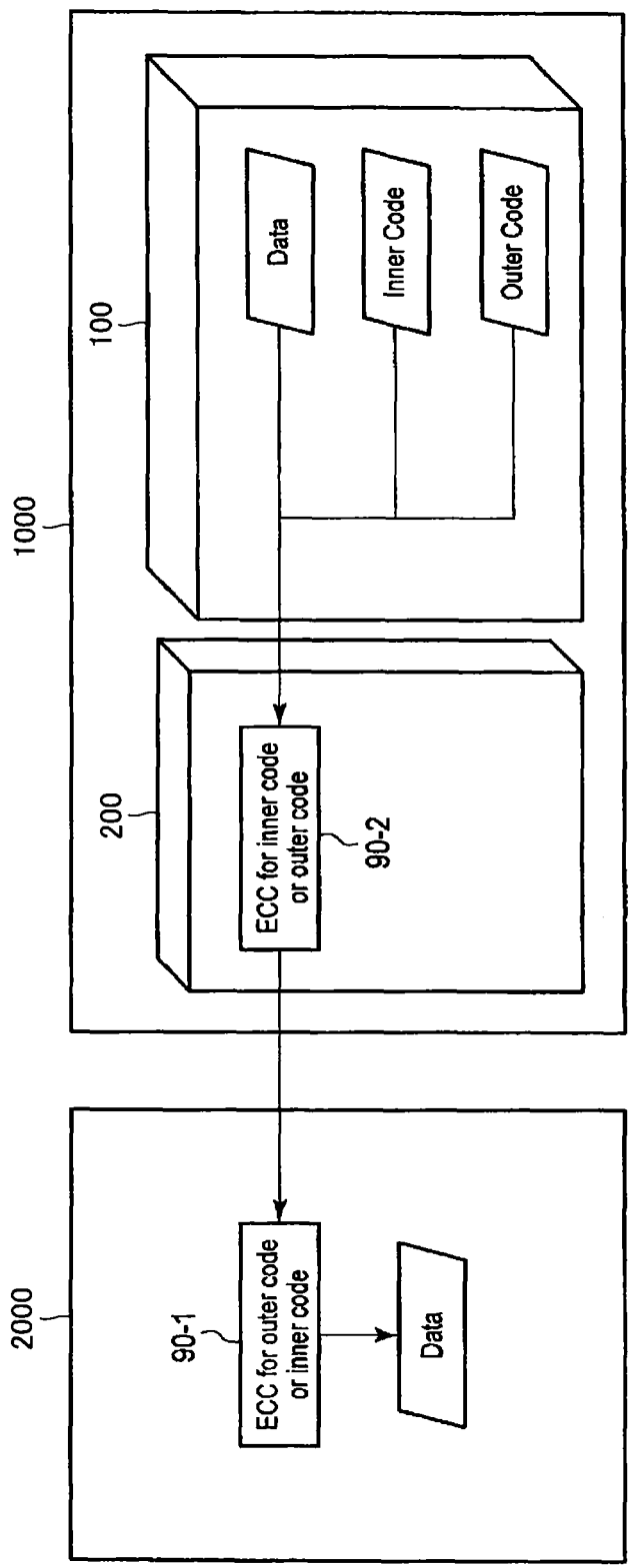
FIG. 33 is a block diagram showing a fourth configuration example of ECC.

A fourth example shown in FIG. 33 is an example in which both of the controller 200 and the host device 2000 have correcting functions 90-1, 90-2. In this case, first the attached correcting code has a double structure and the controller 200 and the host device 2000 each execute the correcting process of an inner code (Inner code) or outer code (Outer code).

However, the present embodiment is not limited to the above cases. The NAND flash memory 100, the controller 200, and the host device 2000 each can correct errors while cooperating in accordance with its own correcting function.

<Hidden Data in the Hidden Block 101>

Figure 34:
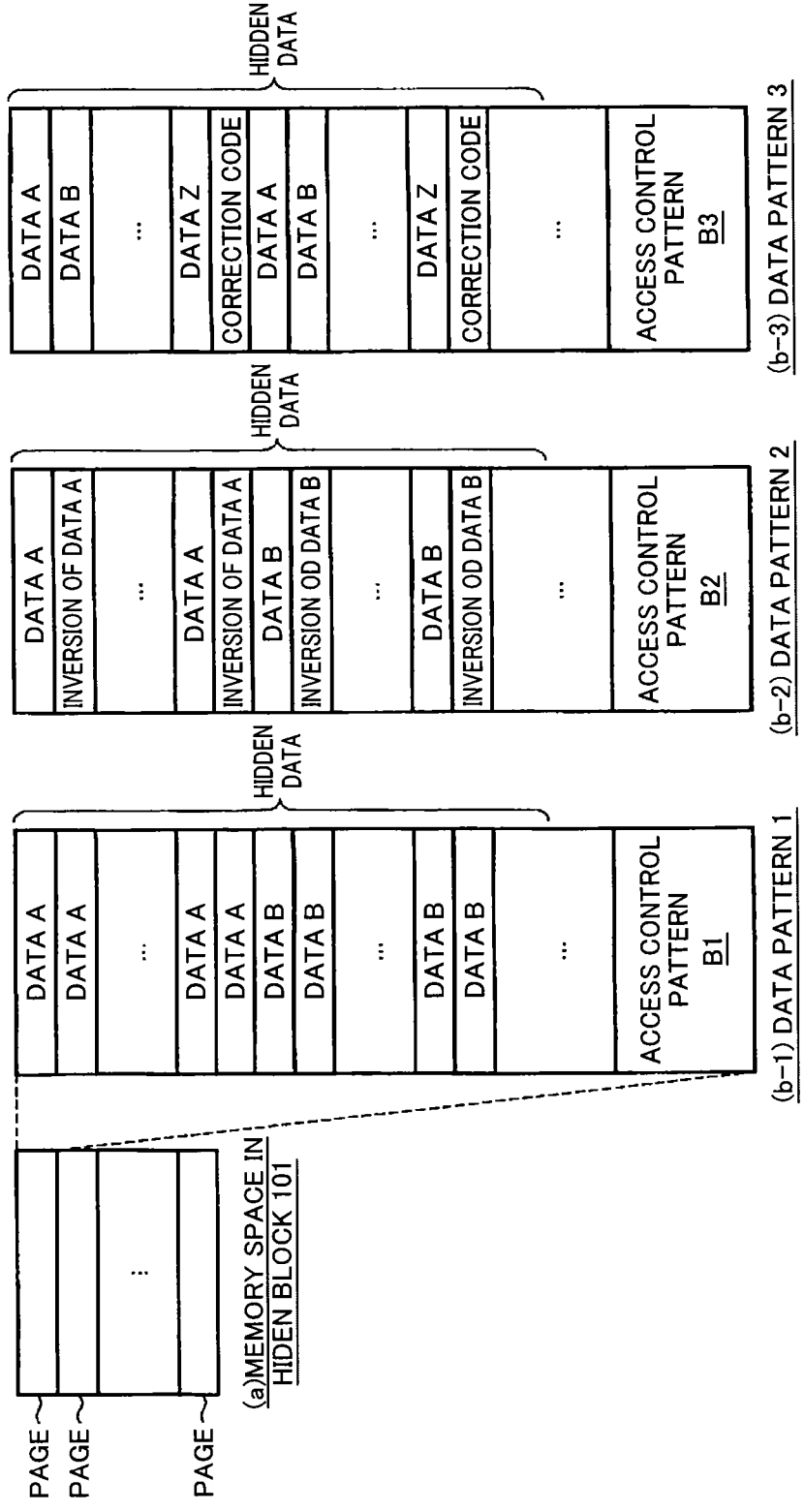
FIG. 34 is a diagram showing confidential data in a confidential block according to the eighth embodiment.

Next, an example of the holding state of hidden data in the hidden block 101 will be described by using FIG. 34.

As shown in (a), hidden data is recorded in pages in the memory space of the hidden block 101. If hidden data is a sequence of A to Z, FIG. 34 shows three examples.

In a first data pattern shown in (b-1), a plurality of pieces of hidden data (A, A, , , , B, B, , , , ) and an access control pattern B1 are stored.

In a second data pattern shown in (b-2), a plurality of pieces of hidden data (A, A, , , , B, B, , , , ), inverted data thereof, and an access control pattern B2 are stored.

In a third data pattern shown in (b-3), a plurality of pieces of hidden data (A, B, , , , Z), an error correcting code, and an access control pattern B3 are stored.

An objective of each example is similarly an error correction. Another objective is to control reading, writing, and erasure of the hidden block 101 or pages in the hidden block 101. Because the area records hidden data and also holds information used only inside the NAND flash memory 100 by the authentication circuit 107, it is necessary to inhibit all operations of reading, writing, and erasure from outside. On the other hand, in the initial stage of manufacturing the NAND flash memory 10, the area is unrecorded and hidden data needs to be written in one of the manufacturing stages. Further, because data retention performance of the memory cell in the initial state may be insufficient as characteristics of the NAND flash memory 10, it is necessary to cause the memory cell to perform operations of reading, writing, and erasure to inspect whether the memory cell can hold data as specified.

Thus, reading, writing, and erasure can be performed on the area 101 in the manufacturing stage, but it is necessary to inhibit all of reading, writing, and erasure from being performed on the area in shipment after manufacturing is completed. As information to cause the state change, the access control patterns B1, B2, B3 are recorded in the area 101.

The access control patterns B1, B2, B3 may be recorded for each page or only in the first page of a block. The recording position of the access control patterns B1, B2, B3 in a page may be a general data area or a redundant area. The redundant area is, for example, an area used by the controller or the like to attach a correcting code, an area used by the NAND flash memory 100 to record information to indicate the internal status for each page or the like.

It is also desirable to record, like ROM data, hidden data and the access control patterns B1, B2, B3 in binary (SLC) mode.

Figure 35:
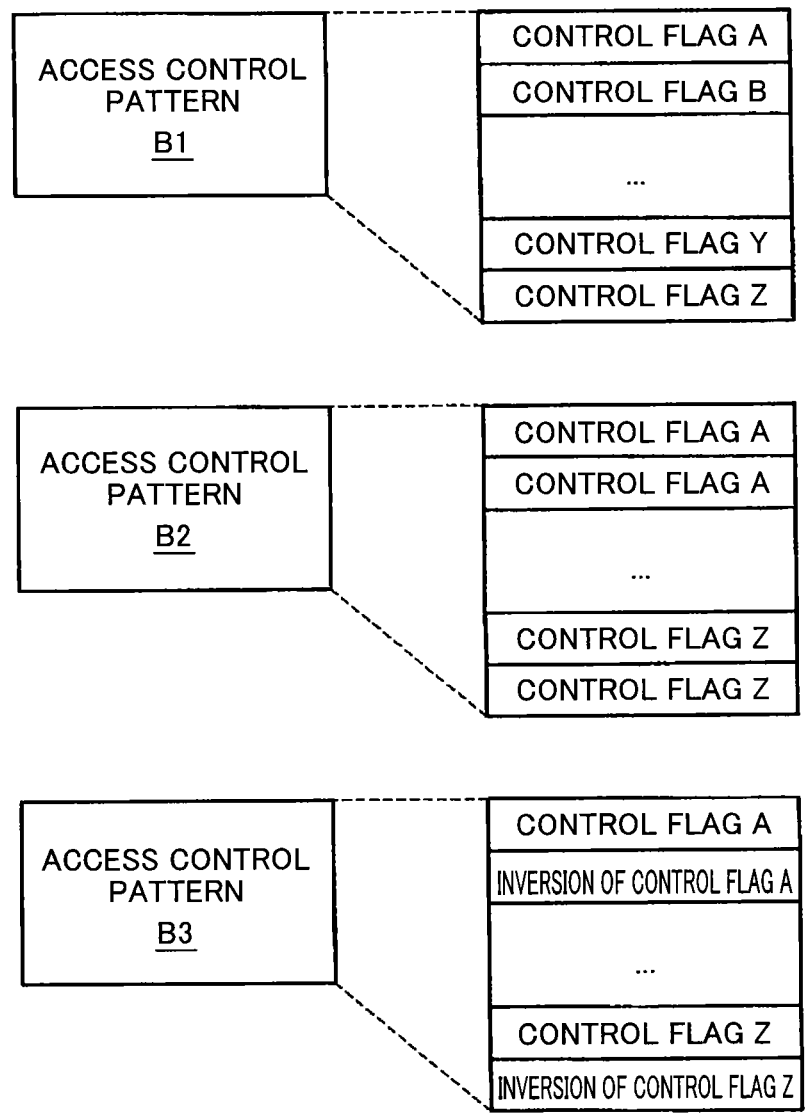
FIG. 35 is a diagram showing an example of an access control pattern according to the eighth embodiment.

Next, a configuration example of the access control pattern will be shown by using FIG. 35.

First, the access control pattern is formed of a plurality of bits to prevent losses caused by an error.

The access control pattern B1 as the first example is provided with a plurality of control flag bits A to Z, each of which is set as a predetermined pattern. If an access request of reading, writing, erasure or the like to the area is received from the host device 2000, the NAND flash memory 100 checks the access control pattern B1 of the area 101 against a predetermined pattern and inhibits access if the rate of matching of both is equal to a predetermined rate or more.

The access control pattern B2 as the second example is in accordance with a method of repeatedly recording control flags. This is effective in reducing the probability of an error of a predetermined pattern.

The access control pattern B3 as the third example is in accordance with a method of recording each control flag and inverted data of each control flag. As described above, this method is also effective in reducing the probability of an error.

<Usage Example of the Access Control Pattern>

Next, the method of sensing the access control pattern and how to use sensing results will be explained.

Figure 36:
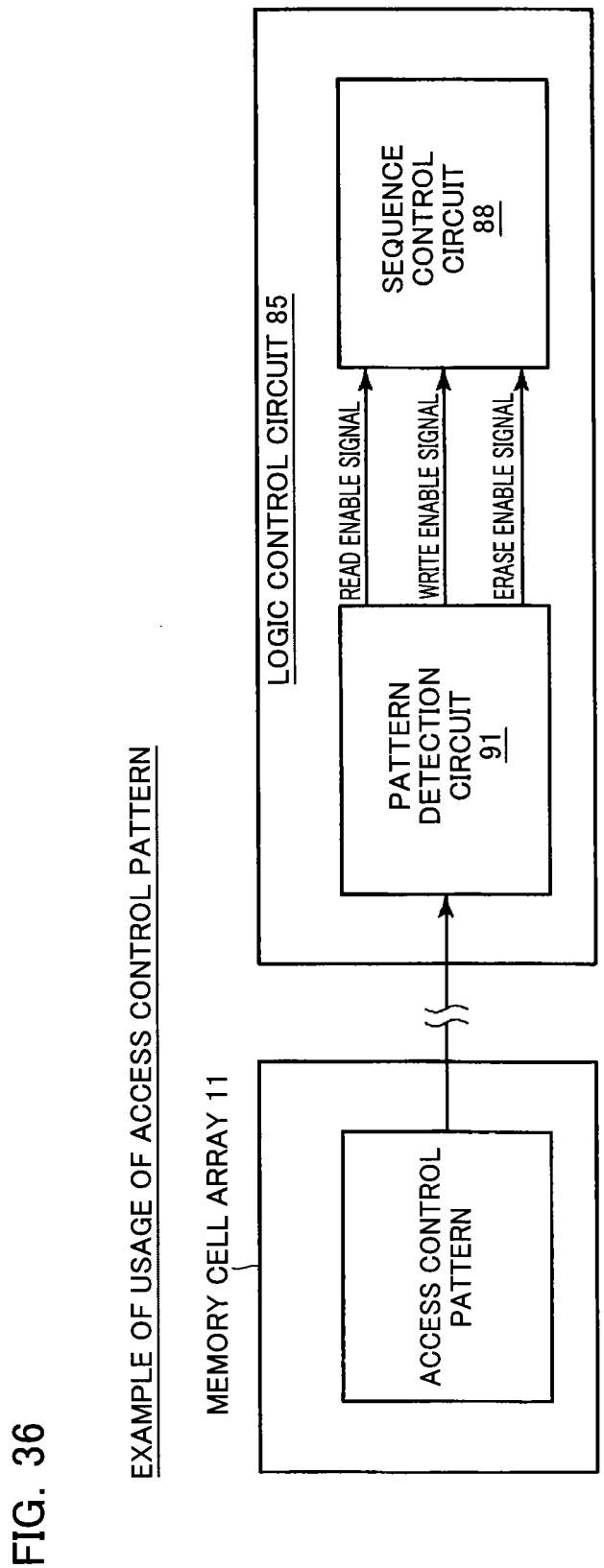
FIG. 36 is a block diagram showing a usage example of the access control pattern according to the eighth embodiment.

As shown in FIG. 36, the access pattern read from the hidden area 101 in the memory 100 is input into a pattern sensing circuit 91 in the logic control circuit 85.

The pattern sensing circuit 91 executes a pattern recognition process on the input access control pattern and determines whether the rate of matching is equal to a predetermined rate or more to control accessing. The rate of matching is calculated from an error probability in a memory cell array of the NAND flash memory 100 and the amount of data of access control patterns. It is desirable to set the rate of matching so that, for example, an error detection probability becomes at least $10^{-3}$ or less. The pattern sensing circuit 91 inputs an enable signal to control data reading, data writing, and data erasure into the sequence control circuit 88, based on a detection result.

The sequence control circuit 88 controls data reading, data writing, and data erasure according to the enable signal of the sensing result.

<Test Flow>

Figure 37:
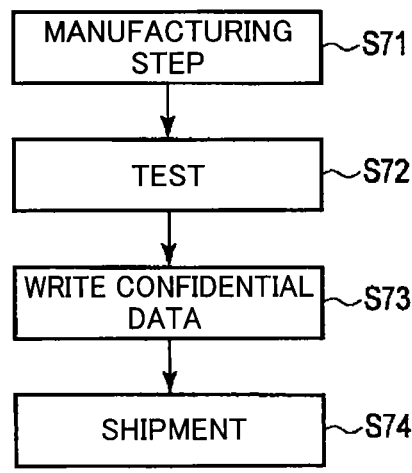
FIG. 37 is a diagram showing a test flow according to the eighth embodiment.

Next, the inspection flow of the manufacturing process of the NAND flash memory 100 using the above access control patterns (for example, B1 to B3) will be described with reference to FIG. 37.

(Steps S71, S72)

In the manufacturing process, first data that does not correspond to the access control patterns is recorded in the hidden area 101 and tested. In this stage, access to the hidden area 101 is permitted.

However, any of the different security levels may be set to the area 102 depending on whether all access of data reading, data writing, and data erasure are permitted, data writing and data erasure are permitted or the like. If a high security level is needed for the area 102, even if all access is inhibited by the access control patterns, erroneous access permission may be granted due to degradation of data of the access control patterns. In this case, hidden data may be read out and thus, even in the test process in step S71, data reading may be inhibited, that is, reading may not be permitted to the area 102 in the first place at the hard-wired level of the NAND flash memory 10.

Alternatively, if resistance to data degradation of the access control patterns is sufficient, for example, the access control patterns are repeatedly recorded many times or a strong error correcting code is attached, control including data reading may be performed by the access control patterns to ensure convenience of the test. In this case, the error detection probability shown above is still lower and, for example, $10^{-5}$ or lower is desirable.

(Step S73)

Subsequently, after the predetermined test in step S72 is completed, hidden data and the access control patterns (B1 to B3 and the like) are written into the hidden area 101.

(Step S74)

Subsequently, the NAND flash memory 100 is shipped with the above data written.

<Flow of Data Erasure>

Figure 38:
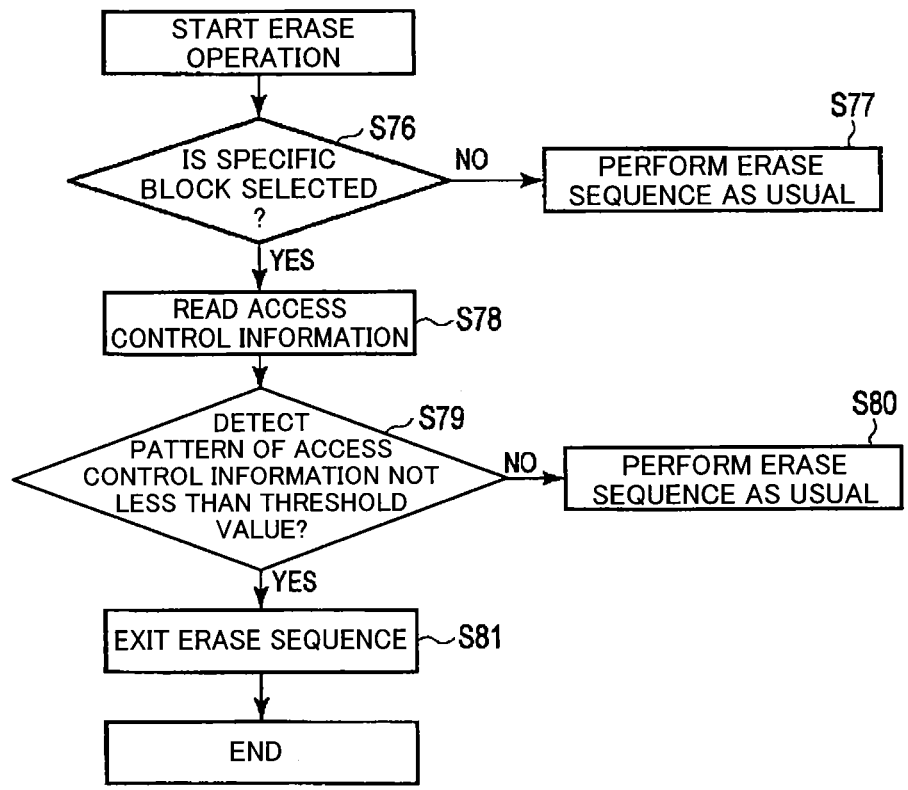
FIG. 38 is a diagram showing a data erasure flow according to the eighth embodiment.

Next, the data erasure operation inside the NAND flash memory 100 will be described with reference to FIG. 38.

(Step S76)

First, if an operation instruction of an erasure operation is issued by the host device 2000, the NAND flash memory 100 determines whether the selected block address in the instruction is a specific block.

(Step S77)

Subsequently, if the selected block address is not a specific block (No), the NAND flash memory 100 executes a normal erasure sequence.

(Step S78)

On the other hand, if the selected block address is a specific block (Yes), the NAND flash memory 100 reads access control information (B1 to B3 or the like) from the hidden area 101.

(Step S79)

Subsequently, the NAND flash memory 100 senses patterns of the access control information (B1 to B3 or the like) to determine whether the rate of pattern matching is equal to a predetermined value or more.

(Step S80)

Subsequently, if the rate of pattern matching is equal to the predetermined value or less (Yes), the NAND flash memory 100 executes a normal erasure sequence.

(Step S81)

Subsequently, if the rate of pattern matching is equal to the predetermined value or more (No), the NAND flash memory 100 exits the erasure sequence to terminate the data erasure flow (End).

In the present embodiment, data erasure is taken as an example, but the present embodiment can similarly be applied to data reading and data writing.

<Advantageous Effects>

According to the authenticator, authenticatee and authentication method according to the eighth embodiment, at least the advantageous effects (1) to (5) similar to those described above can be obtained.

Further, reliability can advantageously be improved by applying the configuration and method in the present embodiment.

[Ninth Embodiment (Example of Using the Data Cache for the Authentication Process)]

A ninth embodiment relates to an example of using the data cache for the authentication process. In the description, overlapping points with the above embodiments will be omitted.

<Configuration Example of the Data Cache, Sense Amplifier and the Like>

A configuration example of a data cache, sense amplifier and the like according to the ninth embodiment will be described by using FIG. 39.

Figure 39:
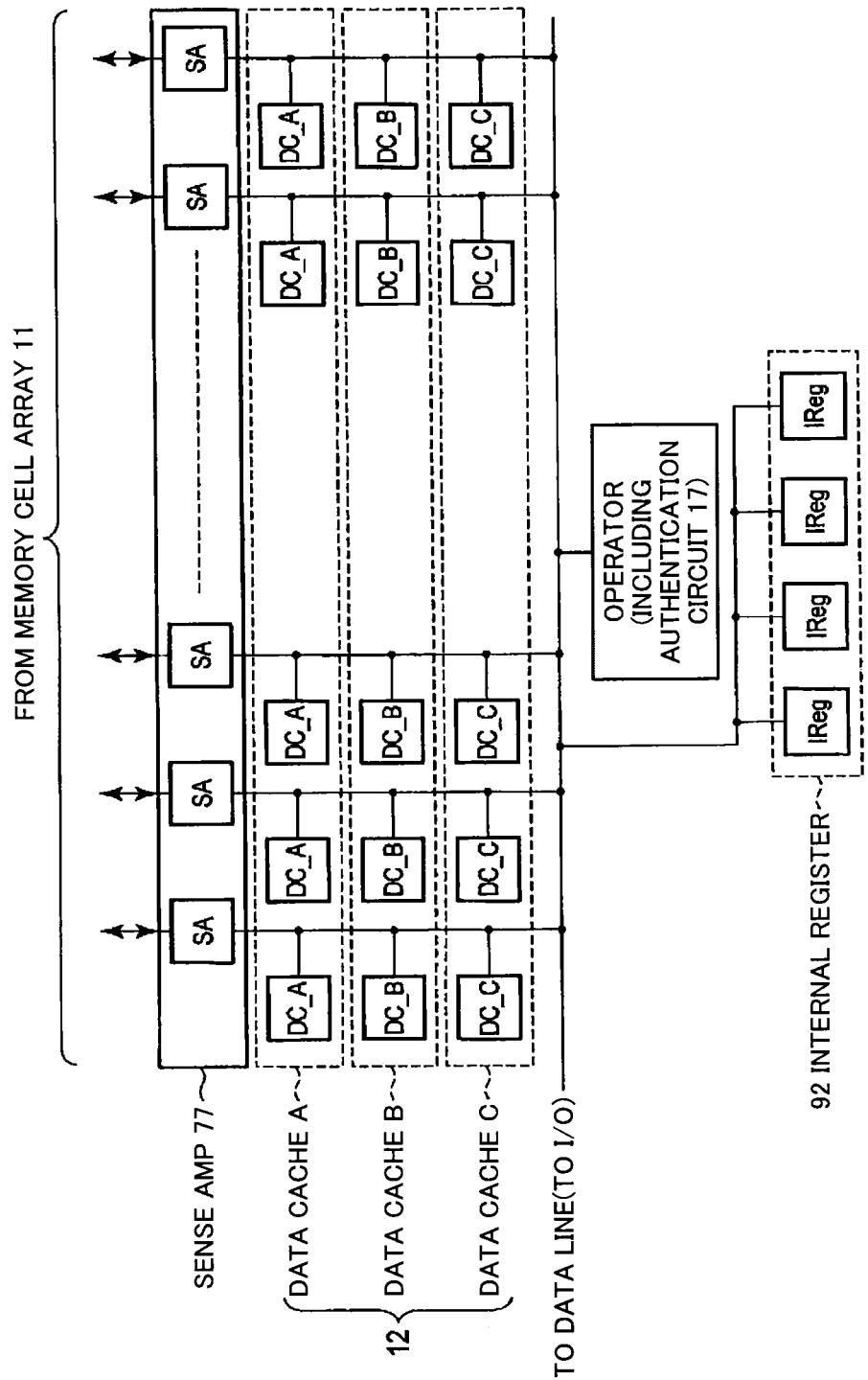
FIG. 39 is a block diagram showing a configuration example of a NAND chip according to a ninth embodiment.

As shown in FIG. 39, a data cache 12 of an authentication process according to the above embodiment is shown as a component. A NAND flash memory 100 includes the volatile data cache 12 temporarily storing page data read from a memory cell array 11 or temporarily storing write page data received as recording data from outside. The data cache 12 in the present embodiment is also called a page buffer, data buffer or the like and has an area of the normal page size or more. Further, the data cache often has an area a plurality of times the page size to make a reading or writing process of page data faster and to realize random page access.

The data cache 12 includes a plurality of data caches A, B, C. Each data cache is connected to the sense amplifier (SA) and data line used for reading from the memory 100.

The sense amplifier SA is electrically connected to the memory cell array 11 via a bit line (not shown).

The latch circuits DC_A of data caches are data caches capable of directly exchanging data with data lines. With IO being connected via the data line, data in the data cache 12 can be output from the memory 100 through DC_A and data outside the NAND flash memory 100 can be loaded into the data cache.

Further, an operator connected to the data caches 12 to perform an operation between the data caches 12 is included. The operator corresponds to an authentication circuit 107 used for the authentication process in the above embodiments and including data generators 13, 14 and a one-way circuit 15.

Further, an internal register 92 to temporarily store data is included.

In the NAND flash memory 100, in addition to the read command from the memory cell array 11, a command called register read to read data read out from the memory cell array 11 into the data cache 12 is available for data reading.

In the authentication method, the hidden block 101 in the NAND flash memory 100 may not allow hidden information (NKey, SecretID and the like) recorded in the hidden block 101 to be read by access from outside the NAND chip 10. On the other hand, when the NAND flash memory 100 executes an authentication process, the NAND flash memory 100 may internally read hidden information (NKey, SecretID and the like) recorded in the hidden block 101 to use the hidden information for the authentication process. That is, while it is necessary to allow hidden information (NKey, SecretID and the like) to be read from the memory cell array 11 into the data cache 12, it is necessary to inhibit data output from the data cache 12 to the outside of the NAND flash memory 100. This corresponds to revoking the register reading.

Thus, the data reading operation when the hidden block 101 is accessed from outside the NAND flash memory 100 is made different from the normal reading operation. More specifically, when the hidden block 101 is accessed, data sensed from the memory cell array 11 is locked in the other data caches DC_B, DC_C than the data cache DC_A to prevent the data from being output to revoke the register read command so that the command does not work. On the other hand, if the accessed block is not the hidden block 101, data is read as usual by using the data cache DC_A.

Thus, according to the above configuration, the plurality of data caches DC_A to DC_C are provided and the authentication process is executed by using the data caches DC_B, DC_C that cannot be accessed by a user from outside. Thus, when hidden information (NKey, SecretID and the like) is used for the authentication process, hidden information such as key information (NKey) can advantageously be prevented from being unlawfully read from outside.

<First Example of NAND Internal Operation Flow in the Authentication Process>

Figure 40:
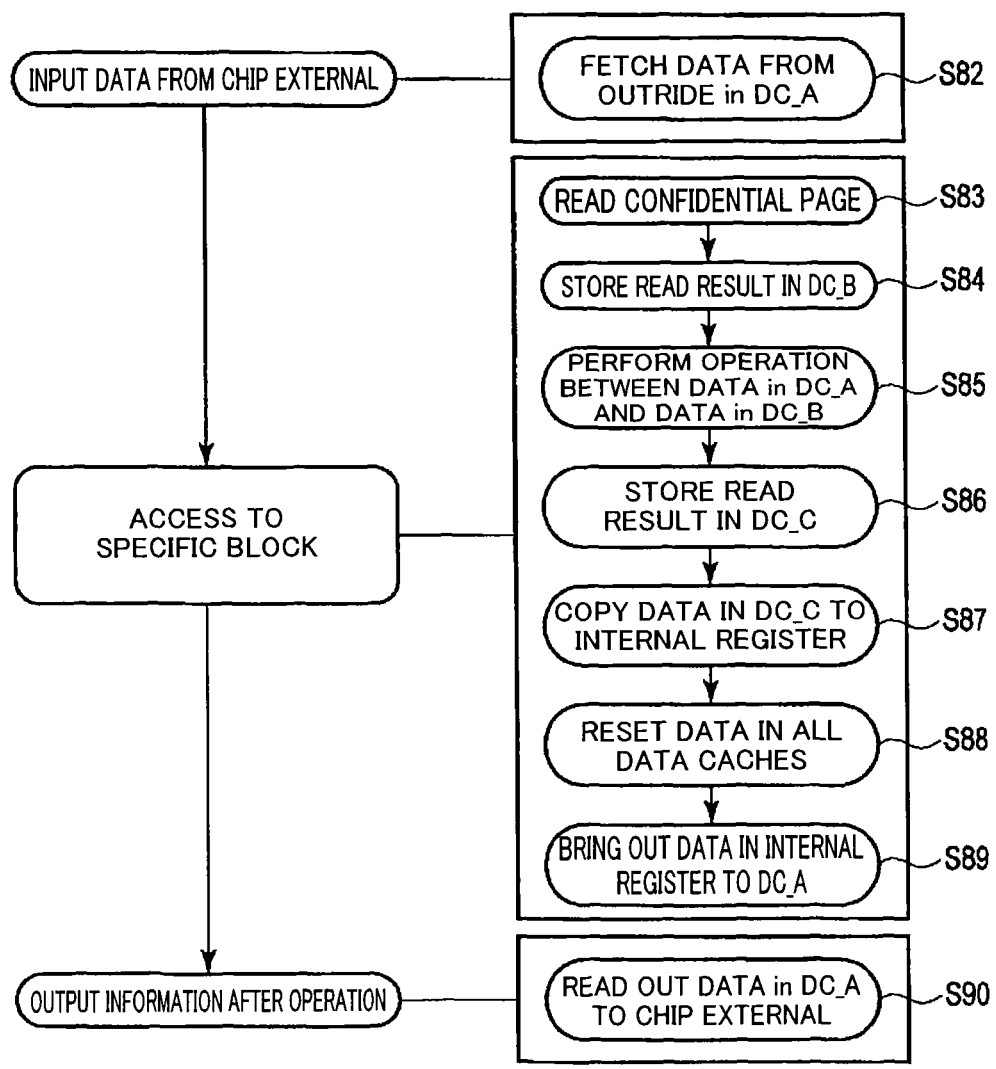
FIG. 40 is a diagram showing a first operation flow of the NAND chip according to the sixth embodiment.

Next, a flow that does not output information held in the hidden block 101 to the host device 2000 directly or indirectly in the process of the authentication process will be shown with reference to FIG. 40.

(Step S82)

First, it is assumed in the authentication process that data is input from outside the NAND flash memory 100 (for example, from the host device 2000). The input data is, for example, the random number RN or the host constant HCj and the data is loaded into the data cache DC_A.

(Step S83)

Subsequently, an indirect read request to access a special block like the hidden block 101 is made from the host device 2000. This corresponds to a calculation request of authentication information in the authentication.

In response to the request, data of a confidential page read from the memory cell array 11 is read out.

(Step S84)

Subsequently, the read data of the confidential page is stored in the data cache DC_B.

(Step S85)

Subsequently, an operation of the authentication process described in the above embodiments is performed between data stored in the data cache DC_A and the data cache DC_B by using the operator (authentication circuit 107).

(Step S86)

Subsequently, the operation result is stored in the data cache DC_C.

(Step S87)

If the confidential data remains in the data cache when the chip becomes ready by completing the sequence, there is a possibility that the confidential data may be read from outside. To prevent such a possibility, it is necessary to reset information in all the data caches DC_A to DC_C before the sequence is completed. On the other hand, the host device 2000 needs to obtain the result of the operation after the data caches DC_A to DC_C being reset.

Thus, the operation result held in the data cache DC_C is first copied to the internal register 92.

(Step S88)

Subsequently, data in all the data caches DC_A to DC_C is reset (in that, data is deleted).

(Step S89)

Subsequently, data saved in the internal register 92 is brought back to the data cache DC_A. If the operation heretofore is completed, the NAND flash memory 100 completes the sequence to become ready. At this point, the operation result is stored in the data cache DC_A.

(Step S90)

Subsequently, the host device 2000 can obtain the data stored in the data cache DC_A by the register read command.

<Second Example of NAND Internal Operation Flow in the Authentication Process>

Figure 41:
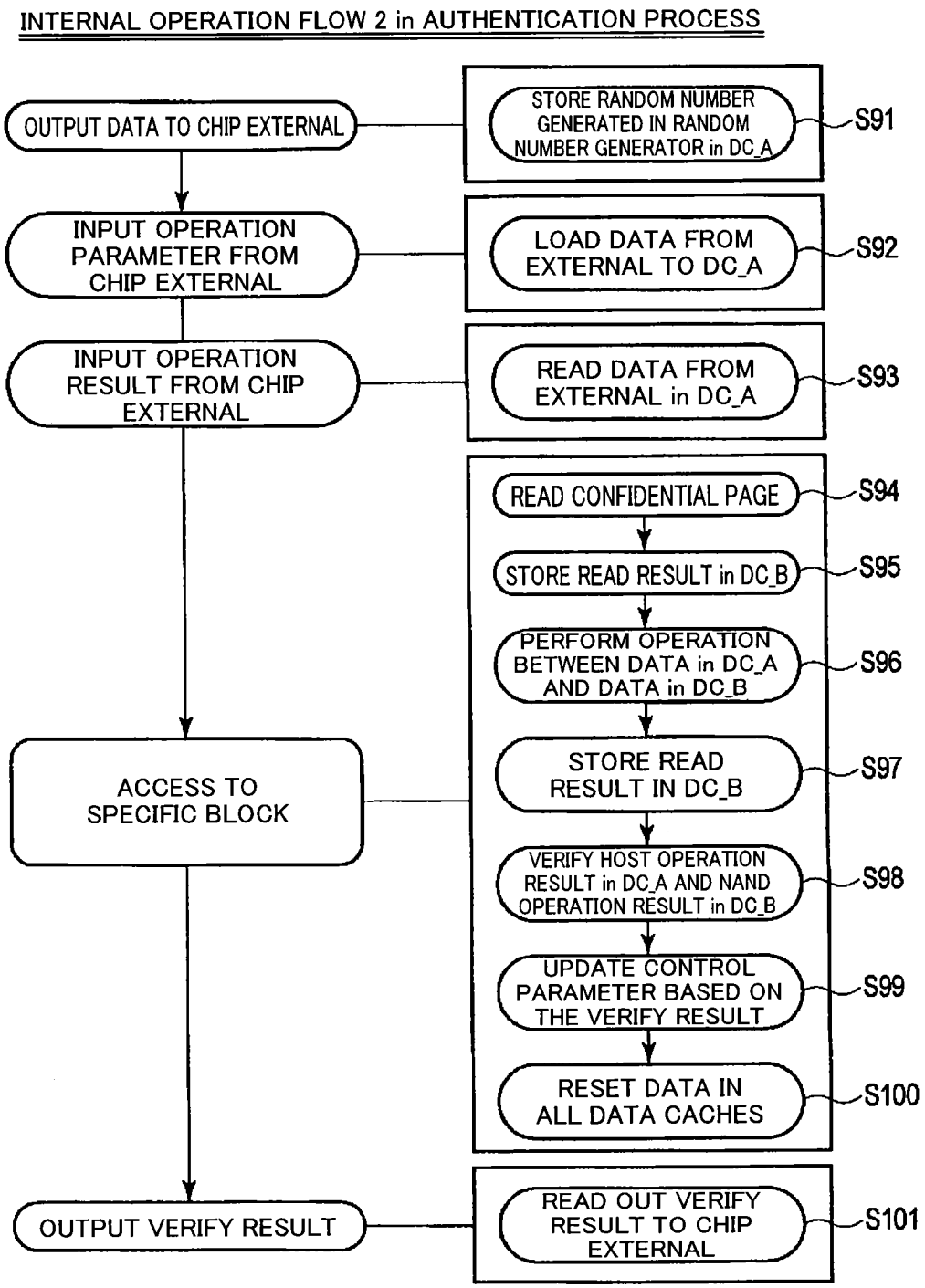
FIG. 41 is a diagram showing a second operation flow of the NAND chip according to the sixth embodiment.

Next, a NAND internal operation flow in an embodiment including a random number generator 24n inside the NAND flash memory 100 will be described with reference to FIG. 41. FIG. 41 is different from FIG. 40 in that a random number RNn generated by the random number generator 24n inside the NAND flash memory 100 is used.

(Step S91)

First, in the authentication process, when a random number read request is issued to the NAND flash memory 100 from the host device 20, the NAND flash memory 100 generates the random number. The generated random number is loaded into the data cache DC_A.

(Step S92)

Subsequently, the host device 2000 reads the random number in the data cache DC_A by the register read command.

(Step S93)

Subsequently, in the authentication process, data, for example, the host constant (HCj) is input from the host device 2000 into the NAND flash memory 100. The data is loaded into the data cache DC_A.

Further, the authentication information calculated in the host device 2000 is input into the NAND flash memory 100 from the host device 2000. This data is, for example, Oneway-ID and the data is loaded into the data cache DC_A.

(Step S94)

Subsequently, an indirect read request is made from the host device 2000 by accessing the hidden block 101. This corresponds to a calculation request of authentication information in the authentication.

Then, a confidential page is read from the memory cell array 11.

(Step S95)

Subsequently, the read result is stored in the data cache DC_B.

(Step S96)

Subsequently, an operation of the authentication process described in the above embodiments is performed between data stored in the data cache DC_A and the data cache DC_B by using the operator (authentication circuit 107).

(Step S97)

Subsequently, the operation result is stored in the data cache DC_B.

(Step S98)

Subsequently, the operation result of the host device held in the data cache DC_A is verified against the operation result of NAND flash memory held in the data cache DC_B.

(Step S99)

Subsequently, if matching of the verification result is confirmed in the verification in step S98, control parameters (890) are updated.

(Step S100)

Subsequently, the NAND flash memory 100 resets information of all the data caches DC_A to DC_C. If the operation heretofore is completed, the NAND flash memory 100 exits the sequence to become ready.

(Step S101)

Subsequently, the host device 2000 obtains the verification result read out of the memory 100 by using a command to confirm the verification result.

<Inspection Method of Hidden Information>

Next, the inspection method of hidden information will be described.

<Inspection Flow>

Figure 42:
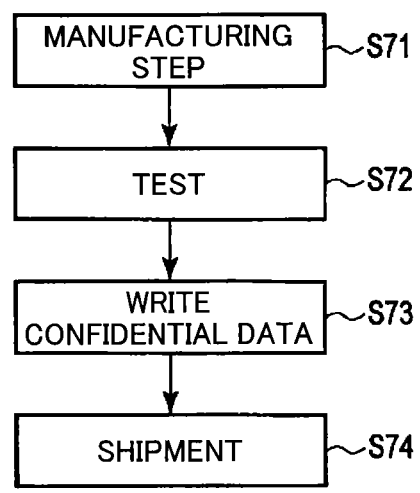
FIG. 42 is a diagram showing a test flow according to the ninth embodiment.

Among the processes from production of silicon to shipment of a NAND flash memory 10, processes related to the present authentication method will be shown with reference to FIG. 42.

As shown in the figure, the process proceeds in the order of the manufacturing process, test, hidden data writing, and shipment.

(Steps S71, S72)

First, when the manufacturing process is completed, a predetermined inspection test is performed to sort conforming chips 10 from the wafer.

(Step S73)

Subsequently, after the normal test process in step S72 is completed, the process of writing hidden data is executed and a test needs to be performed to check whether the hidden data has been written correctly.

On the other hand, hidden data cannot be directly read from the hidden block 101. This is because the read function could become a security hole.

(Step S74)

Subsequently, the NAND flash memory 100 with hidden data written correctly is shipped.

<Indirect Read Inspection Flow of Hidden Information>

In step S73, hidden data cannot be directly read from the hidden block 101 from the viewpoint of possibly becoming a security hole.

Figure 43:
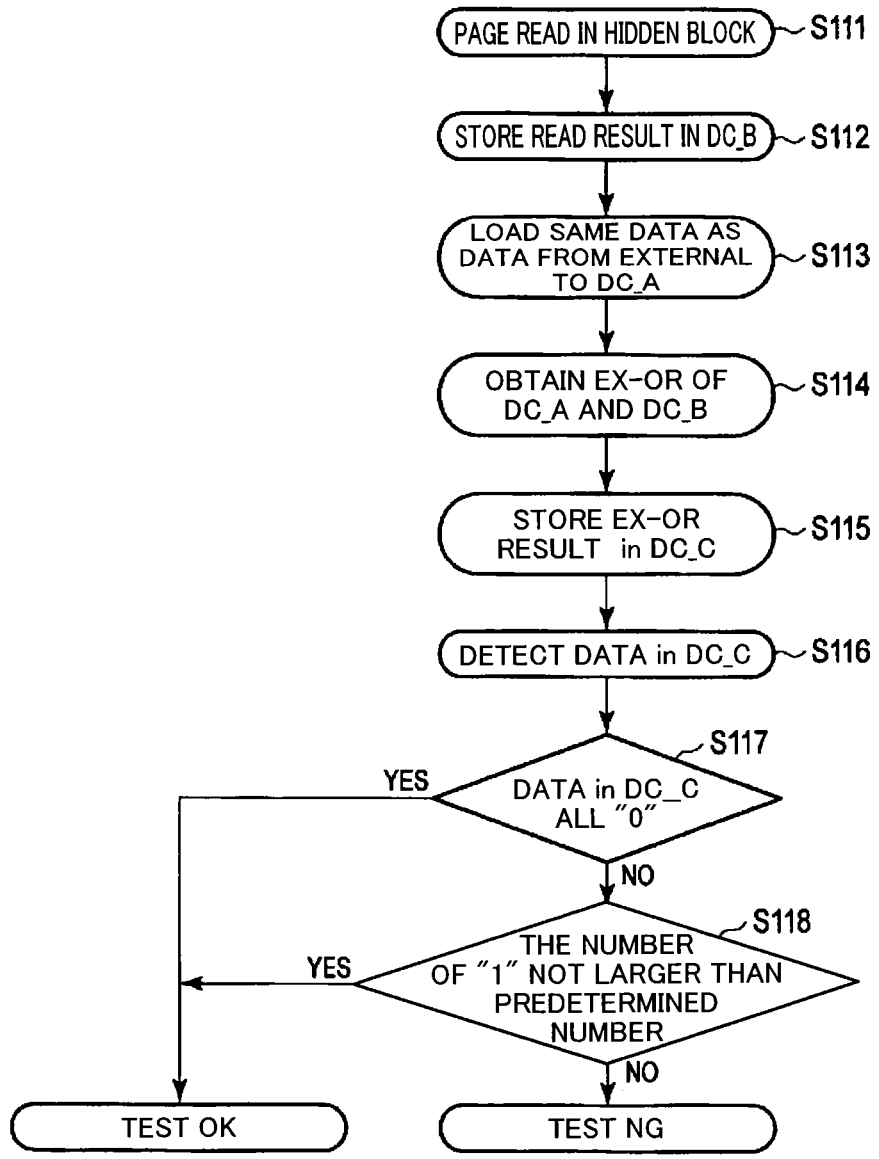
FIG. 43 is a diagram showing an inspection flow of hidden information according to the ninth embodiment.

Thus, a flow of checking recorded data without providing the direct data reading function will be described with reference to FIG. 43.

(Step S111)

First, hidden information (NKey and the like) is read from the hidden block 101 of the memory cell array 11.

(Step S112)

Subsequently, the read result of the read hidden information (NKey and the like) is stored in the data cache DC_B.

(Step S113)

Subsequently, the data cache DC_A is caused to store the same hidden information (NKey and the like) from outside the NAND flash memory 100.

(Step S114)

Subsequently, an exclusive OR of the data in the data cache DC_A and the data in the data cache DC_B is calculated by using the operator (authentication circuit 107).

(Step S115)

Subsequently, the result of the exclusive OR is stored in the data cache DC_C.

(Step S116)

Subsequently, data in the data cache DC_C is sensed.

(Step S117)

At this point, if the data in the data cache DC_A and the data in the data cache DC_B match (Yes), the test is passed (OK). On the other hand, if both pieces of data mismatch (No), the test fails.

More specifically, the data cache DC_C contains the result of the exclusive OR. Accordingly, if the data in the data cache DC_C is all "0" (Yes), the test is passed (OK). On the other hand, if the data in the data cache DC_C is "1" (No), the test fails.

First, whether the data in the data cache DC_C is all "0" is sensed. If all bits are "0" (Yes), the test is passed. Otherwise (No), the test proceeds to step S118.

(Step S118)

Subsequently, if all bits are not "0" (No), the number of "1" is counted. If the number of "1" is equal to a specified number or less (Yes), the test is passed because errors are determined to be correctable by a majority vote error correction or correcting code (OK). On the other hand, if the number of "1" is equal to the specified number or more (No), the test fails (NG).

Also a method of controlling access to the hidden block 101 based on second hidden information is possible by separately holding the hard-wired second hidden information in the NAND flash memory 100 instead of the hidden information recorded in the hidden block 101 by using the method using the authentication for access control to a specific block described in the above embodiment. In this case, not only data reading, but also data writing and data erasure may be controlled by the authentication based on the second hidden information.

<Advantageous Effects>

According to the authenticator, authenticatee and authentication method according to the ninth embodiment, at least the advantageous effects (1) to (5) similar to those described above can be obtained.

Further, in the present embodiment, when the hidden block 101 is accessed, data sensed from the memory cell array 11 is locked in the other data caches DC_B, DC_C than the data cache DC_A to prevent the data from being output to revoke the register read command so that the command does not work. On the other hand, if the accessed block is not the hidden block 101, data is read as usual by using the data cache DC_A.

Thus, according to the above configuration, the plurality of data caches DC_A to DC_C are provided and the authentication process is executed by using the data caches DC_B, DC_C that cannot be accessed by a user from outside. Thus, when hidden information (NKey, SecretID and the like) is used for the authentication process, hidden information such as key information (NKey) can advantageously be prevented from being unlawfully read from outside.

In addition, as shown in the steps S88 and S100, hidden information such as key information in the data caches DC_A to DC_C is all erased before returning from the busy state to the ready state. Thus, safety can be ensured.

[Tenth Embodiment (Example of Command Mapping)]

A tenth embodiment relates to an example of command mapping. In the description, overlapping points with the above embodiments will be omitted.

<Example of Command Mapping Compatible with the Read/Write Commands>

A NAND flash memory 100 specifies the block to be read and the page address by "00h"-"Address"-"30h", for example, as a command for reading. The address portion shows frequently a block address, page address, or byte position in the specific page. Input data in the column address portion may be ignored or may be used for setting a byte pointer after page reading to read data positioned from the byte position corresponding to the byte pointer. After the command 30h is input, the NAND flash memory 100 is in a busy state for reading and changes to a ready state after reading is completed. After the transition to the ready state, data output (Dout) is enabled and data can be read by providing a signal RE or DQS. To change the byte position in a read page, the column address corresponding to the byte position to be read is set by using a command sequence of "05h"-"Address"-"E0h".

A command sequence of "80h"-"Address"-"Input Data"-"10h" is used for data writing (recording) to specify the block and page to be written into. The address portion shows frequently a block address, page address, or byte position in the specific page. Input data for the column address portion may be ignored or may be used for setting a byte pointer for page write data input to input write data positioned from the byte position corresponding to the byte pointer. After the command 10h is input, the NAND flash memory 100 is in a busy state for writing and changes to a ready state after writing is completed.

The above is a command system widely used by the NAND flash memory 100. When implementing the authentication function according to the above embodiments, providing commonality of command sequences as much as possible is preferable from the viewpoint of minimizing the packaging area of a circuit. However, the authentication function is used in fields in which security is required and thus, there is also a point of view that limiting function users is more desirable.

Figure 44:
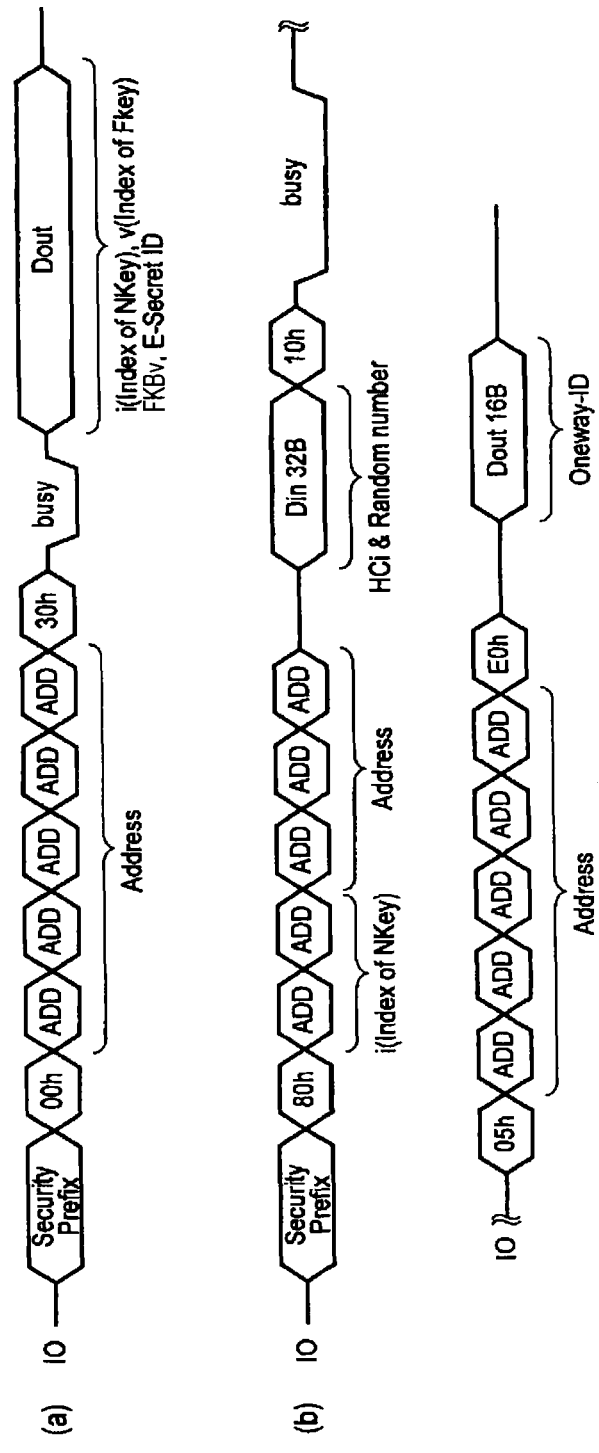
FIG. 44 is a timing chart showing a command mapping example according to a tenth embodiment.

Thus, FIG. 44 shows a command mapping example compatible with the above read and write commands of the NAND flash memory 100 in consideration of the above points of view.

The command mapping example is different from the above general command sequence in that the input command of Security Prefix is attached prior to the command. Security Prefix configured by a single byte and by a plurality of bytes can be considered. The command Security Prefix is disclosed to only those users who need the authentication function. From the viewpoint of user management, it is desirable to configure the command Security Prefix by a plurality of bytes.

As shown in (a) of FIG. 44, like a data read command sequence, the block address and the page address to be read are specified by sequentially inputting "command Security Prefix"-"command 00h"-"address ADD"-"command 30h" into the IO terminal. It is possible that the value set for Address is set to a special value for user management. Alternatively, it is also possible that the value set for Address is set to a value that is ignored inside.

Subsequently, after the command 30h is input, the NAND flash memory 100 is in a busy state for reading and changes to a ready state after reading is completed. After the transition to the ready state, data output (Dout) is enabled and data such as index information i, v, unique encrypted secret identification information (E-SecretID), and commonly attached key management information (FKB) can be read by supplying a signal RE, DQS or the like.

As shown in (b) of FIG. 44, like a data write command sequence, target data is input by sequentially inputting "command Security Prefix"-"command 80h"-"address ADD"-"data Din (32B)"-"command 10h" into the IO terminal. It is possible that the value set for Address is set to a special value for user management. Alternatively, it is also possible that the value set for Address is set to a value that is ignored inside. The present sequence has a lot in common with a write sequence, but actually data writing into a cell array is not needed and the present sequence is used for input of data needed by the NAND flash memory 100 for calculation in the authentication process. Examples of data needed for calculation in the authentication process include peculiar information HCi of the host device 2000 and a random number.

Subsequently, the NAND flash memory 100 is in a busy state until the calculation of the authentication process is completed and then changes to a ready state after the calculation is completed and security data in the data caches DC_A to DC_C is all cleared.

As shown in (b) of FIG. 44, after the transition to the ready state, the host device 2000 can acquire the result by sequentially inputting "command 05h"-"address ADD"-"command E0h" into the IO terminal and specifying the column address where the calculation result of the authentication process is held. Oneway-ID can be cited as an example of the calculation result of the authentication process.

<Example of Command Mapping Compatible with the Set/Get Feature Commands>

Figure 45:
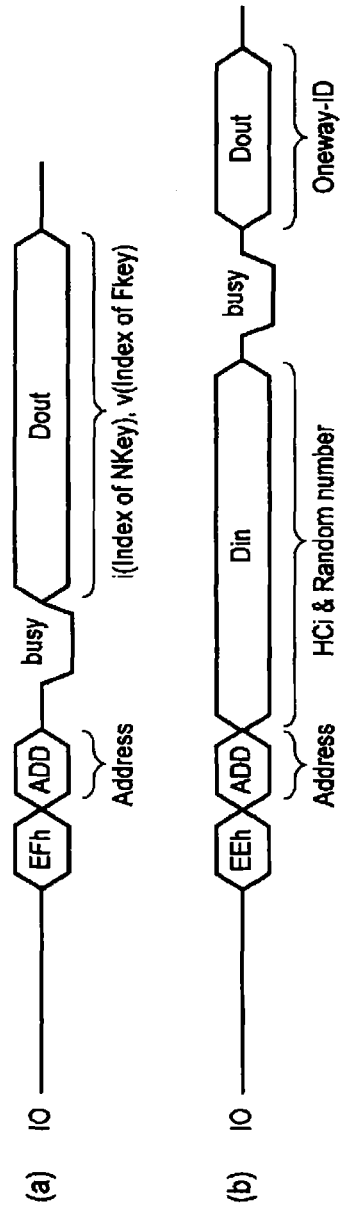
FIG. 45 is a timing chart showing a command-mapping example according to a tenth embodiment.

Next, another example of the command configuration of the NAND flash memory 100 to which the present authentication function is applied will be shown by using FIG. 45.

The NAND flash memory 100 has a command called "Set Feature" to enable the function of the memory 100 and a command called "Get Feature" to read an enabled/disabled state for the function of the memory 100. These commands are used, for example, to enable input of /RE, /WE, and /DQS, which are complementary signals for high-speed data transfer.

"Set Feature" sets a function in "EEh"-"Address"-"Data input". The function number is set to "Address" and parameters of the function indicated by the function number are input into "Data input". Then, a busy period to enable the function comes. After the function is enabled, a transition to a ready state occurs.

"Get Feature" reads an enabled/disabled state of the function in "EFh"-"Address"-"Data output". The function number is set to "Address" and parameters of the function indicated by the function number are output to "Data output". A busy period exists between Address and Data output to internally read set parameters.

The present embodiment is an example of the command sequence diverting these Set Feature and Get Feature.

As shown in (a), the command sequence is like the above case, but "Address" to be specified is different. "Address" may be a single byte and a plurality of bytes. "Address" is disclosed to only those users who need the authentication function. From the viewpoint of user management, it is desirable to configure "Address" by a plurality of bytes. Examples of "Data output" and "Data input" include, like those shown in FIG. 45, index information i, v, unique encrypted secret identification information (E-SecretID), key management information (E-SecretID) attached in common, and the like.

As shown in (b), the command sequence of "EEh"-"address ADD"-"data Din" for data input induces execution of the authentication process at the same time and the NAND flash memory 100 performs a calculation of the authentication process in the busy period.

Subsequently, after the calculation is completed and security data is cleared from the data caches, the NAND flash memory 100 changes to a ready state. After the transition to the ready state, the host device 2000 can read out Oneway-ID.

<Advantageous Effects>

According to the authenticator, authenticatee and authentication method according to the tenth embodiment, at least the advantageous effects (1) to (5) similar to those described above can be obtained.

Further in the present embodiment, as shown in FIG. 44, commonality with the command sequence of the NAND flash memory 100 can be provided as much as possible. Thus, the packaging area of a circuit can be minimized while taking security into consideration, which is more effective in implementing the authentication function according to the above embodiments.

Also as shown in FIG. 45, the command called "Set Feature" to enable the function of the memory 100 and the command called "Get Feature" to read the enabled/disabled state of the function of the memory 100 can also be made common and applied if necessary.

Clearing all data of the data caches DC_A to DC_C in the timing before returning from the busy state to the ready state is the same as the above case.

[Eleventh Embodiment (Application Example to a Memory Card, Content Protection, and HDD)]

An eleventh embodiment relates to an application example to a memory card, content protection, and HDD. In the description, overlapping points with the above embodiments will be omitted.

<Application Example to a Memory Card> with reference to FIG. 45, a configuration example of a memory card including a NAND flash memory 100 to which the present authentication function is applied will be shown.

As shown in FIG. 45, the memory card 1000 includes therein a controller 200 having a function of controlling the operation of the memory 100, a function of controlling the interface with the host device 200, and the like.

At least one of a plurality of NAND flash memory chips 100 (MCP1), (MCP2) stacked in a NAND package is included. At least one memory 100 in the NAND package may have the authentication function and the function of being authenticated according to the embodiments. In other words, all the memory 100 in the NAND package do not have to have the authentication function and the function to be authenticated according to the above embodiments. Further, all NAND packages mounted on the memory card 1000 do not have to have the authentication function and the function to be authenticated according to the embodiments. For the clarification, the NAND flash memory 100 in the present embodiment may be referred to as a NAND package or a NAND flash memory chip.

The controller 200 in the memory card 1000 has a function of controlling the authentication function and the function to be authenticated according to the embodiments via a NAND interface in the NAND package. The function of the controller 200 may be a function to control the authentication function and the function to be authenticated of one of a plurality of NAND packages or a function to control the authentication function and the function to be authenticated of each of the plurality of NAND packages. Further, the function of the controller 200 may be a function to control the authentication function and the function to be authenticated of one of the memory 100 in the NAND package or a function to control the authentication function and the function to be authenticated of each of the memory 100 in the NAND package.

First Application Example to Content Protection

Figure 47:
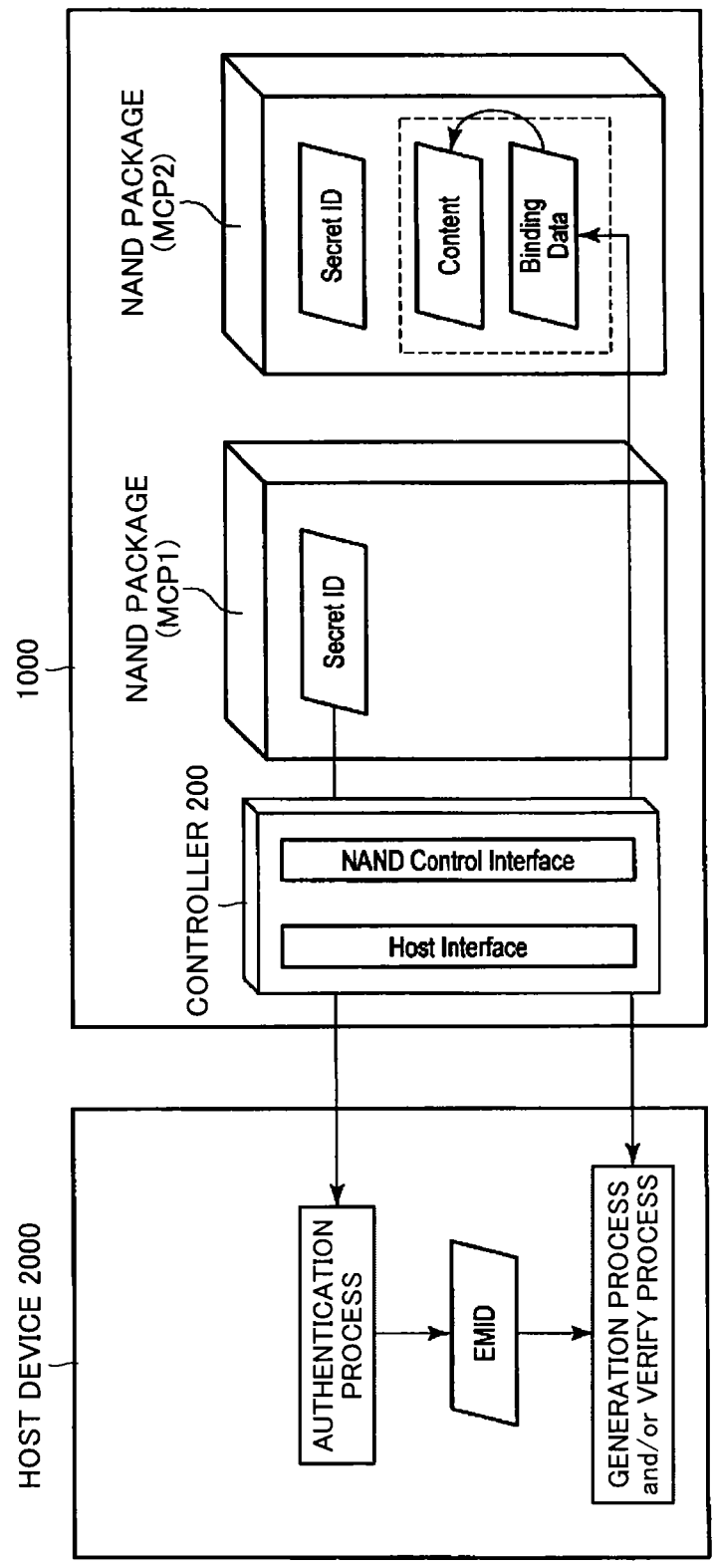
FIG. 47 is a diagram showing a second application example of content protection in a NAND flash memory 100 to which authentication function is applied.

A first application example to content protection of the memory card 1000 including the NAND flash memory 100 to which the authentication function is applied will be shown by using FIG. 47. For the sake of simplicity, content described herein heretofore will not be described below.

The controller 200 and NAND packages (MCP1), (MCP2) are embedded in the memory card 1000. The NAND packages (MCP1), (MCP2) have the authentication function and the function to be authenticated according to the embodiments.

The host device 2000 verifies the authenticity of secret identification information SecretID of the NAND packages (MCP1), (MCP2) of the NAND flash memory 100 by the authentication process shown in the embodiments.

After the authenticity is verified, the host device 2000 executes the calculation process of EMID by using the method described in the fifth embodiment based on the secret identification information SecretID.

The NAND package (MCP2) generates binding data to associate EMID and content when the content is written. Binding Data desirably contains data on the key to encrypt/decrypt content. Binding Data is recorded in one of the NAND packages (MCP1), (MCP2) mounted on the card 1000. The NAND package in which Binding Data is recorded may be the NAND package (MCP1) having secret identification information SecretID used for the authentication process or the other NAND package (MCP2). FIG. 47 shows the latter example, but the arrangement of Binding Data is not limited to this example. The recording position of content may be similarly in any NAND package.

The relationship between the content and EMID is calculated and verified, and the content is reproduced only if the relationship is verified. The EMID is obtained by the authentication process of secret identification information SecretID and the binding data which associates EMID and content.

With the above configuration, content (Content) is associated with the secret identification information SecretID. Thus, an effect of invalidating reproduction of content can advantageously be achieved even if content or Binding Data is unlawfully copied to another memory card that does not have the same secret identification information SecretID.

First Application Example to HDD

Figure 48:
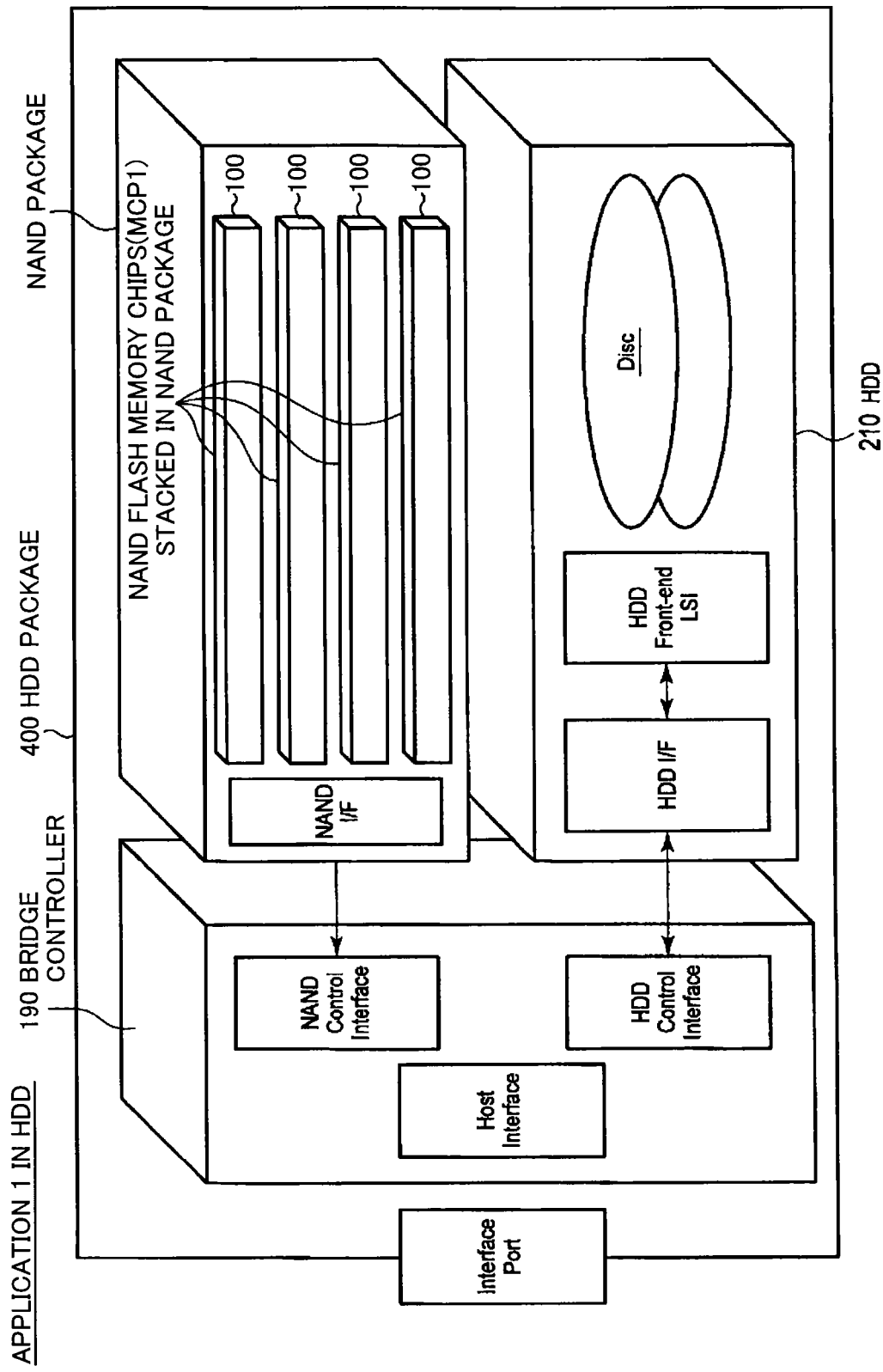
FIG. 48 is a diagram showing a first configuration example of a hard disk drive (HDD) using NAND flash memory 100 to which authentication function is applied.

A First example of a configuration of a hard disk drive (HDD) using the NAND flash memory 100 to which the present authentication function is applied will be shown by using FIG. 48.

As shown in FIG. 48, at least one NAND package (MCP1) is embedded in an HDD package 400, and at least one NAND package has the authentication function and the function to be authenticated according to the embodiments.

At least one HDD 210 is embedded in the HDD package 400.

Further, a bridge controller 190 to control the NAND package (MCP1), control the HDD 210, and control the interface with the host device is embedded. The bridge controller 190 may be configured by a single integrated circuit or a plurality of integrated circuits. The function may also be realized by combining an integrated circuit and firmware.

The authentication function and the function to be authenticated in the NAND package (MCP1) are provided to the HDD 210 as a host device via the bridge controller 190.

Second Application Example to HDD

Figure 49:
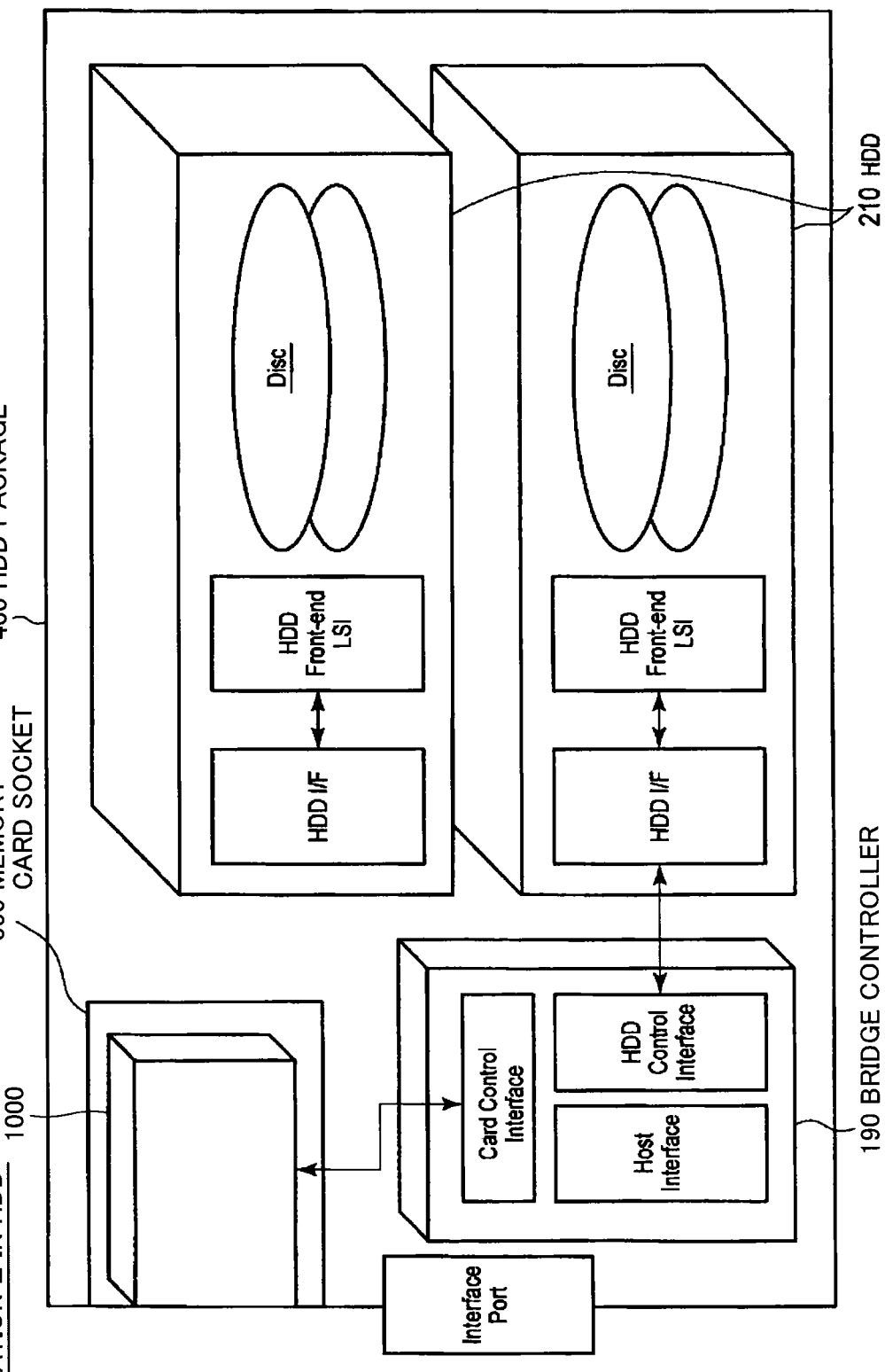
FIG. 49 is a diagram showing a second configuration example of a hard disk drive (HDD) using NAND flash memory 100 to which authentication function is applied.

Another configuration example of the hard disk drive (HDD) using the NAND flash memory 100 to which the present authentication function is applied will be shown by using FIG. 49.

Figure 46:
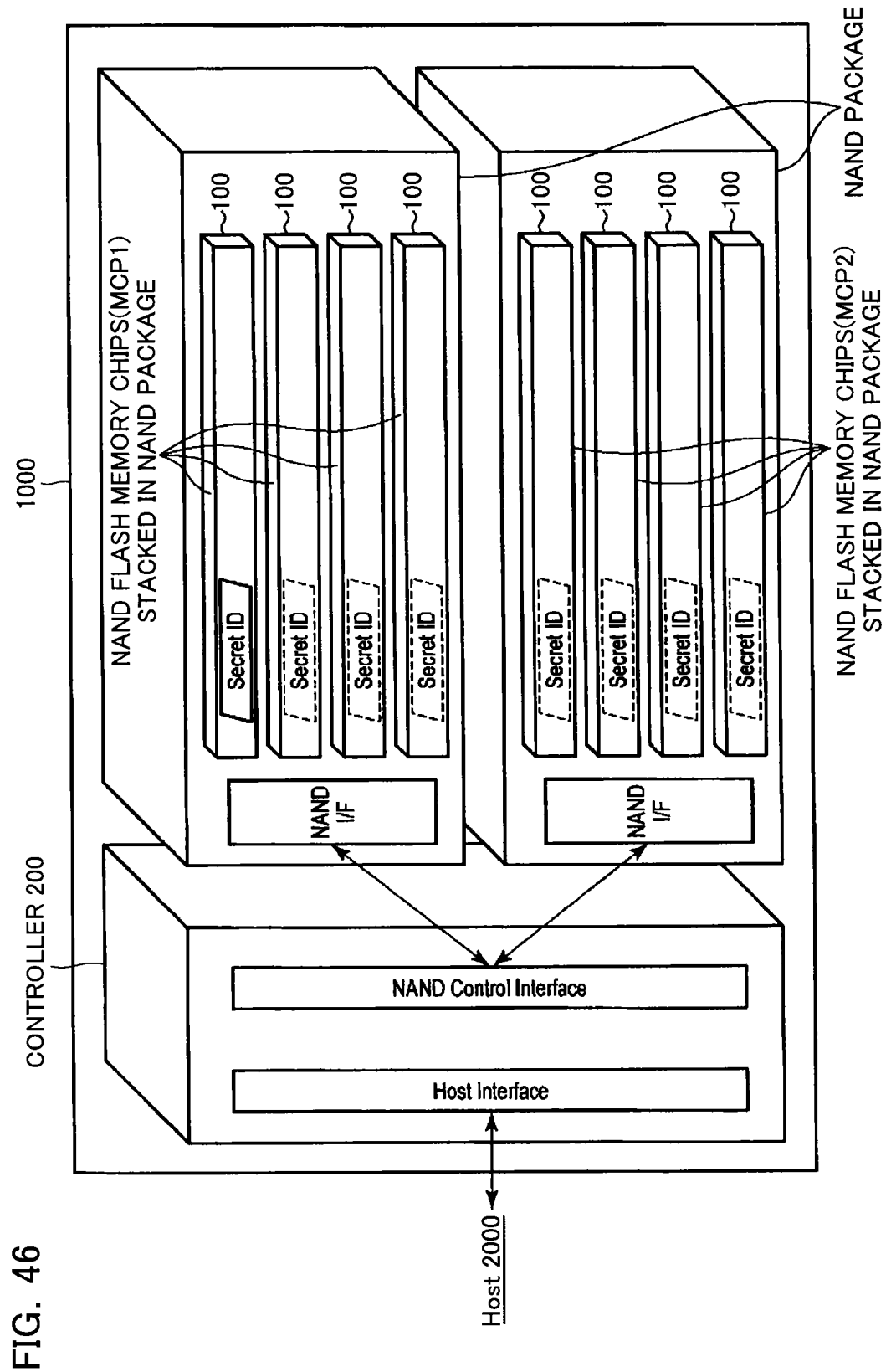
FIG. 46 is a diagram showing a configuration example of a memory card 1000 in which a NAND flash memory is mounted to which authentication function is applied.

As shown in the figure, the HDD package 400 includes a memory card socket 550 to connect the memory card 1000 described above in FIG. 46.

At least one HDD 210 is embedded in the HDD package 400. Further, the bridge controller 190 to control the memory card 1000, control the HDD 210, and control the interface with the host device is embedded. The bridge controller 190 may be configured by a single integrated circuit or a plurality of integrated circuits. The function may also be realized by combining an integrated circuit and firmware.

The authentication function and the function to be authenticated in the memory card 1000 are provided to the HDD 210 as a host device via the bridge controller 190.

Second Application Example to Content Protection

Figure 50:
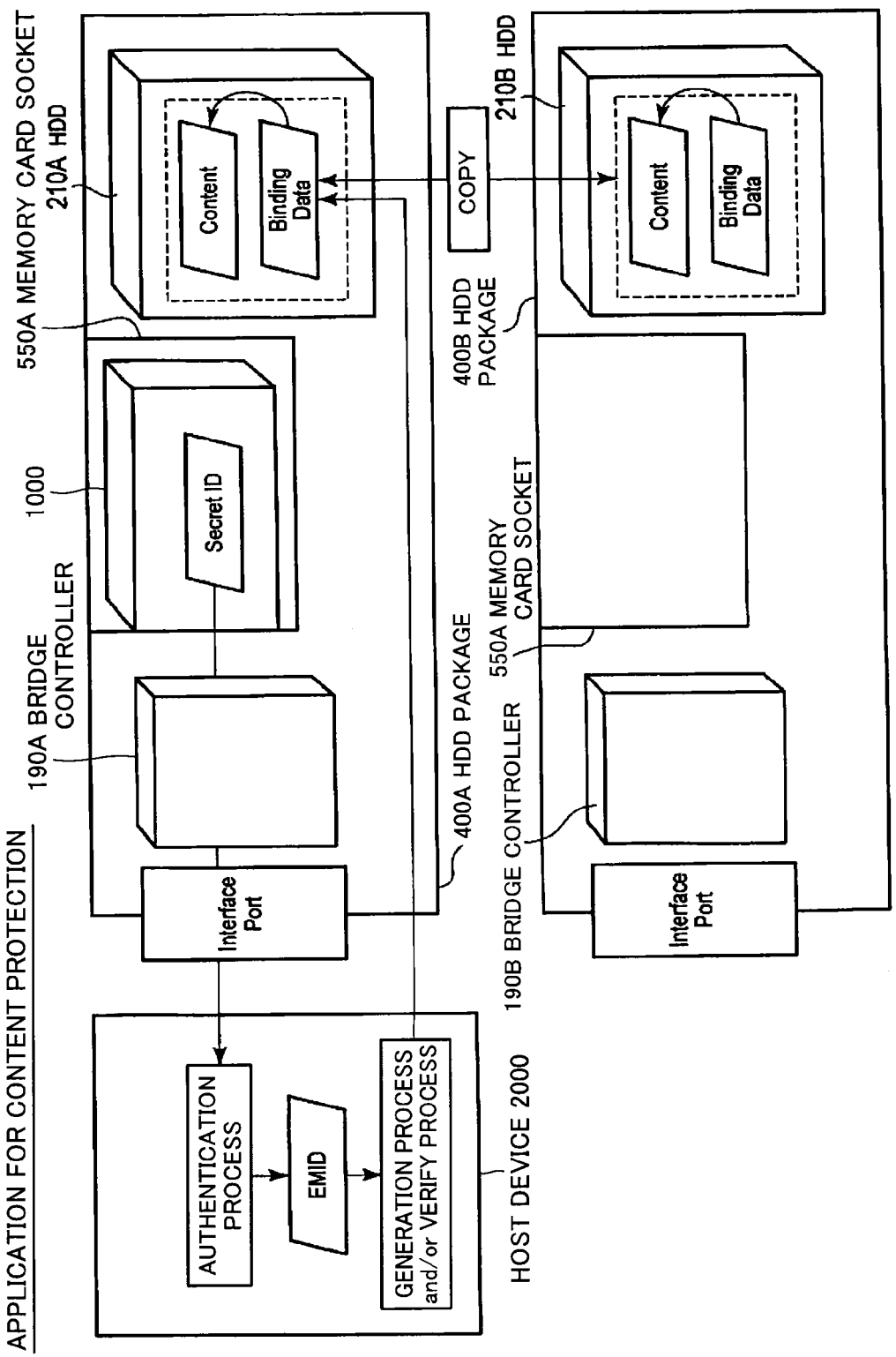
FIG. 50 is a diagram showing a second application example of content protection in a NAND flash memory 100 to which authentication function is applied.

FIG. 50 shows an application example of the hard disk drive (HDD) using the NAND flash memory 100 to which the present authentication function is applied to content protection. The present embodiment takes the HDD configuration shown in FIG. 48 as an example, but is also applicable to the HDD configuration shown in FIG. 48.

As shown in the figure, bridge controllers 190A, 190B, memory card sockets 550A, 550B, and HDD 210A, 210B are embedded in HDD packages 200A, 200B, respectively.

The memory card 1000 includes the authentication function and the function to be authenticated according to the embodiments. The host device 2000 verifies the authenticity of the secret identification information SecretID of the NAND flash memory 100 by the authentication process shown in the embodiments. After the authenticity is verified, the host device 2000 executes the calculation process of EMID by using the method shown in the fifth embodiment based on the secret identification information SecretID.

When the content is written, binding Data to associate EMID and content (Content) is generated. The binding Data desirably contains data on the key to encrypt/decrypt content. The binding Data is recorded in one of the memory card 1000 and the HDD 210A, 210B. An example in which binding Data is recorded in the HDD 210A, 210B is shown, but the arrangement of binding Data is not limited to this example. The recording position of content may be any one of the memory card 1000 and the HDD 210A, 210B.

The relationship between the content and EMID is calculated and verified, and the content is reproduced only if the relationship is verified. The EMID is obtained by the authentication process of SecretID and the binding data which associates EMID and content.

The present embodiment is an example of using the authentication function and the function to be authenticated included in the NAND flash memory 100 in the memory card 1000 via the card socket 550A, but is also applicable to a configuration in which the NAND packages are directly embedded in the HDD shown in FIG. 48 and the HDD directly control the NAND packages. In this case, the memory card may be replaced by the NAND package.

Further, as an application example applicable to an HDD having the card sockets 550A, 550B, if a plurality of similar HDD packages exists, content recorded in any HDD can be reproduced only by moving the card after content and Binding Data is copied to both HDD packages. Binding Data may be recorded in the card, instead of the HDD, or in both.

With the present configuration, content (Content) is associated with the memory card 1000 or SecretID in a NAND package and thus, an effect of invalidating reproduction of content can be achieved even if content or Binding Data is unlawfully copied to the memory card 1000 that does not have the same SecretID.

Further, in the example in which an HDD package includes a memory socket shown in FIG. 49, the content recorded in a plurality of HDD can be reproduced only by moving a memory card. This is advantageous in terms of portability because an HDD has a large cabinet and may be installed for stationary use compared with a memory card.

Third Application Example to Content Protection

Figure 51:
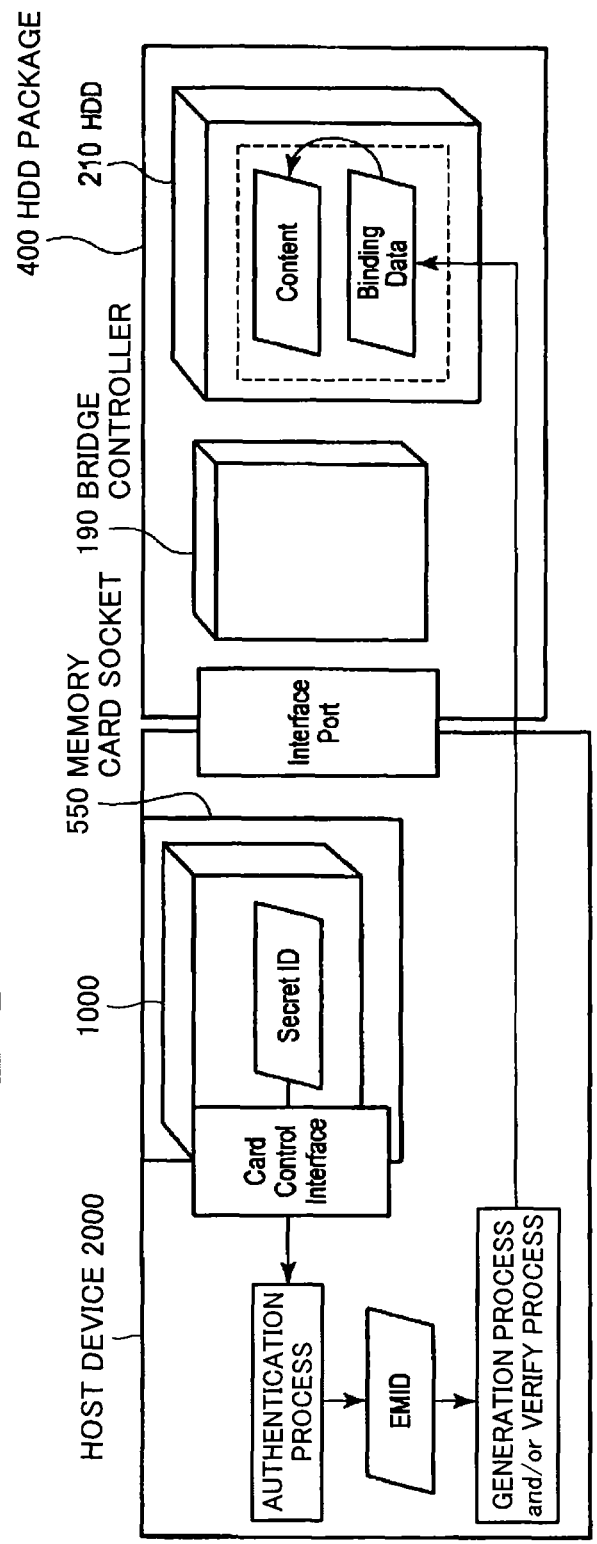
FIG. 51 is a diagram showing a third application example of content protection in a NAND flash memory 100 to which authentication function is applied.

With reference to FIG. 51, third application example of the hard disk drive (HDD) using the NAND flash memory 100 to which the present authentication function is applied will be described. The present embodiment is an example in which the host device 2000 includes the memory card socket 550 and uses the external HDD 210.

As shown in the figure, the bridge controller 190 and the HDD 210 are embedded in the HDD package 400.

The card control function and the authentication function included in the memory card 1000 inserted into the memory card socket 550 are embedded in the host device 2000. An NAND package having the authentication function and the function to be authenticated according to the embodiments is embedded in the memory card 1000.

In the above configuration, the host device 2000 verifies the authenticity of secret identification information SecretID of the NAND flash memory 100 by the authentication process shown in the embodiments.

After the authenticity is verified, the host device 2000 executes the calculation process of EMID by using the method according to the fifth embodiment based on the secret identification information SecretID.

Binding Data to associate EMID and content (Content) is generated when the content is written. Binding Data desirably contains data on the key to encrypt/decrypt content. Binding Data is recorded in one of the memory card 1000 and the HDD 210. The latter example is shown here, but the arrangement of Binding Data is not limited to this example. The recording position of content may be similarly in the memory card 1000 or the HDD 210.

The relationship between the content and EMID is calculated and verified, and the content is reproduced only if the relationship is verified. The EMID is obtained by the authentication process of SecretID and the binding data which associates EMID and content.

The present embodiment is an example of using the authentication function and the function to be authenticated included in the NAND flash memory 100 in the memory card 1000 via the card socket 550, but is also applicable to a configuration in which the NAND packages are directly embedded in the host device 2000 and the host device 2000 directly controls the NAND packages. In this case, the memory card 1000 may be replaced by the NAND package.

Further, as an application example applicable to the host device 2000 having the card socket 550, if a plurality of the similar host devices 20 exists, content can be reproduced by any of the host devices 20 by connecting the memory card 1000 and the HDD package 400 to the other host device 2000 Content and Binding Data may be recorded in the card 1000, instead of the HDD 210, or in both.

With the present configuration, content is associated with the memory card 1000 or SecretID in a NAND package and thus, an effect of invalidating reproduction of content can be achieved even if content or Binding Data is unlawfully copied to the memory card that does not have the same SecretID. Further, the content can be reproduced by a plurality of host devices by moving the memory card 1000 and the HDD 210.

Fourth Application Example to Content Protection

Figure 52:
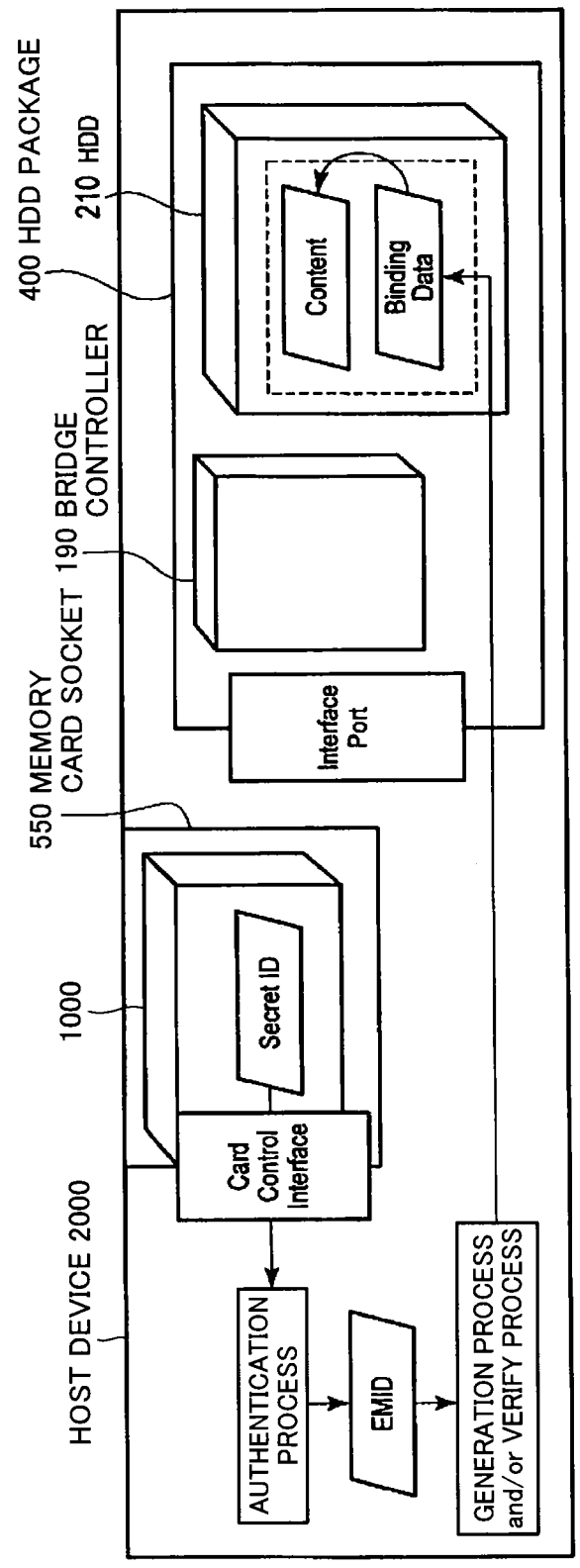
FIG. 52 is a diagram showing a third application example of content protection in a NAND flash memory 100 in which authentication function is applied.

An fourth application example of the hard disk drive (HDD) using the NAND flash memory 100 to which the present authentication function is applied will be described by using FIG. 52. The present embodiment is an example in which the host device 2000 includes the memory card socket 550 and further uses the built-in HDD 210.

As shown in the figure, the bridge controller 190 and the HDD 210 are embedded in the HDD package 400.

The card control function and the authentication function included in the memory card 1000 inserted into the memory card socket 550 are embedded in the host device 2000. An NAND package having the authentication function and the function to be authenticated according to the above embodiments is mounted on the memory card 1000.

In the above configuration, the host device 2000 verifies the authenticity of SecretID of the NAND flash memory 100 by the authentication process shown in the above embodiments.

After the authenticity is verified, the host device 2000 executes the calculation process of EMID by using the method according to the eighth embodiment based on the secret identification information SecretID.

Binding Data to associate EMID and content (Content) is generated when the content is written. Binding Data desirably contains data on the key to encrypt/decrypt content. Binding Data is recorded in one of the memory card 1000 and the HDD 210. The latter example is shown here, but the arrangement of Binding Data is not limited to this example. The recording position of content is similarly in the memory card 1000 or the HDD 210.

The relationship between the content and EMID is calculated and verified, and the content is reproduced only if the relationship is verified. The EMID is obtained by the authentication process of SecretID and the binding data which associates EMID and content.

The present embodiment is an example of using the authentication function and the function to be authenticated included in the NAND flash memory 100 in the memory card 1000 via the card socket 550, but is also applicable to a configuration in which the NAND packages are directly embedded in the host device 20, and the host device 2000 directly controls the NAND packages. In this case, the memory card 1000 may be replaced by the NAND package.

Further, as an application example applicable to the host device 2000 having the card socket 550, if a plurality of the similar host devices 20 exists, content can be reproduced by any of the host devices 20 by connecting the memory card 1000 and the HDD package 400 to the other host device 2000 Content and Binding Data may be recorded in the card 1000, instead of the HDD 210, or in both.

With the present configuration, content is associated with the memory card 1000 or SecretID in a NAND package and thus, an effect of invalidating reproduction of content can be achieved even if content or Binding Data is unlawfully copied to the memory card that does not have the same SecretID. Further, content can be reproduced by a plurality of host devices by moving the memory card 1000 and the HDD 210.

[Modification of Ninth Embodiment (Another Example of Using the Data Caches)]

This modification relates to another configuration example of using the data caches described in the ninth embodiment for the authentication process. In the description, overlapping points with the above embodiments will be omitted.

<Configuration Example of the Sense Amplifier and the Peripheral Circuit Thereof>

Figure 53:
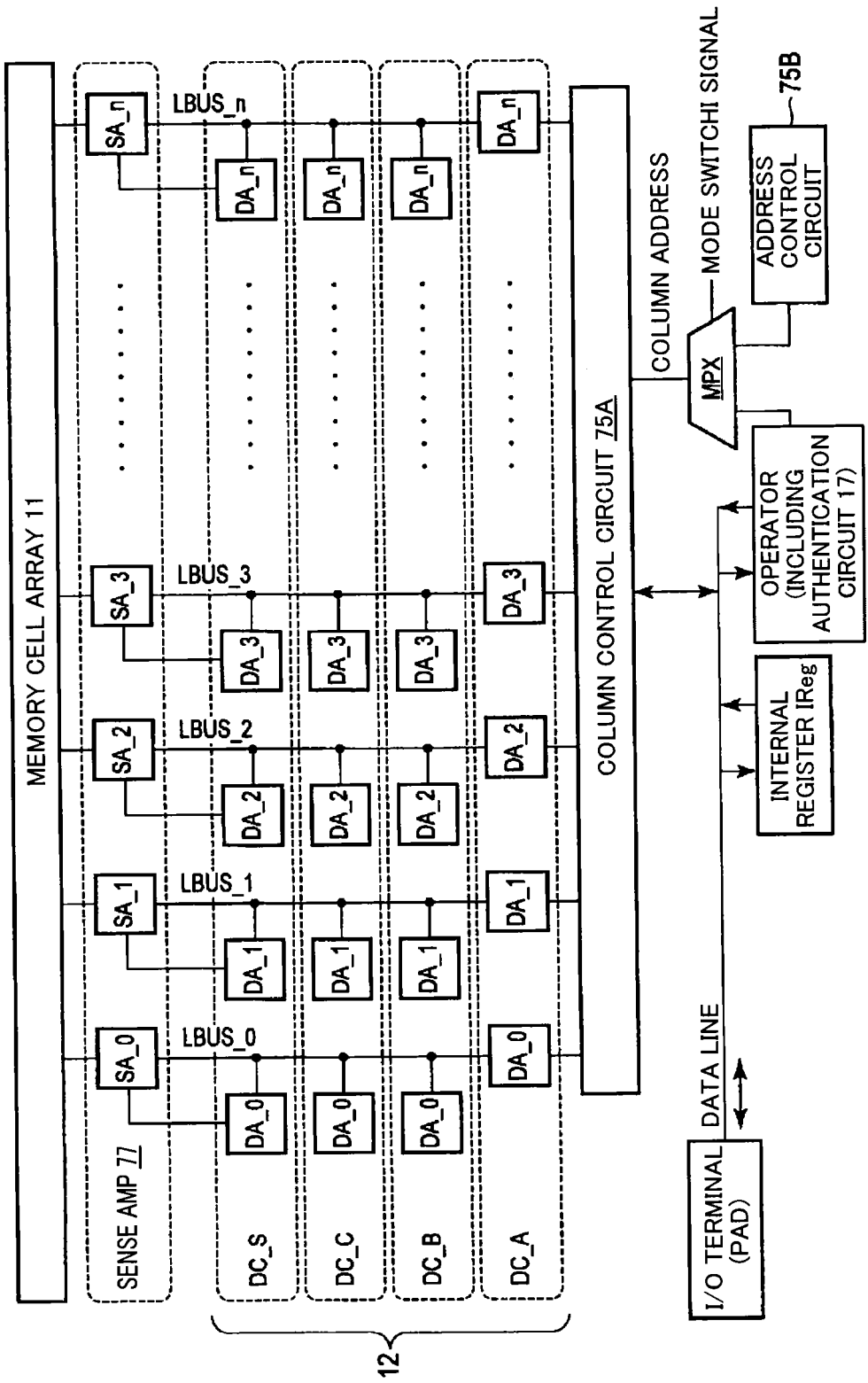
FIG. 53 is a block diagram showing a configuration example of a sense amplifier and a peripheral circuit.

A configuration example of the sense amplifier and the peripheral circuit thereof is shown as in FIG. 53. As shown in the figure, data cache 12 includes data caches (latch circuits) DC_A, DC_B, DC_C, and DC_S and only DC_A is connected to a data line via a column control circuit and is used to exchange data with units outside the chip. DC_S is a latch used to control the operation of the sense amplifier in accordance with data. DC_B, DC_C, and DC_S are connected in parallel with a bus (LBUS) between DC_A and the sense amplifier and used as data caches and it is necessary to exchange data with the outside via DC_A. The column control circuit connects DC_A associated with the column address to a data line. When a NAND flash memory is used for normal operation, the column address supplied by an address control circuit is used, but the address specified by an operator is used when an authentication sequence of the present proposal is performed. Whether to use a normal address or an address of an operator can be switched by a mode switching signal.

<Equivalent Circuit Example of the Sense Amplifier and Data Caches>

Figure 54:
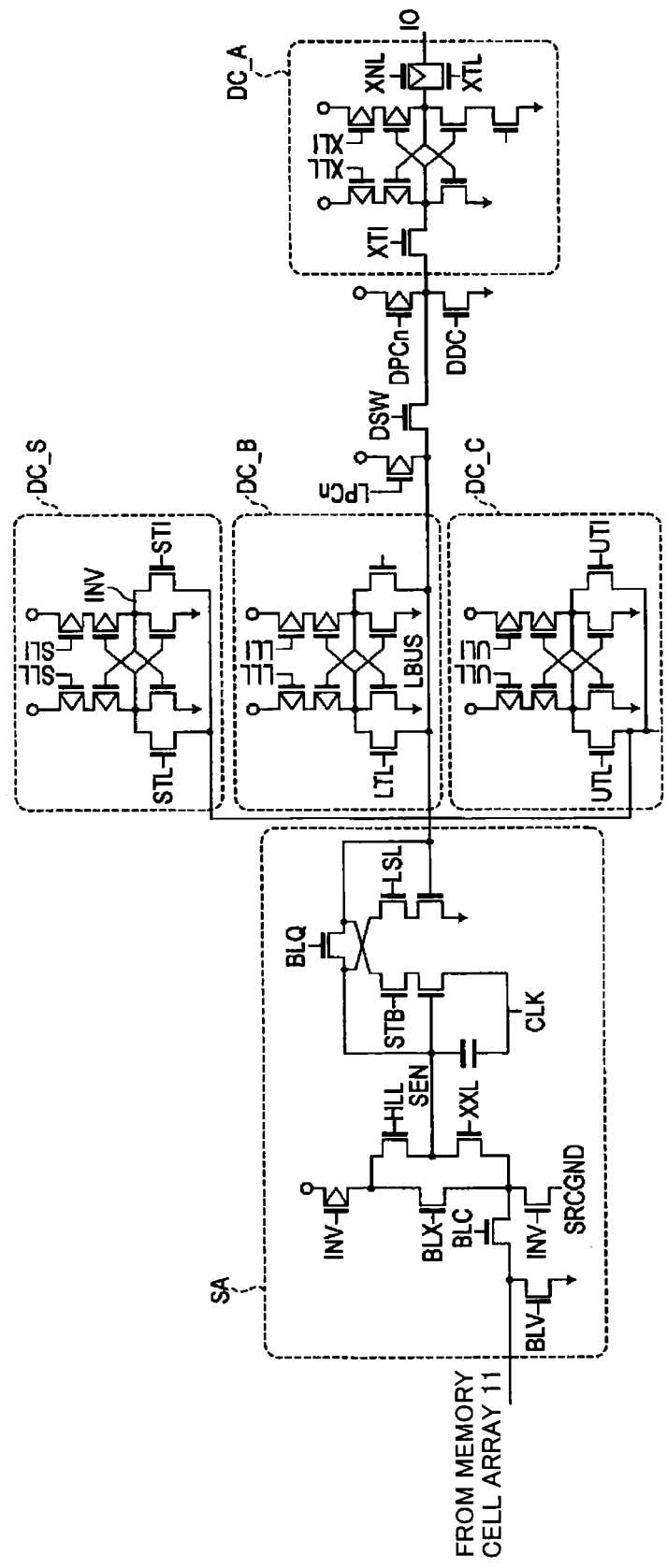
FIG. 54 is an equivalent circuit diagram of the sense amplifier 77 in FIG. 53 and a data cache 12.

FIG. 54 shows an equivalent circuit example of a sense amplifier 77 and data caches 12 in FIG. 53.

In the following, the system application example where a plurality of embodiments among the fourth to eleventh embodiments coexist will be illustrated.

Figure 55:
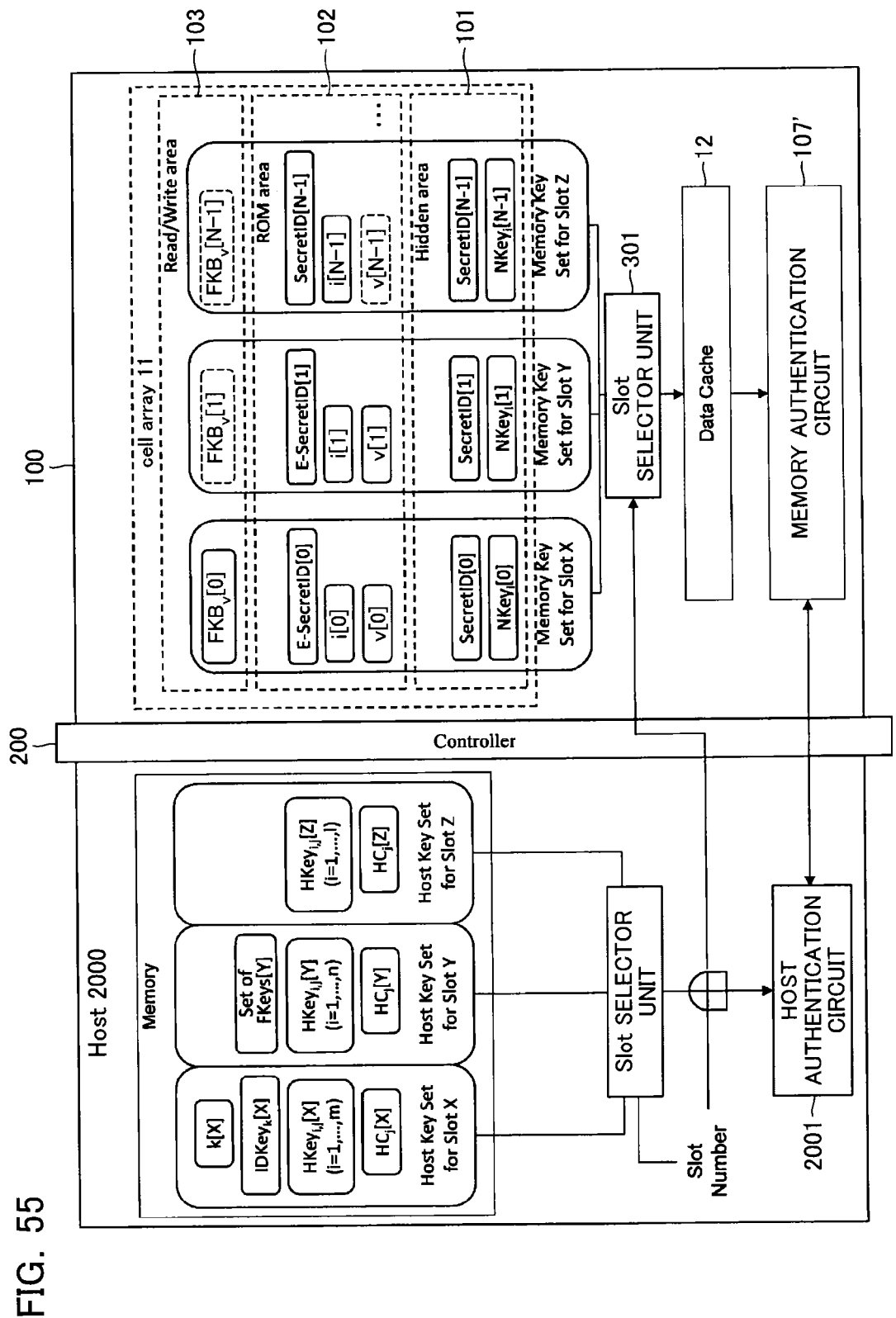
FIG. 55 is a configuration example of the host device 2000 and the NAND flash memory 100 in which the plural embodiments coexist.

Referring now to FIG. 55, a configuration example of the host device 2000 and the NAND type flash memory 100 where a plurality of embodiments coexist will be explained. When a plurality of embodiments are implemented in one system, the host device 2000 and the memory 100 each stores information required for the authentication corresponding to each of the embodiments, in areas referred to as "a slot".

Each slot is defined as information required for authentication required in each of the embodiments, and an aggregate of functions. As an example, in the system shown in FIG. 55, a slot X is information required in the fifth embodiment and aggregate of function; a slot Y is those required in the first modification of the fifth embodiment; and a slot Z is those required in the second modification of the fifth embodiment. In FIG. 55, the aggregate of functions including an authentication function which the host device 2000 requires in each slot is referred to as a host authentication circuit 2001. Also in FIG. 55, the aggregate of functions including an authentication function which the NAND flash memory 100 requires in each slot is referred to as memory authentication circuit 107'.

Here, in an authentication process between the host device 2000 and the memory 100, the host device 2000 specifies a slot number assigned to a slot. That is, the slot number means selection of each authentication function and data to be used for authentication. In a broader sense, it means a selection of function according to a level of authentication required. The memory 100 selects, using a slot selection unit 301, data required for authentication to be used according to the specified slot number, and performs a process corresponding to the function required for the authentication. The host device 2000 also selects data required for authentication to be used according to the slot number specified by itself at the slot selection unit 301, and performs a process corresponding to the function required for the authentication.

Due to introduction of the concept of "slot", even if there are applications different in required authentication level, it is possible to select an embodiment suitable for each of the applications. In addition, by providing the common slot number to the applications and communicating between the host device 2000 and the memory 100, it becomes possible to operate various combinations of the host devices 2000 and the memories 100, without a compatibility problem and authentication nonconformity.

That is, FIG. 55 shows an example where the host device 2000 corresponds to slots X, Y, and Z, while the NAND flash memory 100 corresponds to the slots X, Y, and Z, and other slots. The present invention is not limited thereto. It can be expanded to: a case where the host device 2000 corresponds to a slot X; a case where the host device 2000 corresponds to two slots X and Y; and a case where the host device 2000 corresponds to slots X, Y, Z and other slots. Alternatively, it may be expanded to: a case where the memory 100 corresponds to only a slot X; a case where the memory 100 corresponds to only a slot Y; a case where the memory 100 corresponds to only a slot Z; a case where the memory 100 corresponds to slots X and Y; and a case where the memory 100 corresponds to slots X, Y, and Z.

Furthermore, when a plurality of the host devices 2000 exists, the host device 2000A may correspond to only a slot X, and the host device 2000B may correspond to slots X and Y. In the similar case, the NAND flash memory 100 may correspond to only a slot X, or may correspond to only a slot Y. The present invention is not limited to these examples, but can expand its operation in various ways.

Figure 56:
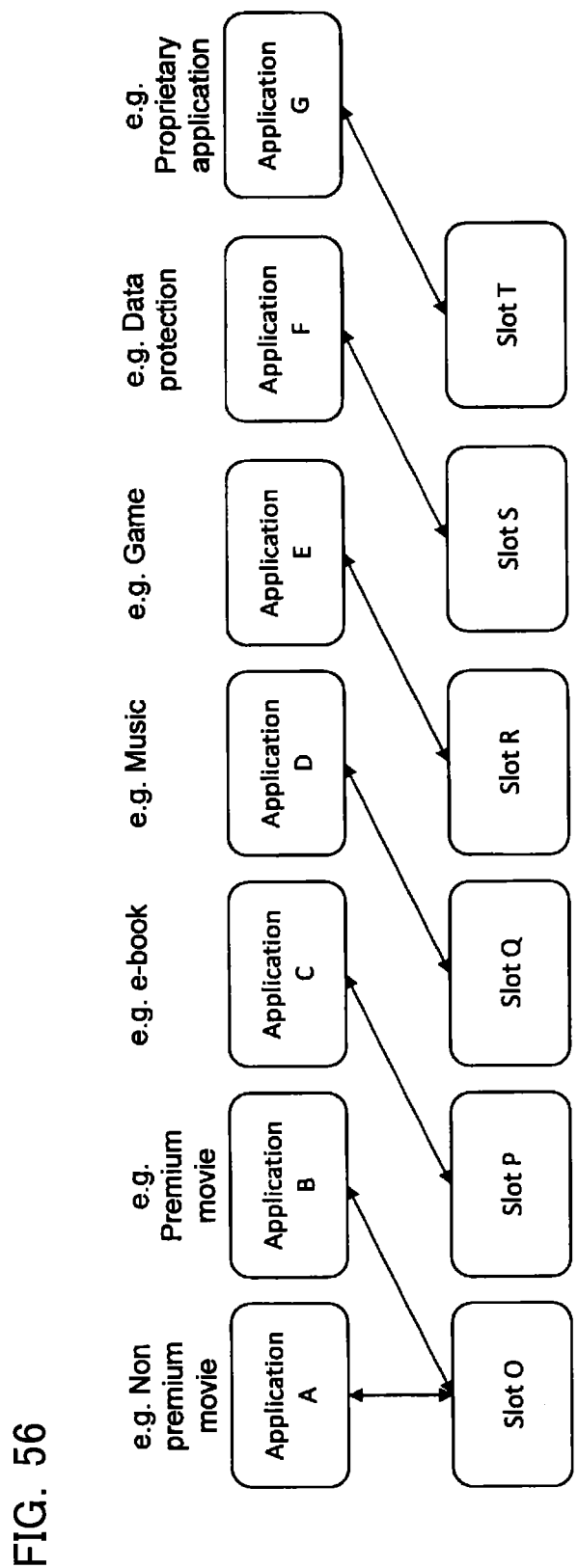
FIG. 56 illustrates a method of using slots.

Referring now to FIG. 56, a method of using a slot will be explained. As stated above, having a plurality of slots may allow one system to deal with a plurality applications different in authentication level. FIG. 56 shows an example which deals with plurality of applications. Slots O-T each has corresponding relationship with applications A-G. For example, the slot O is used for an authentication process of the application A. Also, the slot P is used for the authentication process of the application C. Note that the slot O has a corresponding relationship with the application B, as well as the application A.

In General, applications are classified according to various standards, and is used. FIG. 56 shows a case where applications are classified based on types of content, are assigned with slots. As an example, in FIG. 56, applications are classified according to content (a book, music, or a game) of content data, and different slots are assigned to different applications.

On the other hand, it is also possible that the same slot can be assigned to different applications, due to a certain reason. For example, in FIG. 56, when an application A is non-premium movie data with SD (Standard Definition), and an application B is premium movie data with HD (High Definition), the same slot O can be assigned to the applications A and B. Since the applications A and B have a common feature that both of them relates to content data of movie, it is possible to assign the same slot to them, and the same authentication function may be shared between them.

However, there may be a case required authentication functions differ. For example, regarding SD movie content and the HD movie content, the HD movie content is required to have a higher security level, and is required to have a larger number of functions, in some cases. In this case, it is possible that different slots are assigned to HD movie content and SD movie content, respectively. Similarly, application C to E may be assigned with electronic book, music, game, and the like.

In addition, the way of assigning the application may be determined based on an aspect and intended purpose of data protection. For example, when there are an application for the purpose of the protection of confidential information in a cooperation, and an application for the purpose of the protection of personal information, different slots may be assigned to these applications.

Also, it is possible that a plurality of applications that belong to the same category are classified according to way of data usage, and different slots may be assigned to such applications. For example, when there are a plurality of applications about the medical data protection, these applications may be classified based on the difference in place of usage (site) (e.g., a hospital or a medical site), and different slots may be assigned to such applications. Applications that needs management may be classified as a proprietary application, and different slots may be assigned to them, respectively.

Also, it is possible that a plurality of applications share the same slot, but they have different data required for authentication and different function. It has been already explained that a slot includes data required for authentication and a function. This means that even if there exist various host devices 2000 and NAND flash memories 100 in the market, it is possible to operate them without confusion. On the other hand, there may be a case there is no need to assume various host devices 2000 and various NAND flash memories 100, when, for example, operation is performed within an extremely-limited area such as in a hospital or in a medical site. In this case, slots are assigned according to a classification of medical care. However, even if the applications has the same slot number, there may be a plurality of variations regarding data required in authentication and function. The correspondence may be determined in view of the operation guideline of each site.

Figure 57:
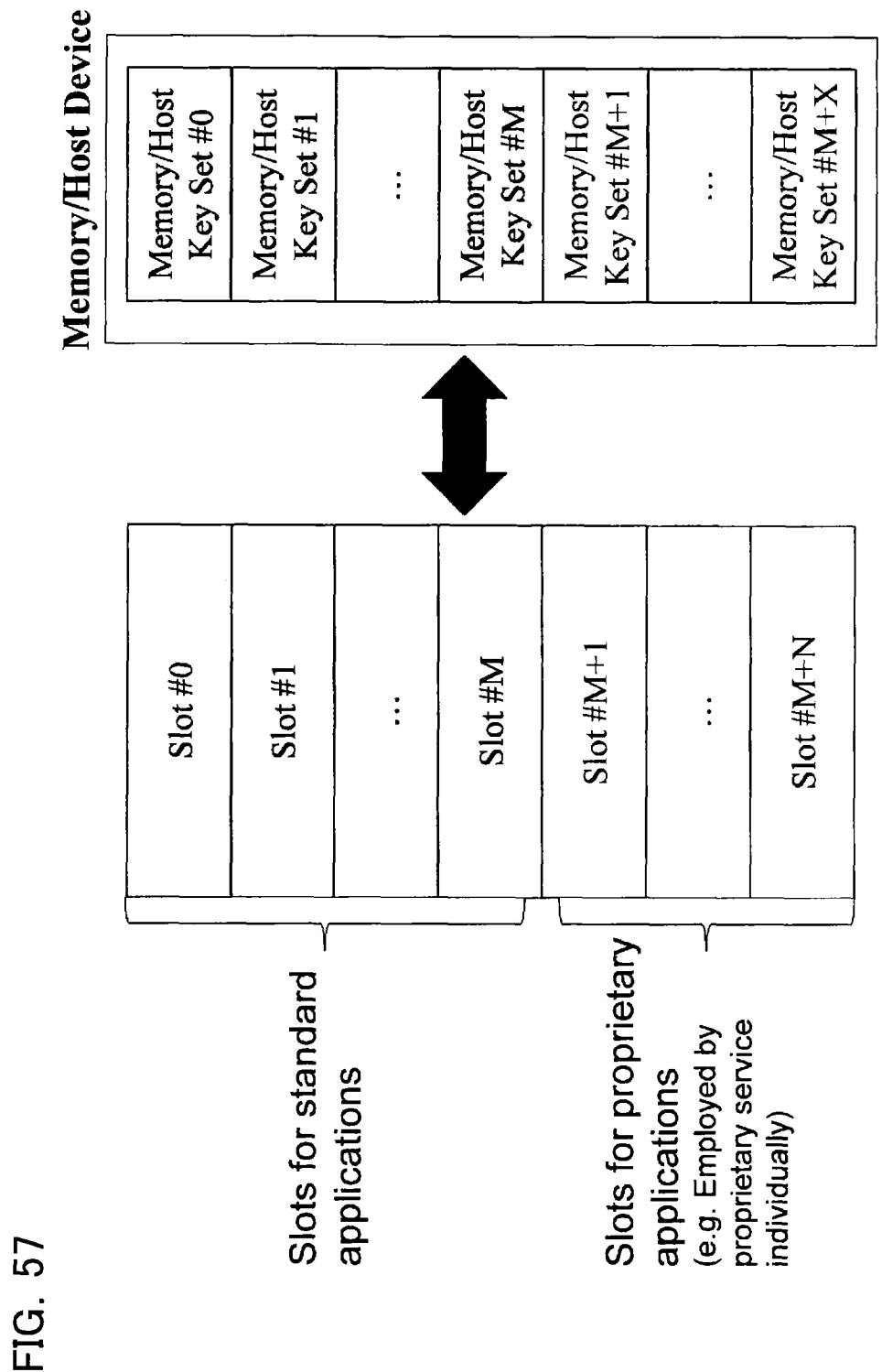
FIG. 57 explains a method of classifying the slots to large categories, and a method of assigning keys to the host device 2000 and the memory 100.

Referring now to FIG. 57, a method of classifying slots broadly, and a method of assigning keys to the host device 2000 and the memory 100 will be described. Similar to the case in FIG. 56, a slot is assigned to each of the applications while making connection between them.

The assignment may be conducted according to the original rule of each manufacturer of the host device 2000, the original rule of each manufacturer of the NAND flash memory 100, or the original rule determined between the manufacturers. On the other hand, it is possible to establish a rule by a group including stakeholder such as manufacturers and service providers (for example, a standardization group).

However, when a standardization group determines intended purposes of all slots, flexibility in decision is spoiled in an application where only a certain manufacturer would like to use, for example. In FIG. 57, the numbers in a certain numeral range (in FIG. 57, slot number 0 to slot number M) designate a standard application area for applications defined by a standardization group, while the numbers in another numeral range (in FIG. 57, slot number M+1 to M+N) designate a non-standard usage area which may be defined freely by each of the stakeholders. This may achieve a good balance between securing compatibility of a common application in a wide range, and securing flexibility of individual applications. Data required for the above-mentioned authentication and a function are attached to each slot. Among data required for the authentication, data provided by and applied by a standardization group or each of the manufacturers is called "a key set". A key set provided and applied to the host device 2000 is called "a host key set", and a key set provided and applied to the memory 100 is called "a memory key set". The slots are provided and applied with different key sets. Alternatively, some of the slots are provided and applied with a key set shared among them.

Figure 58:
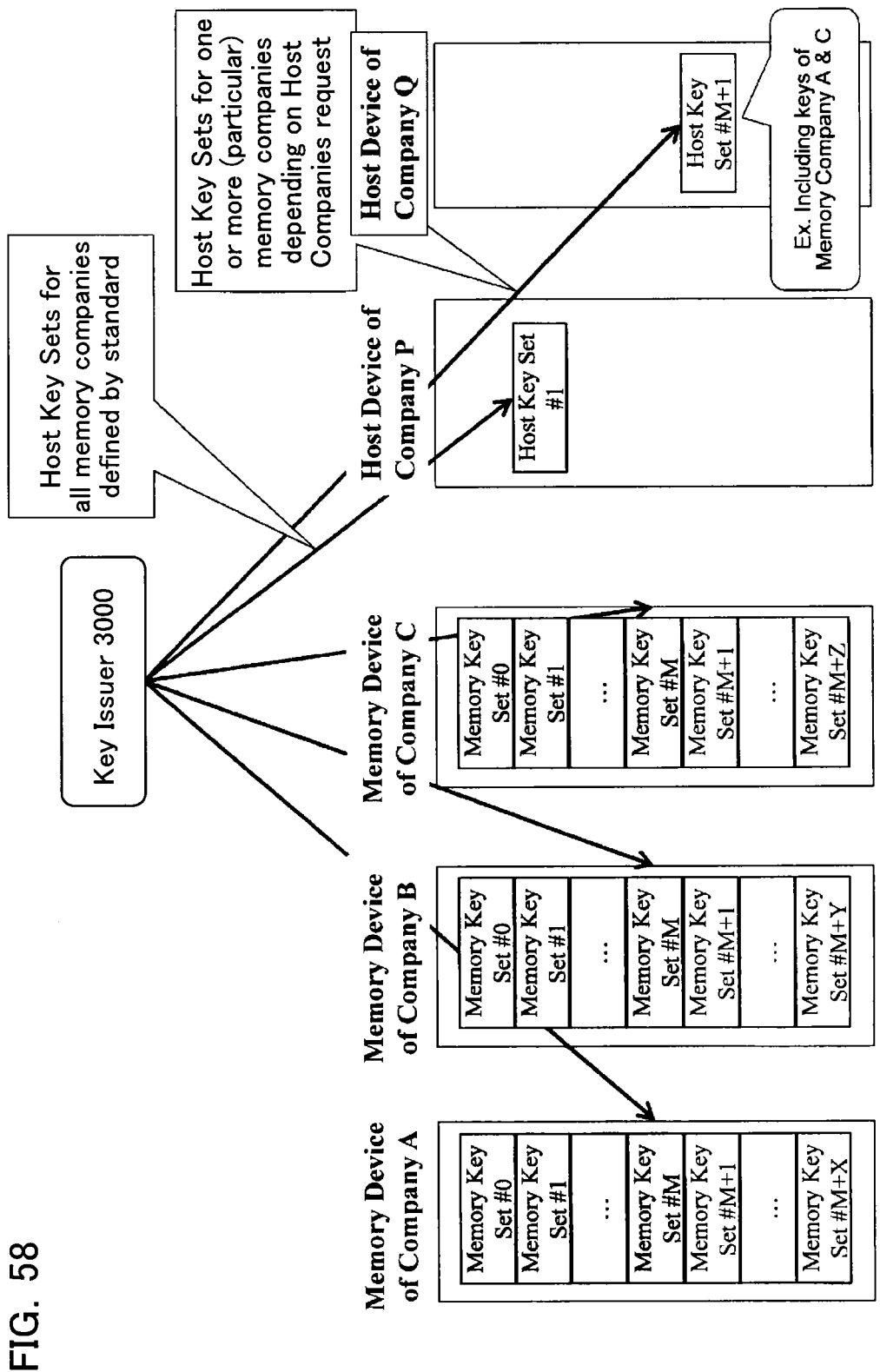
FIG. 58 illustrates a method of matching each of the key sets and a method of delivering the key sets after assuring compatibility.

Next, referring now to FIG. 58, a method of delivering key sets after matching of the key sets, and securing compatibility thereof. In this example, each of the key sets is delivered to each manufacturer by the key issue/management center 3000, and is applied to each device. The memory devices are manufactured by a plurality of manufacturers (A, B, C), respectively. Each of the memory devices may differ in range of authentication function required therein. In addition, the host devices are manufactured by a plurality of manufacturers (P, Q), respectively. Each of the host devices may differ in range of authentication function required therein. In this example, in order to secure compatibility with regard to slot numbers in a certain range, slot numbers that should be employed as a minimum standard (minimum guarantee slot) and a range of authentication function required for the slot numbers are determined for memory devices, and operation thereof is performed, irrespective of the manufacturer of the memory device.

For example, slot number 0 to slot number L are determined to have an authentication function and purpose corresponding to the fourth embodiment. Slot number L+1 to slot number L+4 are determined to have an authentication function and purpose corresponding to the fifth embodiment. Slot number L+5 to slot number L+6 are determined to have an authentication function and purpose corresponding to the first modification of the fifth embodiment. Slot number L+7 to slot number M are determined to have an authentication function and purpose corresponding to the second modification of the fifth embodiment. Each of the memory devices are configured to have an authentication function and a key set corresponding to the slot number 0 to M.

The minimum guarantee slot may be formed of a standard application area defined mainly by the above-mentioned standardization group, a non-standard application area, a part of these areas, the combination thereof, or the like. For example, slot number 0 to slot number M in the above-described example are defined as the minimum guarantee slots, and among them, 0 to L are defined and operated as the standard application area determined by the standardization group, and L+1 to M are defined and operated as the non-standard application area. However, authentication functions and key sets are defined by the standardization group, irrespective of whether the slot is in the standard application area or in the non-standard application area, in order to secure compatibility. With regard to areas other than the minimum guarantee slot, it is up to each of the manufacturers which slot number is supported. For example, in FIG. 58, the manufacturer A supports slot number M+1 to slot number M+X, the manufacturer B supports slot number M+1 to slot number M+Y, and the manufacturer C supports slot number M+1 to slot number M+Z.

On the other hand, with regard to the host devices, it is up to the manufacturers which slot number is supported, because the minimum guarantee slot is defined in the memory device, and the host device has a characteristic that it is usually manufactured according to its intended purpose.

When a host device corresponding to the minimum guarantee slot or the slot number of the standard application area is manufactured, the host device is provided and applied with a host key set that is enough for authenticate all memory devices (in FIG. 58, the host device produced by the manufacturer P).

On the other hand, when a host device corresponding to slots in other than the above is manufactured, and securing compatibility in a limited range is enough for the application, a host key set that is enough for authentication of specific memory devices is provided and applied (in FIG. 58, a host device manufactured by the manufacturer Q), rather than providing or applying a host key set that is enough for authentication of all memory devices, according to a rule between host device manufacturers and memory manufacturers. Specifically, among the secret information $HKey_{i,j}$ ($i=1, \ldots, m$, where j is a fixed value in the $HKey_{i,j}$) in the above-mentioned embodiment, "i" corresponds to $NKey_i$ stored in each memory. That is, when a host device has only $HKey_{i,j}(i=1)$, the host device has only a function of authenticating a memory device having $NKey_i(i=1)$ (for example, a memory device manufactured by the manufacturer A). Alternatively, when a host device has only $HKey_{i,j}(i=3)$, the host device has only a function of authenticating a memory device having $NKey_i(i=3)$ (for example, a memory device manufactured by the manufacturer C). In other words, when a host device authenticates a specific memory, secret information $HKey_{i,j}$ corresponding to i of the target memory device is provided and applied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

[Explanation of Reference Numerals]

1000 . . . Memory card, 2000 . . . Host device, 3000 . . . Key issue/management center, 100 . . . Memory, 200 . . . Controller.

The invention claimed is:

1. A host device assigned with identification key information and first key information, comprising:
   a first data generation unit that generates identification key information that may be decrypted from the identification key information using key management information read from an authenticatee;
   a decryption unit that decrypts encrypted secret identification information read from the authenticatee using the generated identification key information to generate secret identification information;
   a random number generator that generates a random number;
   a second data generation unit that generates a first session key using the first key information and the random number;
   a one-way conversion unit that performs a one-way conversion process on the secret identification information using the generated first session key to generate first one-way conversion data; and
   a verification unit that judges whether the first one-way conversion data and a second one-way conversion data received from the authenticatee match,
   when the judgment result of the verification unit is affirmative, a one-way conversion process being conducted on the secret identification information and secret information to generate one-way conversion identification information.

2. A method of authenticating an authenticate in the host device assigned with identification key information and first key information, comprising:
- generating, in a processor, identification key information that may be decrypted from the identification key information using key management information read from an authenticatee;
- decrypting, in a processor, encrypted secret identification information read from the authenticatee using the identification key information to generate secret identification information;
- generating a random number;
- generating a first session key using the first key information and the random number;
- performing a one-way conversion process on the secret identification information using the first session key to generate first one-way conversion data; and
- judging whether the first one-way conversion data and a second one-way conversion data received from the authenticatee match; and
- when the judgment result of the verification unit is affirmative, performing a one-way conversion process on the secret identification information and secret information to generate one-way conversion identification information.

* * * * *